United States Patent
Ichiyama

(10) Patent No.: US 7,567,006 B2
(45) Date of Patent: Jul. 28, 2009

(54) FIELD CONTROLLABLE ROTATING ELECTRIC MACHINE SYSTEM WITH FLUX SHUNT CONTROL

(75) Inventor: Yoshikazu Ichiyama, Kyoto (JP)

(73) Assignee: Kura Laboratory Corporation, Kyoto-shi (JP)

( * ) Notice: Subject to any disclaimer, the term of this patent is extended or adjusted under 35 U.S.C. 154(b) by 6 days.

(21) Appl. No.: 12/031,512

(22) Filed: Feb. 14, 2008

(65) Prior Publication Data

US 2009/0026864 A1 Jan. 29, 2009

(30) Foreign Application Priority Data

| | | |
|---|---|---|
| Jul. 26, 2007 | (JP) | 2007-194043 |
| Aug. 17, 2007 | (JP) | 2007/212690 |
| Oct. 29, 2007 | (JP) | 2007-279975 |
| Oct. 29, 2007 | (JP) | 2007-280003 |
| Dec. 4, 2007 | (JP) | 2007-313140 |

(51) Int. Cl.
- *H02K 21/14* (2006.01)
- *H02K 1/27* (2006.01)
- *H02K 7/12* (2006.01)
- *H02P 9/00* (2006.01)

(52) U.S. Cl. ............ 310/191; 310/156.48; 310/156.55; 322/28; 322/51

(58) Field of Classification Search ............ 310/156.01, 310/156.02, 156.04, 156.07, 156.08, 156.12, 310/156.28, 156.29, 156.32, 156.33, 156.36, 310/156.38, 156.43, 156.44, 156.45, 156.48, 310/156.49–156.52, 156.54, 156.55, 156.59, 310/190–191; 322/28

See application file for complete search history.

(56) References Cited

U.S. PATENT DOCUMENTS

| | | | |
|---|---|---|---|
| 3,713,015 A | | 1/1973 | Frister |
| 4,885,493 A | | 12/1989 | Gokhale |
| 5,763,977 A | * | 6/1998 | Shimasaki et al. .......... 310/191 |
| 6,700,267 B2 | * | 3/2004 | Weiss .......................... 310/112 |
| 6,806,610 B2 | * | 10/2004 | Dilliner ....................... 310/181 |
| 7,042,128 B2 | * | 5/2006 | Zepp et al. .................. 310/191 |
| 7,385,332 B2 | * | 6/2008 | Himmelmann et al. ...... 310/190 |
| 2007/0018524 A1 | * | 1/2007 | Yonemori et al. ........... 310/178 |

FOREIGN PATENT DOCUMENTS

| | | |
|---|---|---|
| JP | 2001-25190 | 1/2001 |
| JP | 2001-275326 | 10/2001 |

(Continued)

*Primary Examiner*—Burton Mullins
(74) *Attorney, Agent, or Firm*—Ditthavong Mori & Steiner, P.C.

(57) ABSTRACT

In a magnet-exciting rotating electric machine, a magnetic field pole part opposing an armature is composed to be divided into a surface magnetic pole part and a magnetic excitation part so as to be capable of being relatively displaced. The magnetic excitation part supplies a magnetic flux to a magnetic salient pole. The magnetic flux from the field magnet is divided into a main magnetic flux pathway that circulates through the armature side and a bypass magnetic flux pathway that does not pass through the armature, and thereby, the magnetic flux of the main magnetic flux pathway is changed. The magnetic resistances of the main magnetic flux pathway and the bypass magnetic flux pathway are composed so that total magnetic flux amount from the field magnet is maintained constant, and then a magnetic force preventing the relative displacement is maintained small.

30 Claims, 28 Drawing Sheets

FOREIGN PATENT DOCUMENTS

| | | |
|---|---|---|
| JP | 2002-58223 | 2/2002 |
| JP | 2002-136012 | 5/2002 |
| JP | 2002-204541 | 7/2002 |
| JP | 2004-222350 | 8/2004 |
| JP | 2004-242462 | 8/2004 |
| JP | 2004-320864 | 11/2004 |
| JP | 2004-328944 | 11/2004 |
| JP | 2004-336880 | 11/2004 |
| JP | 2004-357357 | 12/2004 |
| JP | 2006-136088 | 5/2006 |
| JP | 2006-191783 | 7/2006 |
| JP | 2006-246662 | 9/2006 |
| JP | 2007-110776 | 4/2007 |

* cited by examiner

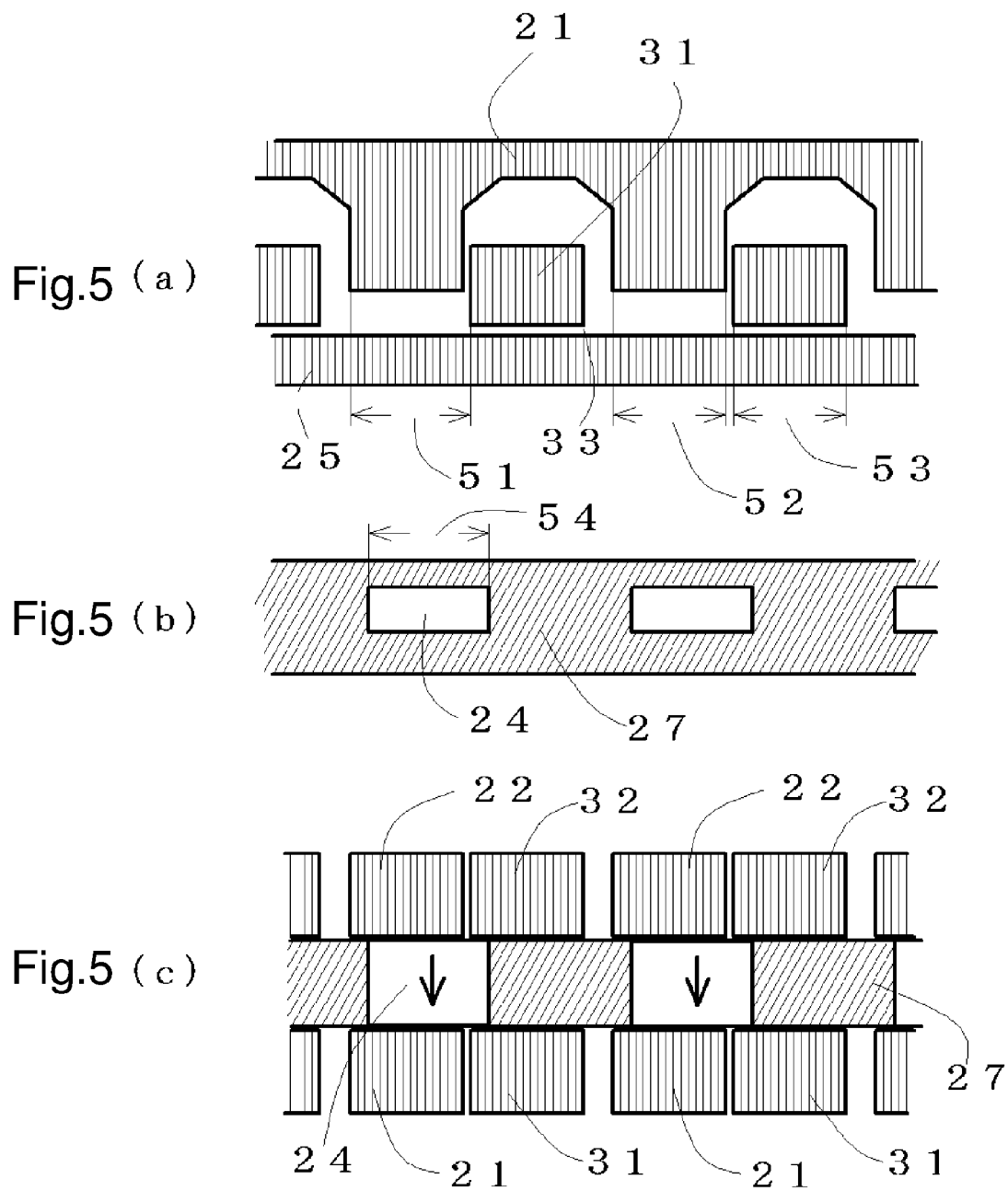

FIELD CONTROLLABLE ROTATING ELECTRIC MACHINE SYSTEM WITH FLUX SHUNT CONTROL

CROSS-REFERENCE TO RELATED APPLICATIONS

The present application claims priority under 35 U.S.C. §119 to Japanese Patent Applications No. 2007-194043 filed Jul. 26, 2007, No. 2007-212690 filed Aug. 17, 2007, No. 2007-279975 filed Oct. 29, 2007, No. 2007-280003 filed Oct. 29, 2007, and No. 2007-313140 filed Dec. 4, 2007. The contents of these applications are incorporated herein by reference in their entirety.

BACKGROUND OF THE INVENTION

1. Field of the Invention

The present invention relates to rotating electric machines such as electric generators and electric motors having a permanent magnet.

2. Description of the Related Art

Rotating electric machine apparatuses, such as an electric generator for generating electric power electromagnetically by relative rotation between a permanent magnet and an armature, or an electric motor for generating relative rotation between a permanent magnet and an armature by interaction between the permanent magnet and a magnetic field generated by current supplied to the armature, are excellent in energy efficiency and have been widely used routinely along with development of permanent magnets. However, in both electric motors and electric generators, optimum power is not always obtained in a wide rotational speed range because of constant magnetic field strength from the field magnet.

In the case of the electric motor, the control thereof becomes difficult in a high-speed rotational region because the back electromotive force (power generation voltage) becomes too high, and therefore, various methods for weakening the field strength as field-weakening control have been proposed. Moreover, in the case of the electric generator, a constant-voltage electric generator by only field current control or a constant-voltage circuit in which the power generation voltage is made to be constant by a semiconductor has been exclusively used so that the power generation voltage is made to be a predetermined level in a wide rotational-speed range.

In the electric motor, field-weakening control by current phase control has been widely adopted, but energy loss is large because current flows that does not directly contribute to the rotation. When current excitation for the control is used with a permanent magnet excitation, the structure of the rotating electric machine becomes complex and additionally energy loss is involved. Furthermore, in the case of the electric generator, there has been a problem that cost of constant-voltage electronic circuit with a large electric power is large. Under such a circumstance, measures for reducing the cost of the entire apparatus while binding the electronic-circuit control to a minimum by devising the structure of the rotating electric machine apparatus have been required for a long time, and various proposals have been made.

In U.S. Pat. No. 3,713,015, there is described an alternating current generator in which a permanent magnet rotor is divided into two and the two permanent magnet rotors are relatively displaced in the circumferential direction to effectively control the field strength. There is an advantage that the energy loss for the control is small because the relative displacement can be maintained mechanically, but there is a disadvantage that eddy-current loss is large in a high-speed rotational region because the amount of the magnetic flux flowing into the armature is constant.

In Japanese Unexamined Patent Publication (Kokai) No. 2004-320864 and No. 2004-328944, there are described methods for controlling a magnetic field strength by changing magnetic resistance in a magnetic circuit including the field magnet. Furthermore, in U.S. Pat. No. 4,885,493, Japanese Unexamined Patent Publication (Kokai) No. 2004-357357 and No. 2006-246662, methods for making the field magnet short have been described.

In general, when the magnetic circuit including the magnet has a movable part, there is a magnetic force of displacing the movable part to the direction in which the magnetic flux quantity flowing through the magnetic circuit becomes large (the direction in which the magnetic resistance becomes small). The field magnet is a source for generating force or generating power in the rotating electric machine apparatus, and the magnetic force thereof is proportional to the output of the rotating electric machine in the proposed example of the rotating electric machine apparatus for controlling the magnetic resistance of the magnetic circuit or for short-circuiting the field magnet by mechanical displacement. A large force is required for the displacement control of the mechanism and vibration or hunting of the members is caused to make it difficult to perform the accurate control. Furthermore, a large-power actuator, a control mechanism involving excessive mechanical strength, and so forth are required, and therefore, realization of the apparatus involves difficulty.

The contents of U.S. Pat. Nos. 3,713,015 and 4,885,493, and Japanese Unexamined Patent Application Publications No. 2004-320864, No. 2004-328944, No. 2004-357357 and No. 2006-246662 are incorporated herein by reference in their entirety.

SUMMARY OF THE INVENTION

Accordingly, an embodiment of the present invention advantageously provides a method for controlling a magnetic field strength, a rotating electric machine apparatus, and a rotating electric machine system, by which field-weakening control becomes easy, while satisfying the following conditions: (1) mechanical means are adopted for maintaining the operating condition; (2) generation of a magnetic force disturbing operation of the mechanical means in the field control can be suppressed; (3) the magnetic flux on the armature side can be even controlled in zero neighborhoods for eddy current loss evasion; and furthermore, desirably, (4) the entire magnetic material of the magnetic salient pole can be released for generation of reluctance torque by controlling the magnetic flux flowing through the magnetic salient pole opposed to the armature to be approximately zero, and so forth.

An embodiment of a rotating electric machine apparatus according to the present invention includes: at least a magnetic field pole part and an armature that are opposed to each other concentrically to an axis in a radial direction or in an axial direction and that are disposed to be capable of relatively rotating; wherein the armature has an armature coil at least; the magnetic field pole part is divided into a surface magnetic pole part and a magnetic excitation part which are composed so as to be capable of being relatively displaced; the surface magnetic pole part has at least a plurality of magnetic salient poles disposed in a circumferential direction oppositely to the armature and has a magnetic salient pole extension and a bypass magnetic pole disposed oppositely to the magnetic excitation part; the magnetic excitation part has a field magnet that an end thereof opposes to the magnetic salient pole extension and the bypass magnetic pole at least, and controls, by mechanical displacement, magnetic flux amount supplied to the magnetic salient poles.

A main magnetic flux pathway in which a magnetic flux circulates through the magnetic salient poles and the armature and a bypass magnetic flux pathway in which a magnetic flux circulates within the magnetic field pole part are connected to the field magnet in the magnetic excitation part in parallel, and a resistance of the bypass magnetic flux pathway divided by the number of the field magnet contained therein in series is set up to be almost equal to a resistance of the main magnetic flux pathway divided by the number of the field magnet contained therein in series, and the surface magnetic pole part and the magnetic excitation part are relatively displaced with maintaining a sum of an area of the field magnet end opposed to the magnetic salient pole extension and an area of the field magnet end opposed to the bypass magnetic pole to be constant, and the magnetic flux from the field magnet is divided into the main magnetic flux pathway and the bypass magnetic flux pathway by mechanical displacement to control an amount of the magnetic flux flowing between the magnetic salient pole and the armature.

A characteristic in an embodiment of a rotating electric machine apparatus in the present invention is that the magnetic flux from the field magnet is controlled to be divided into the main magnetic flux pathway and the bypass magnetic flux pathway by mechanical displacement in the above-described structure. Even if the magnetic flux amount from the field magnet is changed by this composition, risk which the field magnet is demagnetized is avoidable. Moreover, the total amount of the magnetic flux which flows from the field magnet by setting magnetic resistance of two of magnetic flux pathways as predetermined conditions is always made constant, and then magnetic force preventing the mechanical displacement can be maintained small. Thereby, the field control in the main magnetic flux pathway can be smoothly performed.

It is important to establish a resistance of the bypass magnetic flux pathway divided by the number of the field magnet contained therein in series is set up to be almost equal to a resistance of the main magnetic flux pathway divided by the number of the field magnet contained therein in series, and the magnetic power disturbing the displacement can be suppressed small and the field control can be carried out smoothly. The meaning which is "almost equal" is to establish both magnetic resistance as the predetermined conditions so that the magnetic power may be suppressed below the output of the actuator used for the displacement.

Various means can be applied to a means for performing relative displacement between the surface magnetic pole part and the magnetic excitation part. For example, there are a mechanical means for preliminarily setting by hand as a semi-fixed mechanism, a governor mechanism for moving the movable magnetic pole part by utilizing a centrifugal force, a mechanical means having an actuator in a rotor in the case that a field magnet part is in the rotor side, a mechanical means for performing displacement from the outside of the rotor, and so forth.

In the rotating electric machine apparatus, there are a structure in which the magnetic field pole part rotates and the armature stands still and an opposite structure thereof, a structure in which the cylindrical armature and the magnetic field pole part are opposed to each other in the radial direction through an air gap, and a structure in which the approximately disc-like armature and the magnetic field pole part are opposed in the axial direction through an air gap. Embodiments of the present invention can also be applied to any one of the above-described structures having the magnetic field pole part of a permanent magnet excitation.

Moreover, the rotating electric machine is an electric motor when a current to the armature coils is input and the rotational force is output, and the rotating electric machine is an electric generator when the rotational force is input and the current is output from the armature coils. Optimal magnetic structures exist in the electric motor or the electric generator, but are reversible, and the rotating electric machine apparatus can be applied to both of the electric motor and the electric generator.

One specific field control related structure of the surface magnetic pole part and the magnetic excitation part is as follows. The constitution of the portion of the surface magnetic pole part facing the magnetic excitation part is composed so that the bypass magnetic pole is arranged in the extended direction of a magnetic salient pole; the magnetic excitation part has a field magnet with a circumferential direction magnetization at least; the field magnet is disposed between the adjacent magnetic salient pole extensions and also between the adjacent bypass magnetic poles; the magnetization direction of the adjacent field magnets are arranged inversely each other so that the adjacent magnetic salient poles are magnetized in different polarities each other; a resistance of the bypass magnetic flux pathway is set up to be almost equal to a resistance of the main magnetic flux pathway; the magnetic excitation part is composed so as to be capable of being displaced in a direction that the magnetic salient pole extension and the bypass magnetic pole are lined.

One specific field control related structure of the surface magnetic pole part and the magnetic excitation part is as follows. The surface magnetic pole part has the magnetic salient pole extension and the bypass magnetic pole oppositely to the magnetic excitation part; the magnetic salient pole extension part has a periodic excision portion axially and the bypass magnetic pole is arranged in the excision portion; the magnetic excitation part has composition by which a field magnet with a circumferential direction magnetization and a nonmagnetic portion have been periodically arranged in an axial direction; the field magnet is disposed between the adjacent magnetic salient pole extensions and also between the adjacent bypass magnetic poles; the magnetization direction of the adjacent field magnet is arranged inversely each other so that the adjacent magnetic salient poles are magnetized in different polarities each other; the magnetic excitation part is composed so as to be capable of being displaced in an axial direction.

One specific field control related structure of the surface magnetic pole part and the magnetic excitation part is as follows. The surface magnetic pole part and the magnetic excitation part are composed so as to be capable of being relatively displaced in a circumferential direction; the constitution of the portion of the surface magnetic pole part facing the magnetic excitation part is that a first magnetic salient pole extension, a bypass magnetic pole, and a second magnetic salient pole extension are repeatedly arranged in a circumferential direction, and the bypass magnetic pole is disposed to face the second magnetic salient pole extension through a micro non-magnetic gap; the magnetic excitation part has a field magnet arranged so that one magnetic pole of the field magnet is disposed to face the first magnetic salient pole extension and the bypass magnetic pole, and magnetic flux flowing into the first magnetic salient pole extension and the bypass magnetic pole returns through the second magnetic salient pole extension, and the adjacent magnetic salient poles are magnetized in different polarities each other; a magnetic resistance of a bypass magnetic flux pathway in which magnetic flux circulates from the bypass magnetic pole to the second magnetic salient pole extension is set to be approximately equal to magnetic resistance of the main magnetic flux pathway in which a magnetic flux circulates from the first magnetic salient pole extension to the second magnetic salient pole extension through the armature.

One specific field control related structure of the surface magnetic pole part and the magnetic excitation part is as follows. The surface magnetic pole part and the magnetic excitation part are composed so as to be possible to displace relatively in a circumferential direction; the constitution of the portion of the surface magnetic pole part facing the magnetic excitation part is that a magnetic salient pole extension and a bypass magnetic pole are repeatedly arranged in circumferential direction; the magnetic excitation part has a field magnet arranged on a cylindrical magnetic core, and the field magnet opposes to the magnetic salient pole extension and the bypass magnetic pole, and the magnetization direction of the adjacent field magnets are arranged inversely each other so that the contiguous magnetic salient poles are magnetized in different polarities each other, and other end of the bypass magnetic pole opposes to the cylindrical magnetic core; a magnetic resistance of a bypass magnetic flux pathway in which a magnetic flux circulates from the bypass magnetic pole to the cylindrical magnetic core is set to be approximately equal to half of a magnetic resistance of the main magnetic flux pathway in which a magnetic flux circulates from the magnetic salient pole extension to the adjacent magnetic salient pole extension through the armature.

One of the specific means to rectify the magnetic resistance of the main magnetic flux pathway includes the following means. When changing the flux flowing in the armature, constant current load is connected to the armature coil so that predetermined electric current is made to flow by induced voltage. And thereby the magnetic resistance of the main magnetic flux pathway is adjusted effectively so that the magnetic power which disturbs the above-mentioned relative displacement may be made small.

Since the induced voltage passes the current which bars change of the magnetic flux which interlinks with the armature coil, the magnetic resistance of the main magnetic flux pathway can be effectively adjusted to become equal to the predetermined magnetic resistance that the magnetic power which disturbs the above-mentioned relative displacement may be made small.

One of the specific means to rectify the magnetic resistance of the main magnetic flux pathway includes the following means: when changing the flux flowing in the armature, the predetermined current which drives a rotor in an acceleration or a slowdown direction is supplied to the armature coil, and the magnetic resistance of the main magnetic flux pathway is effectively adjusted so that the magnetic force which disturbs the above-mentioned relative displacement may be made small.

The magnetic flux amount becomes large and small, respectively, when accelerating and slowing down the rotor. Exploiting these phenomena, the magnetic resistance of the main magnetic flux pathway can be effectively adjusted to become equal to the predetermined magnetic resistance that the magnetic power which disturbs the above-mentioned relative displacement may be made small.

One of the specific structures of the side of the surface magnetic pole part facing the armature includes the following structure: the magnetic salient pole and the non-magnetic portion are disposed one after the other in a circumferential direction.

One of the specific structures of the side of the surface magnetic pole part facing the armature further includes the following structure: the surface magnetic pole part is composed so that a magnetic salient pole and a permanent magnet with approximately circumferential direction magnetization are disposed one after the other in a circumferential direction; the magnetization direction of the contiguous permanent magnet is arranged inversely each other so that the contiguous magnetic salient poles are magnetized in different polarities each other; the magnetic excitation part is disposed so that the direction of the magnetization whose the permanent magnet magnetizes the magnetic salient pole, and the direction of the magnetization whose the magnetic excitation part magnetizes the magnetic salient pole may be coincided.

One of the specific structures of the side of the surface magnetic pole part facing the armature further includes the following structure: a permanent magnet assembly arranged a permanent magnet plate with same approximately circumferential direction magnetization on both sides of a magnetic material is an equivalent permanent magnet; the surface magnetic pole part is composed so that a magnetic salient pole and the permanent magnet assembly are disposed one after the other in a circumferential direction; the magnetization direction of the contiguous permanent magnet assemblies is arranged inversely each other so that the contiguous magnetic salient poles are magnetized in different polarities each other; the magnetic excitation part is disposed so that the direction of the magnetization whose the permanent magnet assembly magnetizes the magnetic salient pole, and the direction of the magnetization whose the magnetic excitation part magnetizes the magnetic salient pole may be coincided.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 5(a), 5(b), 5(c) are longitudinal sectional views showing the magnetic excitation part of the rotating electric machine apparatus shown in FIG. 1;

DETAILED DESCRIPTION OF THE PREFERRED EMBODIMENTS

Figure 1:
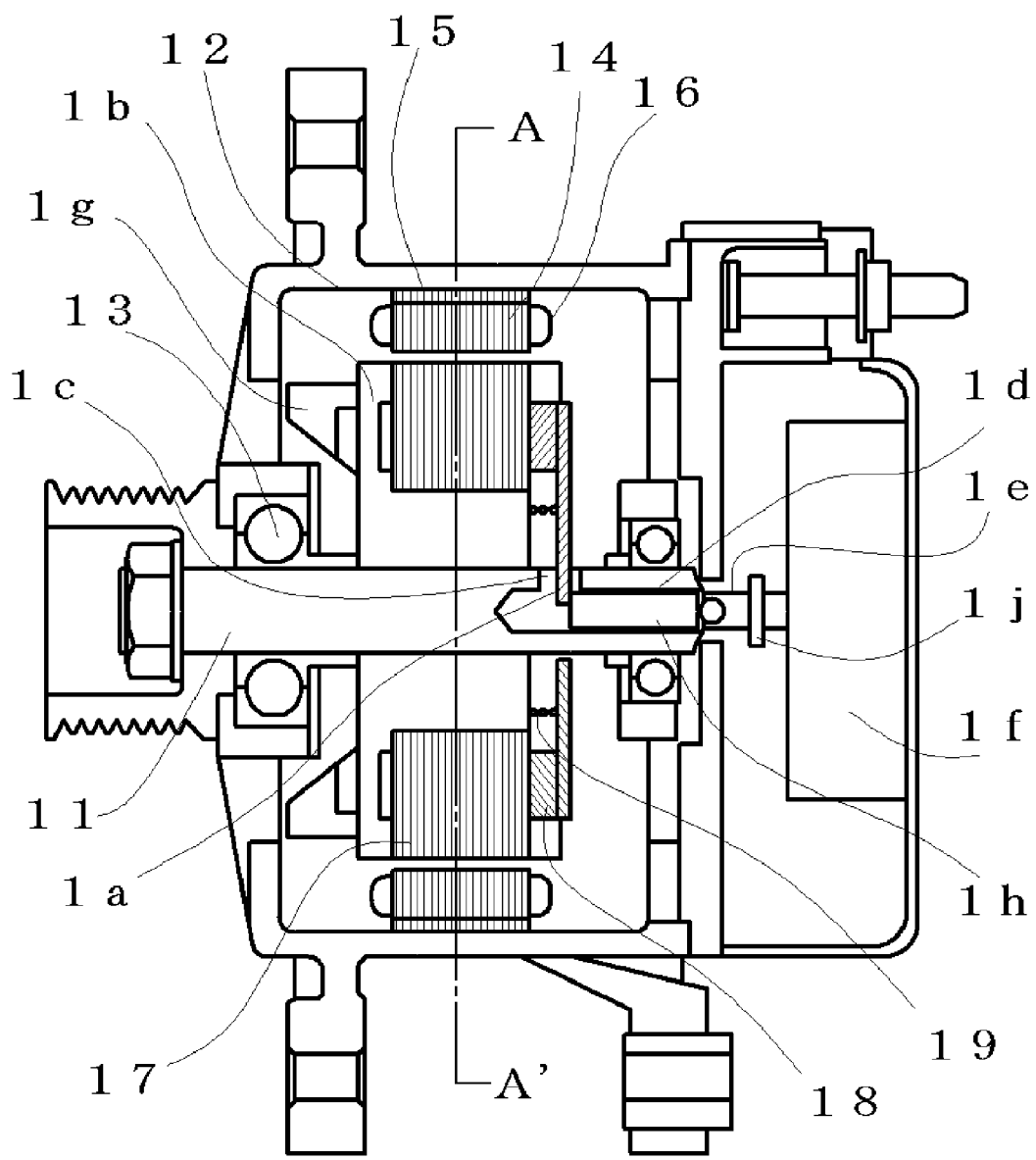
FIG. 1 is a longitudinal sectional view of a rotating electric machine apparatus according to a first embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The rotating electric machine system according to a first embodiment of the present invention will be explained by using FIGS. 1 to 8. The first embodiment is a rotating electric machine system having a radial gap structure and controlling the magnetic flux amount flowing through the armature by displacing the magnetic excitation part axially. The current of predetermined conditions is supplied to the armature coils to accelerate or to decelerate the rotor so that a magnetic resistance of the main magnetic flux pathway and the bypass magnetic flux pathway becomes equal effectively at the time of the magnetic excitation part displacement control.

FIG. 1 shows the rotating electric machine apparatus having a radial gap structure, and a rotational shaft 11 is supported rotatably by a housing 12 through bearings 13. The armature includes a cylindrical magnetic yoke 85 fixed to the housing 82, a plurality of magnetic teeth 84, and a armature coil 86.

The rotor includes a rotor support 1b and a magnetic field pole part 17 which includes a surface magnetic pole part and a magnetic excitation part 18, and the magnetic excitation part 18 is constituted so that it may displace axially.

The displacement control means for displacing axially of the magnetic excitation part 18 includes a slide rod 1h which is contained in the hollow of the rotational shaft 11, a push rod 1e, an actuator 1f, a spring 19, a slit portion 1c which is disposed on the rotational shaft 11, and a magnetic excitation part support 1a which attaches the slide rod 1h through the slit portion 1c. The number 1j represents a load cell and the number 1g represents a cooling fan fixed to the rotor.

Figure 2:
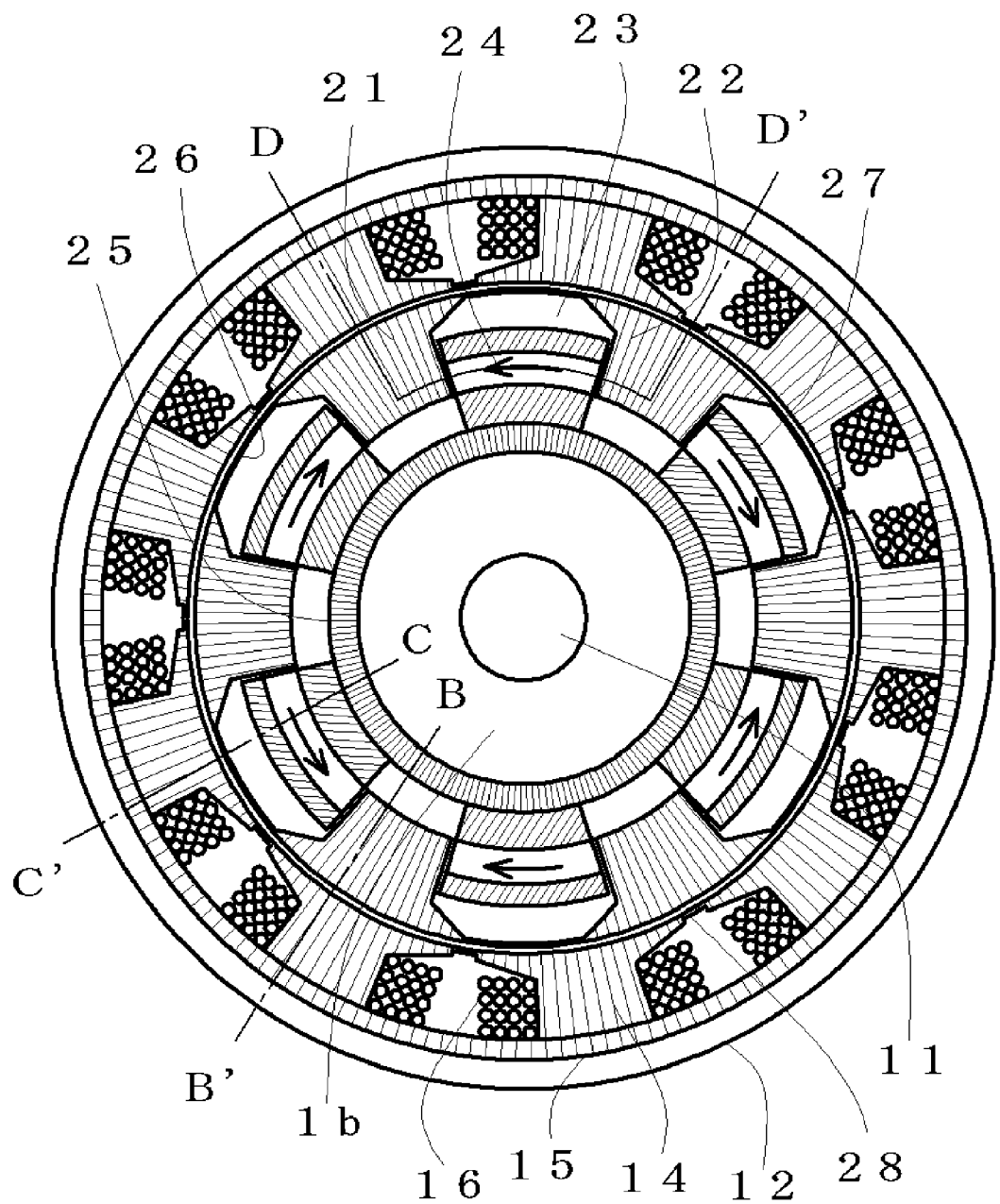
FIG. 2 is a sectional view showing an armature and a rotor of the rotating electric machine apparatus shown in FIG. 1.
Figure 3:
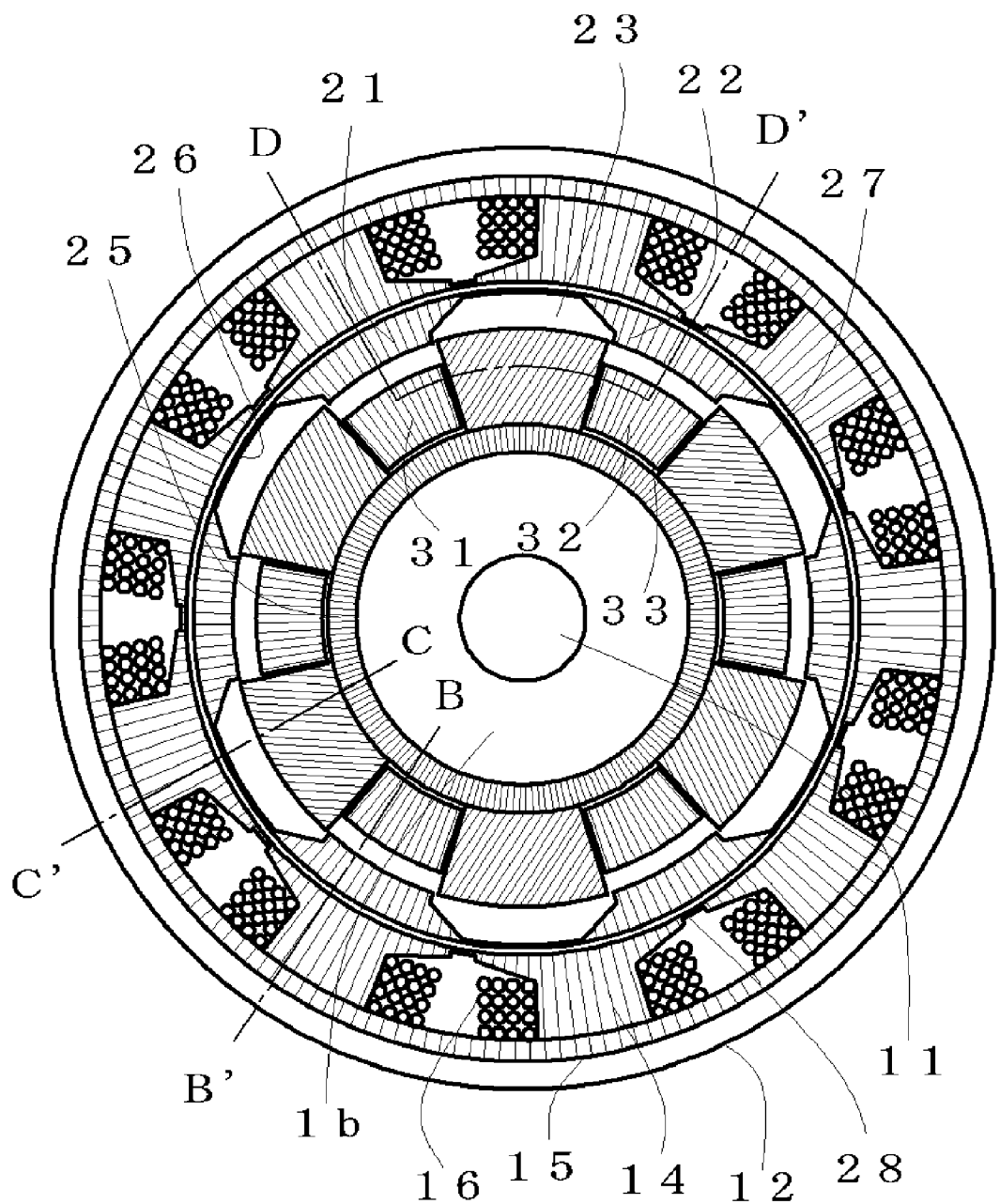
FIG. 3 is a sectional view showing an armature and a rotor of the rotating electric machine apparatus shown in FIG. 1.

FIGS. 2 and 3 show sectional views of the armature and the rotor along the A-A' in FIG. 1. The magnetic excitation part 18 is the composition that a field magnet and a nonmagnetic material have been arranged alternately axially, and FIG. 2 shows a sectional view of the armature and the rotor which includes the field magnet, and FIG. 3 shows a sectional view of the armature and the rotor which does not include the field magnet, and some component parts are appended with numbers for explaining the mutual relations.

The armature includes the cylindrical magnetic yoke 15 fixed to the housing 12, the plurality of magnetic teeth 14 extending radially from the cylindrical magnetic yoke 15 and having non-magnetic portions in a circumferential direction, and the armature coil 16 wound around the magnetic teeth 14. This embodiment includes nine armature coils 16, and three phases thereof are connected.

In the edges of the magnetic teeth 14 of the armature, saturable magnetic junctions 28 that are short in a radial direction are provided between the contiguous edges of the magnetic teeth 14. The magnetic teeth 14 and the saturable magnetic junctions 28 are punched out of a silicon steel plate by a predetermined die and stacked and wound with the armature coils 16, and then, combined with the cylindrical magnetic yoke 15, and thereby the armature is produced.

The saturable magnetic junctions 28 improve the support strength of the magnetic teeth 14 integrally with the magnetic teeth 14, and suppress unnecessary vibration of the magnetic teeth 14. The radial length of each of the saturable magnetic junctions 28 is set to be short, and thereby, the shape thereof that is easy to be magnetically saturated. Therefore, the junctions 28 are easy to be saturated with the magnetic flux generated by the armature coils 16 or the magnetic flux, and in such a case, the shorted amount of the magnetic flux generated by the armature coils 16 and the magnetic flux is made to be small. When a current is supplied to the armature coils 16, the saturable magnetic junctions 28 are magnetically saturated and then begin to leak the magnetic flux, along with time passing. The border of the effective non-magnetic portions appearing in the saturable magnetic junctions 28 that are magnetically saturated is not clear, and therefore, the distribution of the leaking magnetic flux becomes mild, and also in this point, the saturable magnetic junctions 28 contribute to the suppression of vibration with moderating time change of the force applied to the magnetic teeth 14.

In FIGS. 2 and 3, the magnetic field pole part 17 of the rotor consists of the surface magnetic pole part and the magnetic excitation part 18, and the surface magnetic pole part has a magnetic salient pole and a nonmagnetic portion arranged alternately in a circumferential direction at the opposing side to the armature. The adjacent magnetic salient poles are shown by numbers 21, 22, and the non-magnetic portions are shown by number 23. The magnetic salient poles 21, 22 that are conjugated by small width saturable magnetic junctions 26 are composed by punching out a silicon steel plate by a predetermined die and stacking the punched-out plates. The non-magnetic portion 23 is composed in non-magnetic resin or the like having large specific resistance.

Figure 4:
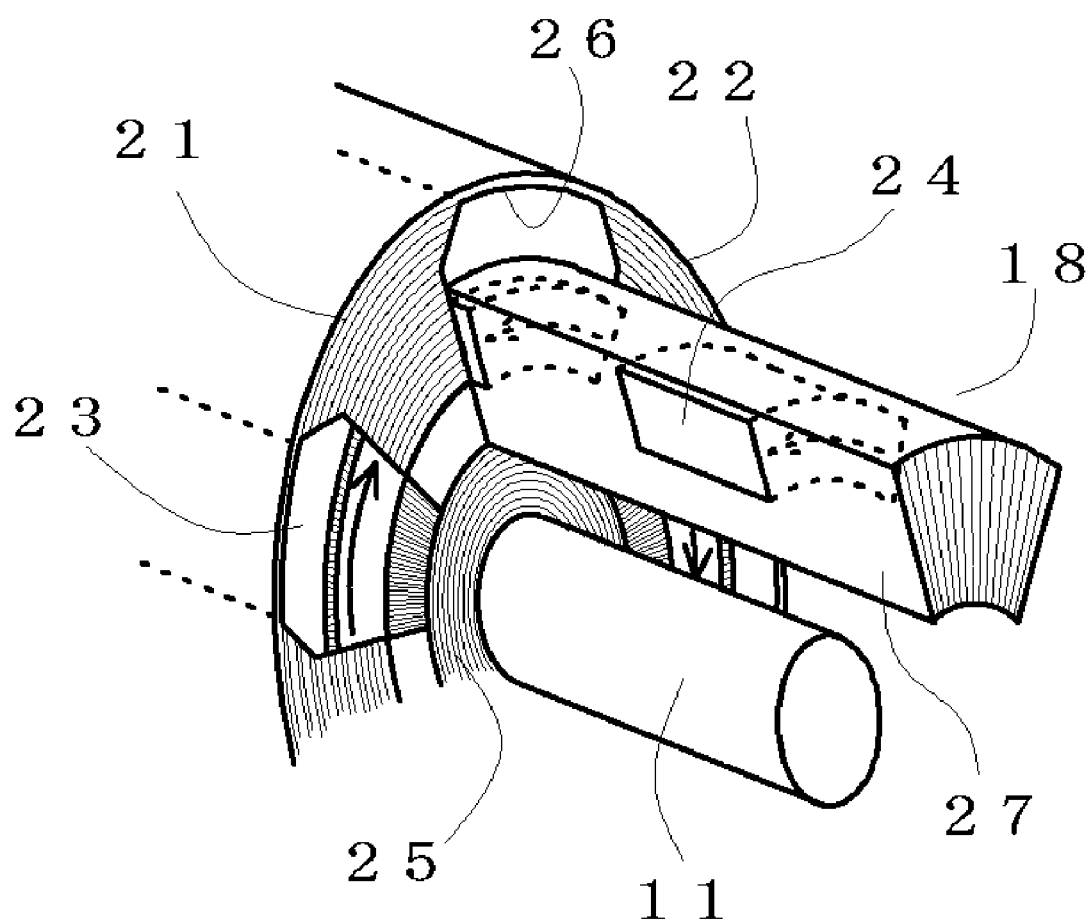
FIG. 4 is a perspective view showing the rotor composition of the rotating electric machine apparatus shown in FIG. 1.

The relation and composition of the surface magnetic pole part and the magnetic excitation part 18 are further explained also using FIGS. 4 and 5. FIG. 4 is a perspective view pulling out a part of the magnetic excitation part 18 so that three-dimensional composition may be easy to understand. FIG. 5(a) shows a longitudinal sectional view of the magnetic salient pole and the bypass magnetic pole along the B-B' in FIGS. 2 and 3, and FIG. 5(b) shows a longitudinal sectional view of the magnetic excitation part 18 along the C-C', and FIG. 5(c) shows a sectional view of the magnetic salient pole and the bypass magnetic pole and the magnetic excitation part 18 along the D-D'.

As shown in FIG. 5(a), an extension portion of the magnetic salient pole 21 has a periodic excision part in an axial direction, and a bypass magnetic pole 31 is arranged at the excision part. An extension portion of the magnetic salient pole 22 which neighbors circumferential direction is also the same composition, and a bypass magnetic pole 32 is arranged.

As shown in FIGS. 5(b) and 4, the magnetic excitation part 18 has the field magnet 24 and the non-magnetic material 27 alternately axially and is disposed so as to be slid axially between the adjacent magnetic salient poles 21 and 22 and between the adjacent bypass magnetic poles 31 and 32.

FIG. 5(c) is the sectional view which indicates a relation between the magnetic salient pole 21 extension, the magnetic salient pole 22 extension, the bypass magnetic poles 31 and 32, and the magnetic excitation part 18. The state in which both ends of the field magnet 24 face the magnetic salient pole 21 extension and the magnetic salient pole 22 extension, and also the bypass magnetic poles 31 and 32 is indicated in the figure.

As shown in FIGS. 2, 3, and 5(a), the bypass magnetic poles 31 and 32 are magnetically connected with a cylindrical base magnetic pole 25 through a minute gap 33.

Two magnetic flux pathways, a main magnetic flux pathway and a bypass magnetic pathway are connected to the field magnet 24 in parallel. The main magnetic flux pathway is the magnetic flux pathway where the magnetic flux from the one end of the field magnet 24 returns to the other end through the magnetic salient pole 21, the magnetic teeth 14, and the magnetic salient pole 22. The bypass magnetic flux pathway is the magnetic flux pathway where the magnetic flux from the one end of the field magnet 24 returns to the other end through the bypass magnetic pole 31, the cylindrical base magnetic pole 25, and the bypass magnetic pole 32. The opposite area of the field magnet 24 and the magnetic salient pole 21 extension, the magnetic salient pole 22 extension is changed by displacing the magnetic excitation part 18 axially, therefore the magnetic flux amount flowing through the main magnetic flux pathway can be controlled.

The number of field magnets contained in series in the bypass magnetic flux pathway and the main magnetic flux pathway is equal. Therefore a magnetic resistance of the bypass magnetic flux pathway is adjusted by an opposite area and a length in the gap 33 between the cylindrical base magnetic pole 25 and the bypass magnetic poles 31, 32, and is set to be approximately equal to a magnetic resistance of the main magnetic flux pathway. The magnetic resistance of the main magnetic flux pathway fluctuates according to relative position between the magnetic salient pole and the magnetic teeth, and therefore, the averaged magnetic resistance thereof is set to be approximately equal to the magnetic resistance of the bypass magnetic flux pathway.

In this embodiment, a length 54 of the field magnet 24 is set up equally to a distance 51 from the magnetic salient pole 21 extension left end to the bypass magnetic pole 31 left end, and a length 52 of the magnetic salient pole 21 extension and a length 53 of the bypass magnetic pole 31 are set up equally. The field magnet 24 is always opposite to the magnetic salient pole 21 extension and the bypass magnetic pole 31, and the displacement thereof is limited within the length 52. Therefore, a sum of the respective opposed areas of the magnetic salient pole 21 extension and the bypass magnetic pole 31 is constant, further magnetic resistances of the main magnetic flux pathway and the bypass magnetic flux pathway are set to be equal. Then the total of the magnetic flux amount from the field magnet 24 is maintained consistently constant, and therefore, magnetic force preventing the axial displacement of the magnetic excitation part does not appear theoretically.

In general, when a magnetic circuit including a magnet has a movable part, there is magnetic force of displacing the movable part to the direction in which magnetic flux quantity flowing through the magnetic circuit becomes large (the direction in which magnetic resistance becomes small). Preceding this invention, there are a lot of propositions which are going to short-circuit the field magnet, or are going to change a magnetic resistance of the magnetic flux pathway by mechanical means. The field magnet is a source for generating force or generating power in the rotating electric machine apparatus, and the magnetic force thereof is large, and therefore, precise magnetic flux control has been made difficult.

Figure 6A:
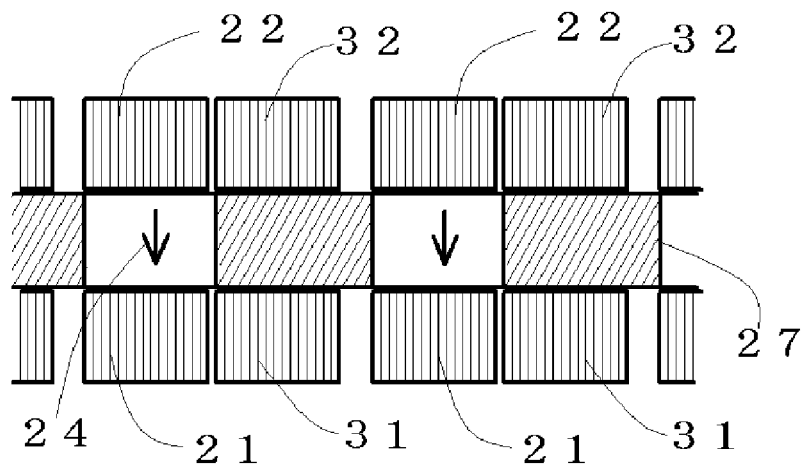
FIGS. 6(a), 6(b) are longitudinal sectional views showing relationship between the displaced magnetic excitation part and the magnetic salient pole of the rotating electric machine apparatus shown in FIG. 1.
Figure 6B:
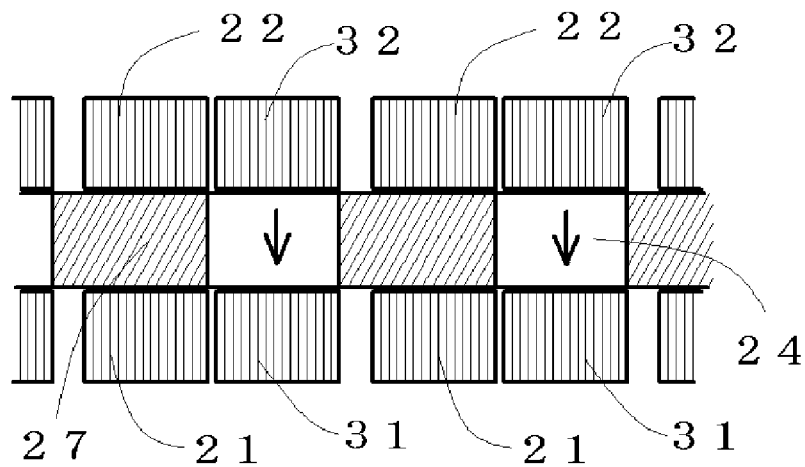

FIG. 6 shows the case where positions of the magnetic excitation part 18 differ corresponding to FIG. 5(c). FIG. 6(a) shows the case in which the field magnet 24 faces extension parts of the magnetic salient poles 21, 22 in the maximum area, and almost of magnetic flux thereof is flowing through the main magnetic flux pathway. FIG. 6(b) shows the case in which the field magnet 24 faces the bypass magnetic poles 31, 32 in the maximum area, and almost of magnetic flux thereof is flowing through the bypass magnetic flux pathway. In the intermediate state between the cases shown in FIGS. 6(a) and (b), the field magnet 24 is opposed to the magnetic salient poles 21, 22 and the bypass magnetic poles 31, 32, and the magnetic flux from the field magnet 24 is divided to flow into the main magnetic flux pathway according to the opposing area between the field magnet 24 and extension parts of the magnetic salient poles 21, 22.

In the case in which the field magnet is opposed to the magnetic salient pole extension and the bypass magnetic pole through magnetic material, the field magnet comes to be connected to a magnetic circuit composed of a magnetic resistance of the air gap portion between the magnetic material and (the magnetic salient pole extension and the bypass magnetic pole), the magnetic resistance of the main magnetic flux pathway and the bypass magnetic flux pathway, and so forth. The magnetic resistance in this magnetic circuit is changed along with displacement of the field magnet, and therefore, the total amount of the magnetic flux from the field magnets is changed and leads to appearance of the magnetic force preventing the field magnets being displaced.

Furthermore, it is difficult to constitute the magnetic resistance of the main magnetic flux pathway and the bypass magnetic flux pathway equally strictly. When a difference is in both magnetic resistances, and the field magnet opposes to the magnetic salient pole extension and the bypass magnetic pole through the magnetic material, the magnetic flux from the field magnet is divided in the above-mentioned magnetic material. Therefore the magnetic flux amount flowing through the main magnetic flux pathway does not become proportional to the opposite area between the field magnet and the magnetic salient pole extension, and the field strength control becomes difficult.

When the field magnet is opposed to the magnetic salient pole extension and the bypass magnetic pole through magnetic material because of the structural reason, the magnetic material having strong anisotropy or the magnetic material having thin thickness should be used as the magnetic material to prevent the magnetic flux from being divided to flow within the magnetic material. This structure is included in the theme of the present invention in the point that the magnetic flux is substantially divided to flow at an end face of the field magnet.

It has been explained that by displacing the magnetic excitation part 18, the magnetic flux flowing through the main magnetic flux pathway can be controlled. Hereinafter, by using FIG. 1, the structure in which the magnetic excitation part 18 is axially displaced will be explained.

Three of salient part of the magnetic excitation part support 1*a* are in contact with the slide rod 1*h* through three of the slit 1*c* set up to the rotational shaft 11. The slide rod 1*h* is constituted possible to slide in an axial direction in the hollow part of the rotational shaft 11, and is in contact with the push rod 1*e* of the actuator 1*f*. The magnetic excitation part support 1*a* is composed to be forced to the right direction by the spring 19, and forced to the left direction by the push rod 1*e* by the actuator 1*f*, and stops at the axial position in which the both forces are balanced. Therefore, the position of the field magnet 24 and the magnetic excitation part support 1*a* can be displaced by the actuator 1*f* in an axial direction.

The actuator 1*f* includes a stepping motor and a screw mechanism, and displaces the push rod 1*e* in an axial direction by driving the stepping motor, and maintains the axial position of the push rod 1*e* by stopping the stepping motor.

Although the magnetic resistance of the main magnetic flux pathway and the bypass magnetic flux pathway is adjusted equally, when some current is flowing into the armature coil, the magnetic resistance of the main magnetic flux pathway changes in an appearance. In case that the electric motor is driven in accelerating manner, the magnetic flux is pulled in the magnetic teeth, and then the amount of the magnetic flux in it becomes larger. In the inverse case, the magnetic flux is purged from the magnetic teeth, and then the amount of the magnetic flux in it becomes smaller. Therefore the magnetic resistance of the main magnetic flux pathway is viewed to be effectively smaller when the rotor is accelerated and larger when the rotor is decelerated. Furthermore, the magnetic resistance thereof will deviate with aging and a temperature change.

In this embodiment, magnetic field control is intermittently performed during operation of the rotating electric machine system as follows. The current of predetermined conditions is supplied to the armature coils to accelerate or to decelerate the rotor so that magnetic resistance of the main magnetic flux pathway and the bypass magnetic flux pathway becomes equal effectively, and simultaneously the actuator 1*f* is driven.

This embodiment also has the composition to acquire the above-predetermined conditions in learning way during operation of the rotating electric machine system, and becomes possible to adapt to the magnetic resistance change of the main magnetic flux pathway by various causes.

The composition and the procedure which acquire the predetermined current condition to adjust magnetic resistance of the main magnetic flux pathway effectively in learning way will be explained using FIGS. 1 and 7. The number 1*j* represents a load cell, and the load cell 1*j* detects force added to the push rod 1*e*.

After the actuator 1*f* displaced the magnetic excitation part 18 in axial direction to change the field strength, it maintains the location. When an electric current is supplied in the armature coil 16 to accelerate or to decelerate the rotor, magnetic resistance of the main magnetic flux pathway seems to be smaller or larger respectively. If a difference is in the magnetic resistance of the main magnetic flux pathway and the bypass magnetic flux pathway, the magnetic excitation part 18 will receive the magnetic force to displace to the direction which increases the opposite area between the field magnet 24 and the magnetic pole of the magnetic flux pathway with smaller magnetic resistance. The actuator 1*f* maintains the location, so the slide rod 1*h* and the push rod 1*e* will receive the magnetic force, and it is possible to detect the magnetic force by the load cell 1*j*.

Figure 7:
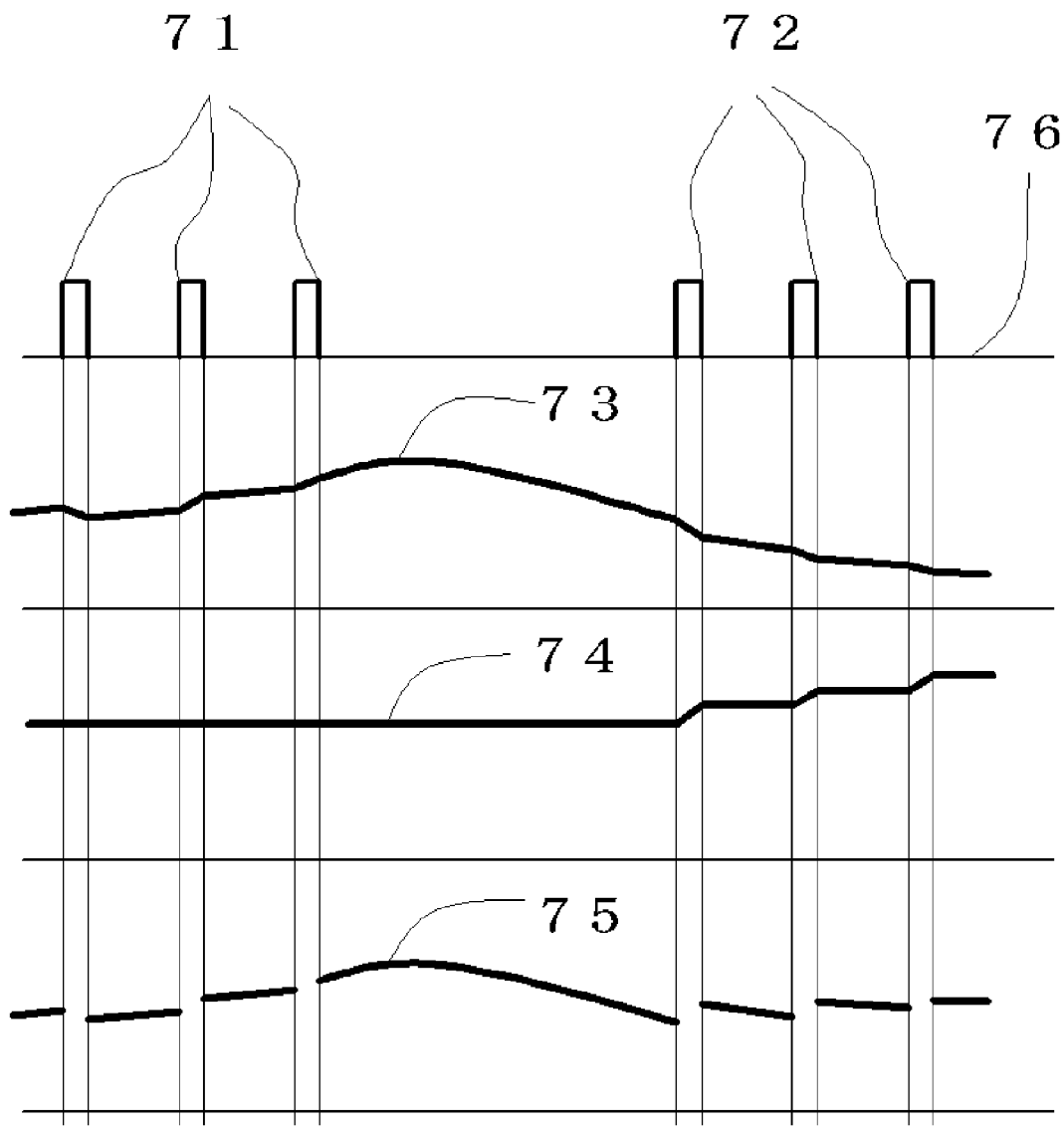
FIG. 7 is a time chart for acquiring the magnetic resistance adjustment conditions of the main magnetic flux pathway in learning way.

FIG. 7 shows the time chart that controls the field strength intermittently, and the horizontal axis 76 represents time. The number 71 represents a learning section, and the number 72 represents a field control section. During time except the learning section 71 and the field control section 72, the rotor is driven or generated power is taken out.

In the learning section 71, the control device drives the rotor by different current conditions and watches the load cell 1*j* output in the period. The current conditions from which the load cell 1*j* output becomes small are conditions which make equal effectively magnetic resistance of the main magnetic flux pathway and the bypass magnetic flux pathway, and the control device memorizes them or set them again as the predetermined current conditions.

The number 72 represents the field control section. The current is supplied to the armature coil 16 on the conditions acquired by the learning process, the actuator 1*f* is controlled simultaneously, and the magnetic excitation part 18 is made to displace in the axial direction. Because magnetic resistances of the main magnetic flux pathway and the bypass magnetic flux pathway are made effectual almost equal, the control by the actuator 1*f* is performed smoothly. In this case, the rotor is driven even for a short time, then the rotating speed 73 changes. The rotor is decelerated during the field control section 72, it is little, but the decelerated state is indicated by the rotating speed 73.

The number 74 represents a magnetic flux amount in the armature, and the actuator 1*f* maintains the axial position, so the magnetic flux amount 74 does not change during the learning section 71, but the state from which the magnetic flux amount 74 changes is indicated at the field control section 72.

The number 75 represents power generation voltage in the case when rotating electric machine apparatus is a generator. In the learning section 71 and the field control section 72, since electric power cannot be taken out, the state where the power generation voltage 75 has broken off is shown, and the state where the power generation voltage 75 is changing is shown by the around 72 field control sections.

In this embodiment, the rotating electric machine is set up so that magnetic resistance of the bypass magnetic flux pathway may become equal to magnetic resistance of the main magnetic flux pathway. Therefore the degree that the rotor is driven by the above-mentioned field control process is small.

Although the predetermined current conditions for adjusting the magnetic resistance of the main magnetic flux pathway effectively are acquired during the learning section 71 in this embodiment, the method of not setting up the learning section 71 in particular is also possible. For example, when the rotating electric machine apparatus is an electric motor, the relationship between the current supplied to the armature coils during normal operation and the load cell 1j output is always supervised, and the current conditions from which the load cell 1j output becomes smaller is made into the predetermined current conditions.

As described above, in the rotating electric machine apparatus shown in FIGS. 1 to 7, it has been explained that by displacing the magnetic excitation part 18 axially, the magnetic flux flowing in the armature can be controlled. The first embodiment is a system for optimizing the output by controlling the magnetic flux amount, and the control method as the rotating electric machine system will be explained by using FIG. 8.

Figure 8:
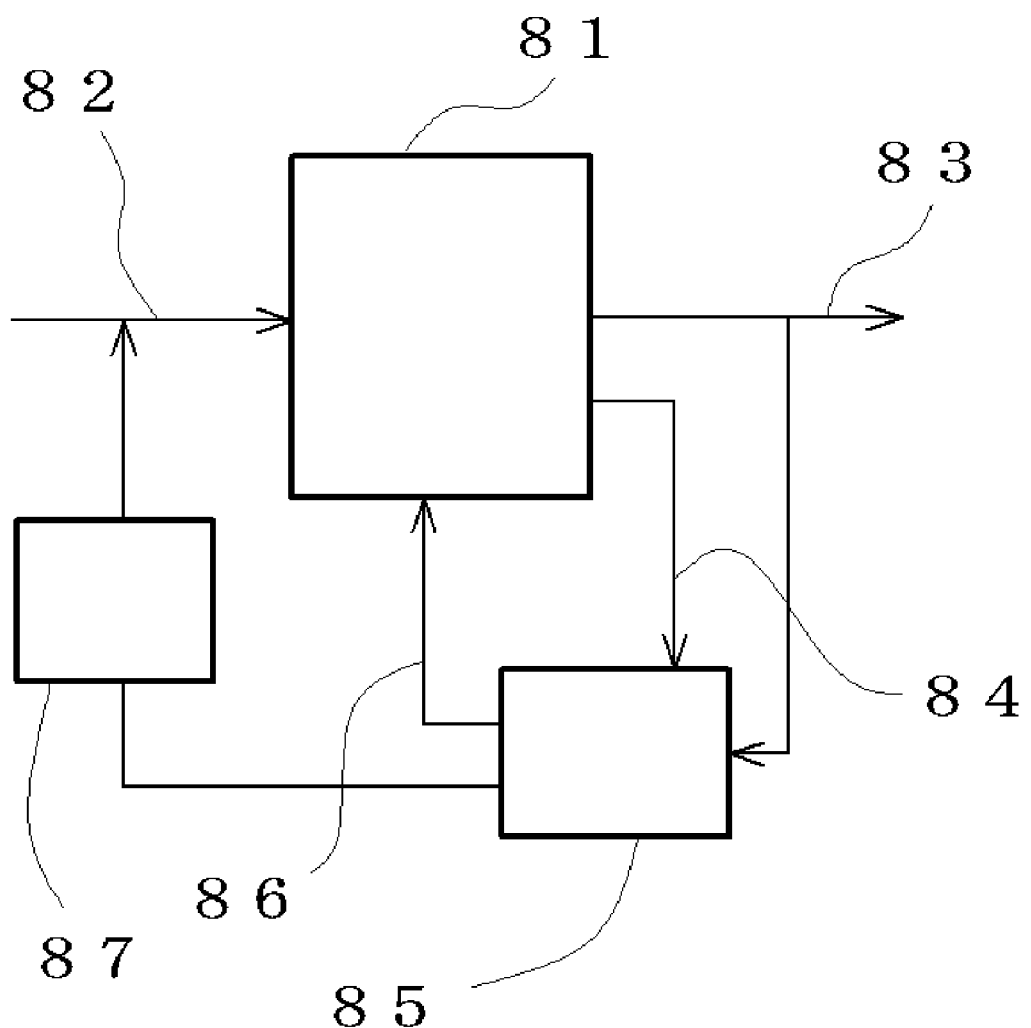
FIG. 8 is a block diagram of a rotating electric machine system for performing field-weakening control.

FIG. 8 shows a block diagram of the rotating electric machine system for controlling the field strength. In FIG. 8, the rotating electric machine apparatus 81 has an input 82 and an output 83, and a control device 85 controls the field strength of the rotating electric machine apparatus 81 through a control signal 86 referring to an output 83 of the rotating electric machine apparatus 81 and a state signal 84 including positions of the magnetic excitation part 18 that are in the movable magnetic pole part. The number 87 represents a driving circuitry of the armature coils 16. If the rotating electric machine apparatus 81 is used as an electric generator, the input 82 is a rotational force and the output 83 is the electric power. If the rotating electric machine apparatus 81 is used as an electric motor, the input 82 is a driving current supplied to the armature coils 16 from the driving circuitry 87 and the output 83 is a rotational torque or a rotational speed.

A rotating electric machine system in which the rotating electric machine apparatus serves as an electric motor and by which the field-weakening control is performed to optimize the rotational force control will be explained.

When the rotational speed that is the output 83 becomes larger than a predetermined value and the magnetic flux amount flowing in the armature is made to be smaller, the control device 85 supplies the predetermined current to the armature coil 16 through the driving circuitry 87 in the time zone of the field control section 72 so that magnetic resistances of the main magnetic flux pathway and the bypass magnetic flux pathway are effectively made equal, and simultaneously displaces the magnetic excitation part 18 rightward in FIGS. 4 and 5 through the actuator 1f by the control signal 86, and thereby, the opposed area between the magnetic salient pole 21 extension and the field magnet 24 is made to be smaller. After the displacement control is finished, the actuator 1f is stopped and the axial position of the magnetic excitation part 18 is maintained.

When the rotational speed that is the output 83 becomes smaller than a predetermined value and the magnetic flux amount flowing in the armature is made to be larger, the control device 85 supplies the predetermined current to the armature coil 16 through the driving circuitry 87 in the time zone of the field control section 72, and simultaneously displaces the magnetic excitation part 18 leftward in FIGS. 4 and 5 through the actuator 1f by the control signal 86, and thereby, the opposed area between the magnetic salient pole 21 extension and the field magnet 24 is made to be larger. After the displacement control is finished, the actuator 1f is stopped and the axial position of the magnetic excitation part 18 is maintained.

A constant-voltage power generation system in which the rotating electric machine apparatus serves as an electric generator and by which the field-weakening control is performed to control the power generation voltage to be a predetermined voltage will be explained.

When the power generation voltage that is the output 83 becomes larger than a predetermined value and the magnetic flux amount flowing in the armature is made to be smaller, the control device 85 supplies the predetermined current to the armature coil 16 through the driving circuitry 87 in the time zone of the field control section 72, and simultaneously displaces the magnetic excitation part 18 rightward in FIGS. 4 and 5 through the actuator 1f by the control signal 86, and thereby, the opposed area between the magnetic salient pole 21 extension and the field magnet 24 is made to be smaller. After the displacement control is finished, the actuator 1f is stopped and the axial position of the magnetic excitation part 18 is maintained.

When the power generation voltage becomes smaller than a predetermined value and the magnetic flux amount flowing in the armature is made to be larger, the control device 85 supplies the predetermined current to the armature coil 16 through the driving circuitry 87 in the time zone of the field control section 72, and simultaneously displaces the magnetic excitation part 18 leftward in FIGS. 4 and 5 through the actuator 1f by the control signal 86, and thereby, the opposed area between the magnetic salient pole 21 extension and the field magnet 24 is made to be larger. After the displacement control is finished, the actuator 1f is stopped and the axial position of the magnetic excitation part 18 is maintained.

As explained using the present embodiment, according to this invention, connecting two magnetic flux pathways, the main magnetic flux pathway and the bypass magnetic flux pathway, to the field magnet in parallel, the magnetic flux from the field magnet is made to shunt, and division ratio of the magnetic flux from the field magnet is changed by relative displacement between the field magnet and the magnetic flux pathways. Magnetic flux pathways are always connected to the field magnet, so even if the magnetic flux amount in the main magnetic flux pathway is changed, there is no concern made to demagnetize the field magnet. Moreover, the total amount of the magnetic flux which flows from the field magnet by setting magnetic resistance of two of magnetic flux pathways as predetermined conditions is always made constant, and then magnetic force preventing the mechanical displacement can be maintained small. Thereby, the field control in the main magnetic flux pathway can be smoothly performed.

It is important to establish magnetic resistances of the main magnetic flux pathway and the bypass magnetic flux pathway equally mostly, and the magnetic power disturbing the displacement can be suppressed small and the field control can be carried out smoothly. The meaning that is "equally mostly" is to establish both magnetic resistances so that the magnetic power may be suppressed below the output of the actuator used for the displacement. This embodiment indicates a system that has the function to adjust the magnetic resistance of the main magnetic flux pathway effectively, it is not necessary to set up strictly the magnetic resistance of the main magnetic flux pathway and the bypass magnetic flux pathway equally. The meaning "equally mostly" can be supposed that both magnetic resistance is set as the range made equally by adjusting the magnetic resistance of the main magnetic flux pathway effectively in this embodiment. But the rotor is accelerated or is decelerated during the process to which magnetic resistance of the main magnetic flux pathway is adjusted equally effectively, therefore, in the case with the great difference in both magnetic resistances, and the accelerated or decelerated degree of the rotor may become big. As for both magnetic resistances, it is desirable to set up as equally as possible.

It is important in this invention that a relation between magnetic resistances of the main magnetic flux pathway and the bypass magnetic flux pathway is set to be the predetermined relation. However, in the mass production stage, a difference may appear in the magnetic resistance of the main magnetic flux pathway and the bypass magnetic flux pathway by various tolerances of the settings required for the sizes of the parts. Moreover, the relative position between the surface magnetic pole part and the magnetic excitation part may influence the magnetic resistance of the main magnetic flux pathway and the bypass magnetic flux pathway. Furthermore, the permeability of the magnetic material that constitutes the magnetic flux pathway again tends to be influenced by temperature, and the magnetic resistance of the magnetic flux pathway may change. The means to acquire related parameters in learning way during operation and revise the magnetic resistance of the main magnetic flux pathway effectively can settle these problems effectively as it was explained in this embodiment.

Since the compensation means of the magnetic resistance of the main magnetic flux pathway adopted in the present embodiment are accompanied by rotor acceleration or rotor slowdown, when the field control continues over a long time, operation of rotating electric machine may be affected. But a change in the rotating speed and change control of the field strength are performed successively by a usual operational status, so it will not be a big problem. Moreover, in changing field strength more than a predetermined level, big trouble does not appear by taking in the technique of the sampling servo that carries out intermittently or is carried out to control of field strength at predetermined intervals.

When the magnetic resistance of the main magnetic flux pathway can be dedicated in tolerance level from a design value, the magnetic resistance adjustment of the main magnetic flux pathway during operation adopted in this embodiment can be made unnecessary. Moreover, when the magnetic resistance of the main magnetic flux pathway under operation does not shift from an initial state greatly, it is possible to adopt only initial adjustment just after assembly of the rotating electric machine apparatus and omit the learning process adopted in this embodiment. The magnetic resistance compensation method of the main magnetic flux pathway in this embodiment can be partially adopted according to the specification or the operating condition of the rotating electric machine apparatus for the optimal system.

The magnetic resistance of the bypass magnetic flux pathway is controlled by adjusting the opposed area and the length of the gap 33, but it is also possible that the magnetic resistance of the bypass magnetic flux pathway is controlled by winding a coil around the bypass magnetic flux pathway. The coil can control the magnetic resistance of the bypass magnetic flux pathway according to the use mode of the case such as the electric motor or the electric generator.

Generally, the magnetic resistance of the main magnetic flux pathway is not always constant, and it fluctuates according to the relative positions between the magnetic salient poles and the magnetic teeth. The magnetic resistance of the main magnetic flux pathway is equalized by reflection of the various relative positions between the magnetic salient poles and the magnetic teeth in the entire circumference, and also the displacement control of the magnetic excitation part 18 is slower than the rotational speed. Therefore the fluctuation of the magnetic resistance of the main magnetic flux pathway does not become an obstacle to the displacement control. However, the structure in which the side surfaces in the circumferential direction of the parts such as the magnetic teeth 14 and magnetic salient poles 21 are tapered, the structure in which widths in the circumferential direction of the parts are varied, or the like, has an advantage that the above-described fluctuation of the magnetic resistance is moderated. This is also desirable in the point that generation of vibration, sound, and so forth that can be generated during the rotation is suppressed.

Furthermore, in the present embodiment, the magnetic force is not generated when the magnetic excitation part 18 is displaced, but magnetic force except for the displacement direction is generated. If the magnetic excitation part 18 is displaced, magnetic force against the displacement in the axial direction does not appear, but the magnetic force between the field magnet 24 and the magnetic salient pole 21 extension, the bypass magnetic pole 31 appears, and changes according to the displacement. However, the force does not prevent the displacement because of the perpendicular relation to the displacement of the axial direction. The structural strength is set and treated under the assumption that the magnetic force between the field magnet 24 and the magnetic salient pole 21 extension, the bypass magnetic pole 31 fluctuates.

The rotating electric machine system according to a second embodiment of the present invention will be explained by using FIGS. 9 to 14. The second embodiment is a rotating electric machine system having a surface magnetic pole part and a magnetic excitation part as a magnetic field pole part of the rotor, and controlling the magnetic flux amount flowing through the armature by displacing the surface magnetic pole part in a circumference direction with respect to the magnetic excitation part intermittently.

Figure 9:
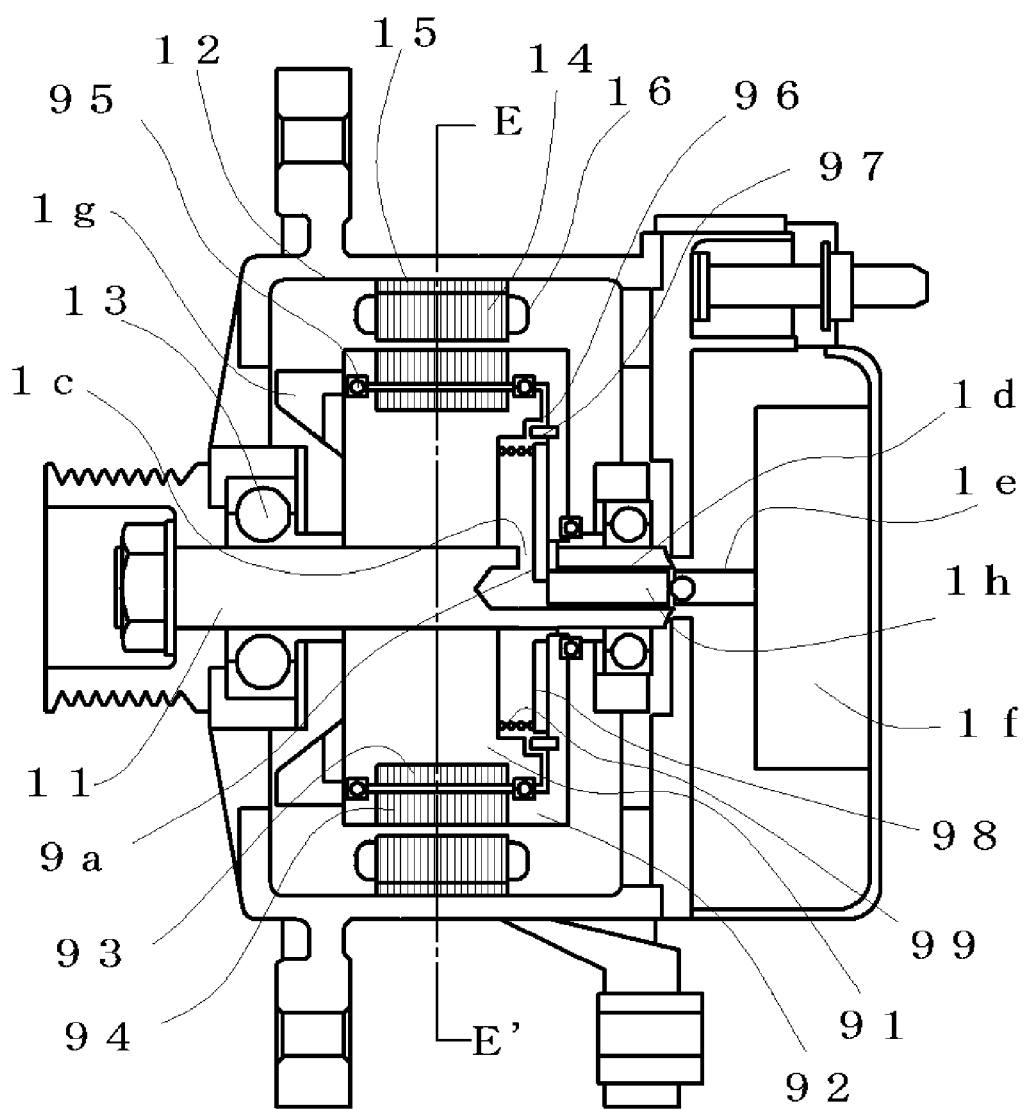
FIG. 9 is a longitudinal sectional view of the rotating electric machine apparatus according to the second embodiment of the present invention.

FIG. 9 shows the rotating electric machine apparatus having a radial gap structure, and the rotational shaft 11 is supported rotatably by the housing 12 through bearings 13. The composition of the armature is same as the first embodiment indicated in FIG. 1.

The magnetic field pole part of the rotor includes a surface magnetic pole part 94 opposing to the magnetic teeth 14 radially and a magnetic excitation part 93 facing the surface magnetic pole part 94 with a minute gap. The magnetic excitation part 93 is fixed to a rotor support 91, and the surface magnetic pole part 94 and a surface magnetic pole part support 92 are supported rotatably through bearings 95 by the rotor support 91 and the magnetic excitation part 93.

The rotational shaft 11 is a hollow structure and includes the slide rod 1h contained in the hollow, and the slide rod 1h is in contact with the push rod 1e of the actuator 1f. A spring 99 is disposed between a clutch plate 98 and the rotor support 91 so that the clutch plate 98 is composed to be forced to the surface magnetic pole part support 92. The clutch plate 98 has three salient parts 9a, and the salient parts 9a are in contact with an end of the slide rod 1h through the slits 1c set up to the rotational shaft 11. Then rotating torque is mutually transmitted between the rotational shaft 11 and the clutch plate 98 by the salient parts 9a and the slits 1c.

A concave portion 96 prepared in the rotor support 91 and a piece 97 fixed to the surface magnetic pole part support 92 constitute an engaging portion for a regulation means of the surface magnetic pole part support 92 displacement.

Figure 10:
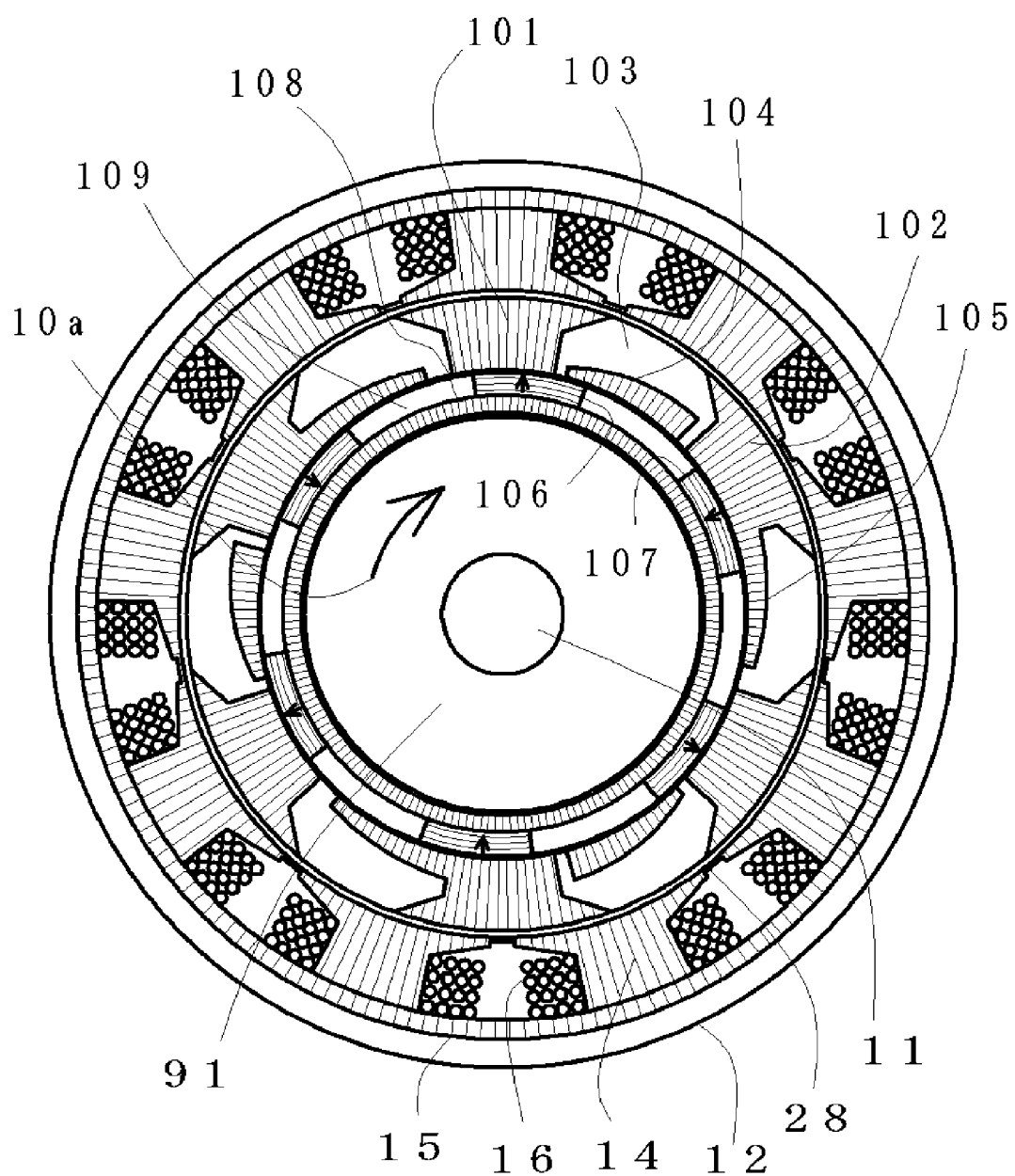
FIG. 10 is a sectional view showing the armature and the rotor of the rotating electric machine apparatus shown in FIG. 9.

FIG. 10 shows a sectional view of the armature and the rotor along the E-E' in FIG. 9, and some component parts are appended with numbers for explaining the mutual relations. The disposition of the armature is the same with the first embodiment and therefore the explanation thereof will be omitted.

In FIG. 10, the magnetic field pole part of the rotor includes the surface magnetic pole part 94 and the magnetic excitation part 93 with a minute gap. A first magnetic salient pole 101, a non-magnetic portion 103, a second magnetic salient pole 102, and a non-magnetic portion 103 are arranged in sequence in a circumferential direction opposing to the magnetic teeth 14. The number 10a represents rotating direction of the rotor.

The first magnetic salient pole 101 extension, a first bypass magnetic pole 104, the second magnetic salient pole 102 extension, and a second bypass magnetic pole 105 are arranged in sequence in a circumferential direction opposing to the magnetic excitation part 93. The first magnetic salient pole 101 extension and the second magnetic salient pole 102 extension are arranged at equal intervals. The first magnetic salient pole 101 extension, the first bypass magnetic pole 104 and the second magnetic salient pole 102 extension are separated magnetically each other, and the first bypass magnetic pole 104 and the second magnetic salient pole 102 extension are disposed through the minute gap. The second magnetic salient pole 102 extension and the second bypass magnetic pole 105 are combined, and are formed into continuation.

The first magnetic salient pole 101 extension, the first bypass magnetic pole 104 and the second magnetic salient pole 102 extension have to be separated magnetically each other, but can be combined by small width saturable magnetic junctions so that they are mechanically constituted firmly. The meaning of the saturable magnetic junctions is a magnetic material that has small cross-section area and is magnetically saturated easily. Specific permeability of saturated magnetic material is same as specific permeability of air, and the existence of saturated magnetic material can be ignored magnetically.

The first magnetic salient pole 101, the second magnetic salient pole 102 and the second bypass magnetic pole 105 are composed by punching out a silicon steel plate by a predetermined die and stacking the punched-out plates. The non-magnetic portion 103 is composed in non-magnetic resin or the like having large specific resistance. The slot of the cross-sectional shape of the first bypass magnetic pole 104 is formed in the portion which arranges the first bypass magnetic pole 104, and iron blocks are inserted in the slot.

The magnetic excitation part 93 includes a cylindrical magnetic core 108 fixed to the rotor support 91, and field magnets 106, 107 disposed on the cylindrical magnetic core 108. The number 109 represents non-magnetic gap avoiding magnetic flux short. Adjacent field magnets 106, 107 has inverse radial magnetization each other, and interval thereof is set to be equal to interval between extensions of the adjacent magnetic salient poles 101, 102. Arrows shown in field magnets 106, 107 indicate magnetization direction.

Figure 11:
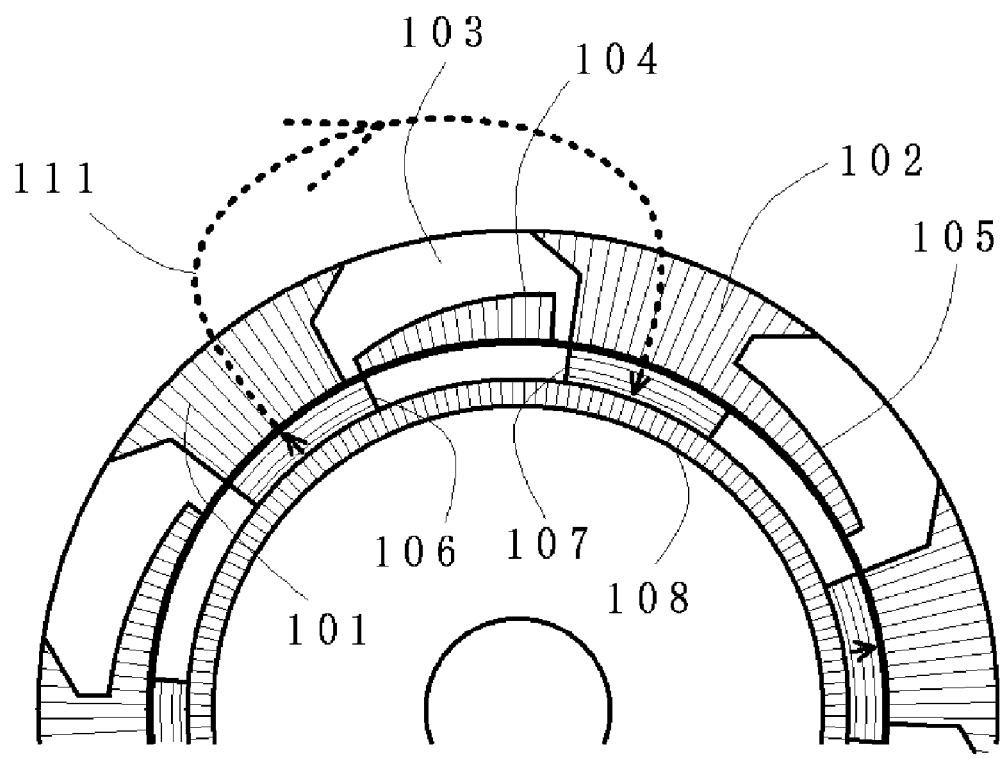
FIGS. 11(a), 11(b) are sectional views showing relationship between the displaced magnetic excitation part and the magnetic salient pole of the rotating electric machine apparatus shown in FIG. 9.
Figure 11:
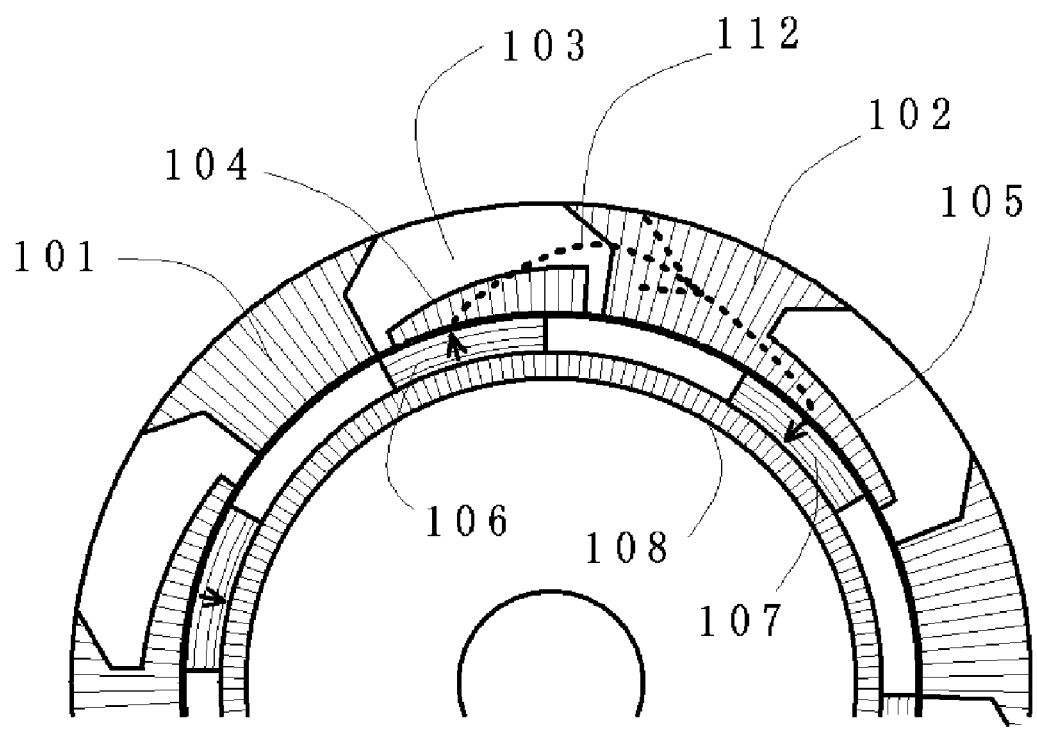

FIG. 11 is a part of the rotor sectional view shown in FIG. 10, and is a figure for explaining the operating principle that controls the magnetic flux amount flowing in the armature. FIGS. 11(a), 11(b), the respective figures show the cases in which the relative displacement between the surface magnetic pole part 94 and the magnetic excitation part 93 is minimum and maximum, respectively. That is, they show the cases in which the magnetic flux amount flowing in the armature are set to be maximum and minimum, respectively.

In FIG. 11(a), the field magnet 106 is opposed to the entire region of the first magnetic salient pole 101 extension and opposed slightly to the first bypass magnetic pole 104. The field magnet 106, the first magnetic salient pole 101, the magnetic teeth 14, the second magnetic salient pole 102, the field magnet 107, and the cylindrical magnetic core 108 form a main magnetic flux pathway 111 of the field magnet 106. In this case, the approximately entire amount of the magnetic flux from the field magnet 106 flows into the magnetic teeth 14.

In FIG. 11(b), the field magnet 106 is opposed to the entire region of the first bypass magnetic pole 104 and opposed slightly to the first magnetic salient pole 101 extension. The field magnet 106, the first bypass magnetic pole 104, the second magnetic salient pole 102 extension, the second bypass magnetic pole 105, the field magnet 107, and the cylindrical magnetic core 108 form a bypass magnetic flux pathway 112 of the field magnet 106. In this case, the approximately entire amount of the magnetic flux from the field magnet 106 flows through the bypass magnetic flux pathway 112.

The magnetic flux from the field magnet 106 flows to the direction which crosses at right angles with the end face of the field magnet 106, and flows into the first magnetic salient pole 101 extension and the first bypass magnetic pole 104 according to the respective opposing area with the field magnet 106. Since related parameters are set so that magnetic resistances of the main magnetic flux pathway and the bypass magnetic flux pathway are almost equal, sum of the magnetic flux amount flowing through the main magnetic flux pathway and the bypass magnetic flux pathway is consistently constant.

For setting up magnetic resistances of the main magnetic flux pathway 111 and the bypass magnetic flux pathway 112 equally, a gap length and an opposite area between the first bypass magnetic pole 104 and the second magnetic salient pole 102 extension are adjusted. Dominant parameters of magnetic resistance of the magnetic flux pathway are the gap length and the opposite area of the gap area. The main magnetic flux pathway 111 include magnetic gaps between the magnetic salient pole 101 and the magnetic teeth 14, and between the magnetic salient pole 102 and the magnetic teeth 14, and their opposing area are wider than the opposing area between the first bypass magnetic pole 104 and the second magnetic salient pole 102 extension. The gap length between the first bypass magnetic pole 104 and the second magnetic salient pole 102 extension is set minute so that magnetic resistances of the main magnetic flux pathway 111 and the bypass magnetic flux pathway 112 can be equal. Since the first bypass magnetic pole 104 is constituted from a block of iron with large saturation magnetic flux density, even if it makes the first bypass magnetic pole 104 small, it cannot be saturated furthermore easily magnetically.

The maximum of relative displacement between the surface magnetic pole part 94 and the magnetic excitation part 93 is the circumferential length of the first magnetic salient pole 101 extension, and is a case where it is shown in FIG. 11(b). The field control is also possible by any more displacement, but the proportionality relation of the displacement and magnetic flux amount flowing the main magnetic flux pathway 111 becomes unfixed, and the field control becomes complex.

In this embodiment, the displacement between the surface magnetic pole part 94 and the magnetic excitation part 93 is regulated below the circumferential length of the magnetic salient pole 101 extension by the concave portion 96 and the piece 97 fixed to the surface magnetic pole part support 92.

Figure 12:
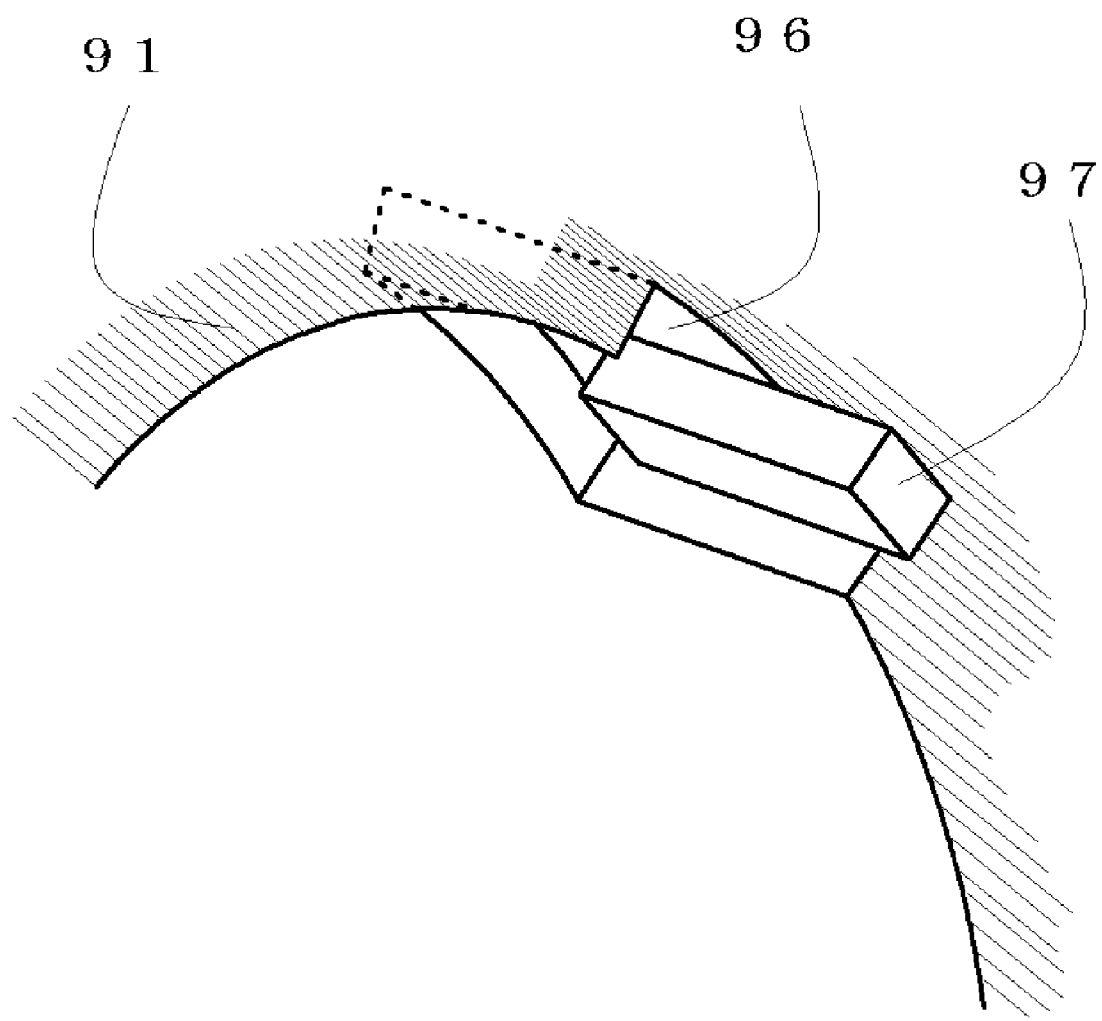
FIG. 12 is a perspective view showing a connection part between the rotor and the surface magnetic pole part of the rotating electric machine apparatus shown in FIG. 9.

FIG. 12 is a magnified perspective view showing the concave portion 96 prepared at an end of the rotor support 91 and the piece 97 fixed to the surface magnetic pole part support 92. In the figure, the piece 97 is arranged in the concave portion 96, and the displacement between the surface magnetic pole part 94 and the magnetic excitation part 93 is regulated. The case when the piece 97 touches the right side wall in the concave portion 96, the case when the piece 97 touches the left side wall in the concave portion 96 corresponds to FIGS. 11(*a*), 11(*b*) respectively.

As shown in FIGS. 11(*a*), 11(*b*), when increasing the magnetic flux in the main magnetic flux pathway 111, the surface magnetic pole part 94 is made to be displaced in a clockwise direction so that the opposing area between the field magnet 106 and the magnetic salient pole 101 extension becomes larger. And when decreasing the magnetic flux in the main magnetic flux pathway 111, the surface magnetic pole part 94 is made to be displaced in a counterclockwise direction so that the opposing area between the field magnet 106 and the magnetic salient pole 101 extension becomes smaller. The relation between the fluctuation direction of the magnetic flux in the main magnetic flux pathway 111 and the displacement direction of the surface magnetic pole part 94 always becomes settled, and the control can be made simple.

The displacement control of the surface magnetic pole part 94 will be explained using FIG. 9. In the figure, the clutch plate 98 is forced in contact with the surface magnetic pole part support 92 by the spring 99, and the salient parts 9*a* thereof are engaged with the slits 1*c* set up to the rotational shaft 11. Therefore, the surface magnetic pole part support 92 and the surface magnetic pole part 94 are rotating with the rotational shaft 11 and the rotor support 91.

When displacing the surface magnetic pole part 94 rotationally with respect to the rotor support 91, displacing the push rod 1*e* and the slide rod 1*h* and the salient parts 9*a* leftward by the actuator 1*f*, shortening the spring 99, making the clutch plate 98 separate from the surface magnetic pole part support 92, and the surface magnetic pole part 94 is made free in the state which can rotate. The surface magnetic pole part 94 is driven to rotate by a drive control circuit (not shown in figures) simultaneously. The surface magnetic pole part 94 and the surface magnetic pole part support 92 are in free, and their total mass is small, the surface magnetic pole part 94 is driven by the drive control circuit in acceleration or deceleration manner, and is displaced with respect to the magnetic excitation part 93. After displacing the surface magnetic pole part 94, the push rod 1*e* and the slide rod 1*h* are driven rightward by the actuator 1*f*, and the clutch plate 98 is forced in contact with the surface magnetic pole part support 92 by the spring 99.

In the first embodiment, it is supposed as the actuator 1*f* that it constitutes from a stepping motor and a screw mechanism. In this embodiment, since it is the composition of driving the push rod 1*e* leftward only when changing the surface magnetic pole part 94 into a free state to rotate, the composition by a solenoid coil is suitable.

Driving the surface magnetic pole part 94 in acceleration or deceleration manner is carried out by supplying the current to the armature coils 16 according to relation between the magnetic salient pole 101 position and the magnetic teeth 14 position. The method thereof is common knowledge as the drive method of an electric motor, and further explanation about the supply current timing and the method is omitted.

In this embodiment, as shown in FIG. 10, the surface magnetic pole part 94 includes the magnetic salient pole and the non-magnetic portion alternately in a circumferential direction, therefor a magnet torque and a reluctance torque can be used in case of an electric motor. Both of the magnet torque and the reluctance torque can be utilized in displacing the surface magnetic pole part 94, it is desirable to adjust the supply current timing so as to adopt mainly the reluctance torque.

The reason for mainly adopting the reluctance torque for the displacement control is because the magnet torque cannot be used, for example, when magnetic flux flowing through the main magnetic flux pathway 111 is near the zero corresponding to FIG. 11(*b*).

In case that the rotating electric machine apparatus serves as an electric motor, the appropriate current has to be supplied to the armature coil 16 according to the relation between the magnetic teeth 14 position and the magnetic salient pole 101 position for driving the rotor to rotate. When the driving current supplied into armature coil 16 is a sine wave, FIG. 13 indicates a relation with the supplied current phase, the magnet torque and the reluctance torque.

Vertical axis 134 indicates the torque that drives the rotor and transverse 135 indicates the driving current phase. The number 131, 132, 133 represent the magnet torque, the reluctance torque, the synthetic torque of the magnet torque and the reluctance torque, respectively. Important points are, based on the phase to maximize the magnet torque 131, the reluctance torque 132 becomes the maximum with the phase advanced 45 degrees, and the synthetic torque 133 becomes the maximum with the phase between 0 and advanced 45 degrees.

Figure 13:
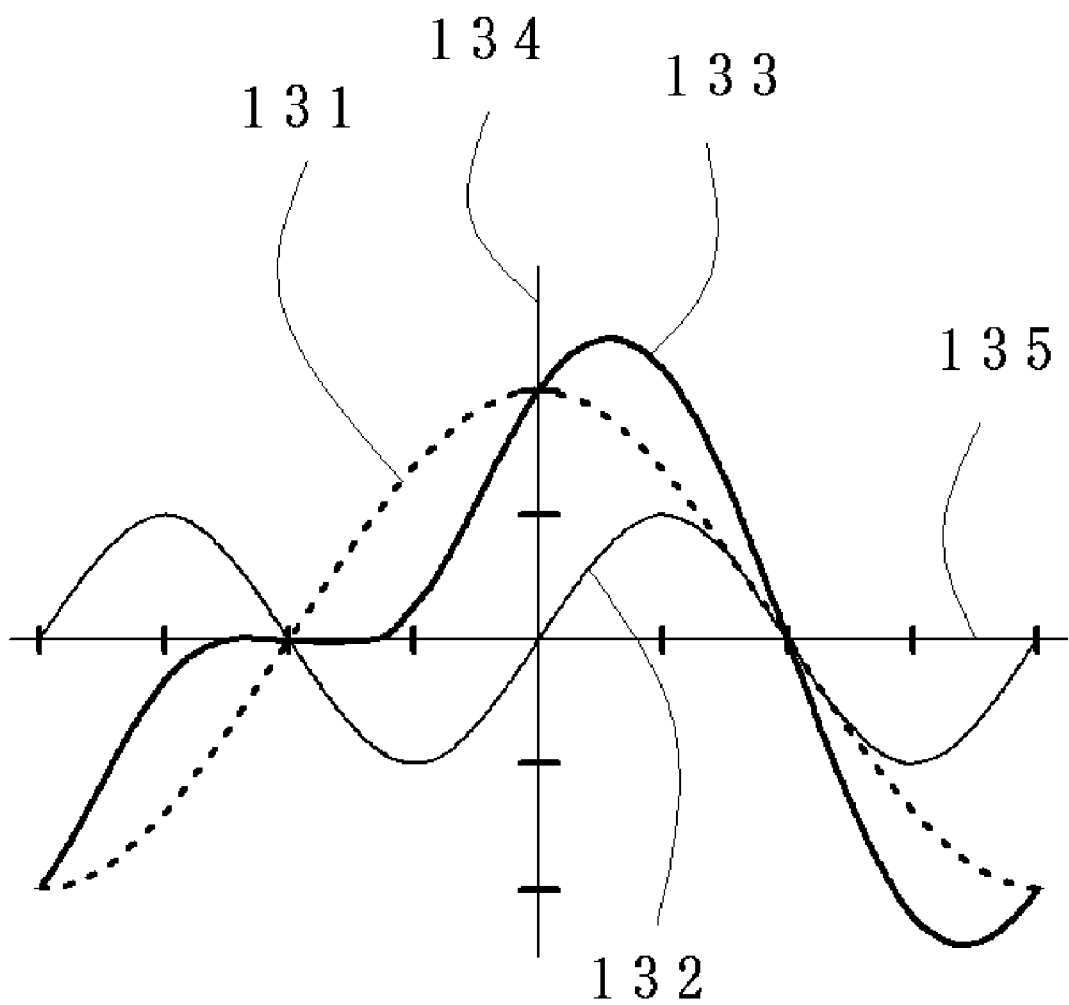
FIG. 13 is a diagram showing relationship between a driving current phase and a magnetic torque, a reluctance torque.

Although FIG. 13 shows the case of a sine wave drive, there is no change in advancing the drive current phase for using the reluctance torque also in case of pulse shape current drive. Adjusting timing of the pulse shape current supplied to the armature coils 16, the reluctance torque can be utilized for displacing the surface magnetic pole part 94.

As described above, in the rotating electric machine apparatus shown in FIGS. 9 to 13, it has been explained that by relatively displacing the surface magnetic pole part 94 with respect to the magnetic excitation part 93, the magnetic flux flowing through the main magnetic flux pathway can be controlled at almost 100%, and furthermore, the means and the method for above displacement have been explained. The second embodiment is a system for optimizing the output by controlling the magnetic flux flowing through the main magnetic flux pathway like a sampling servo, and the control method as the rotating electric machine system will be explained by using FIGS. 8 and 14.

Figure 14:
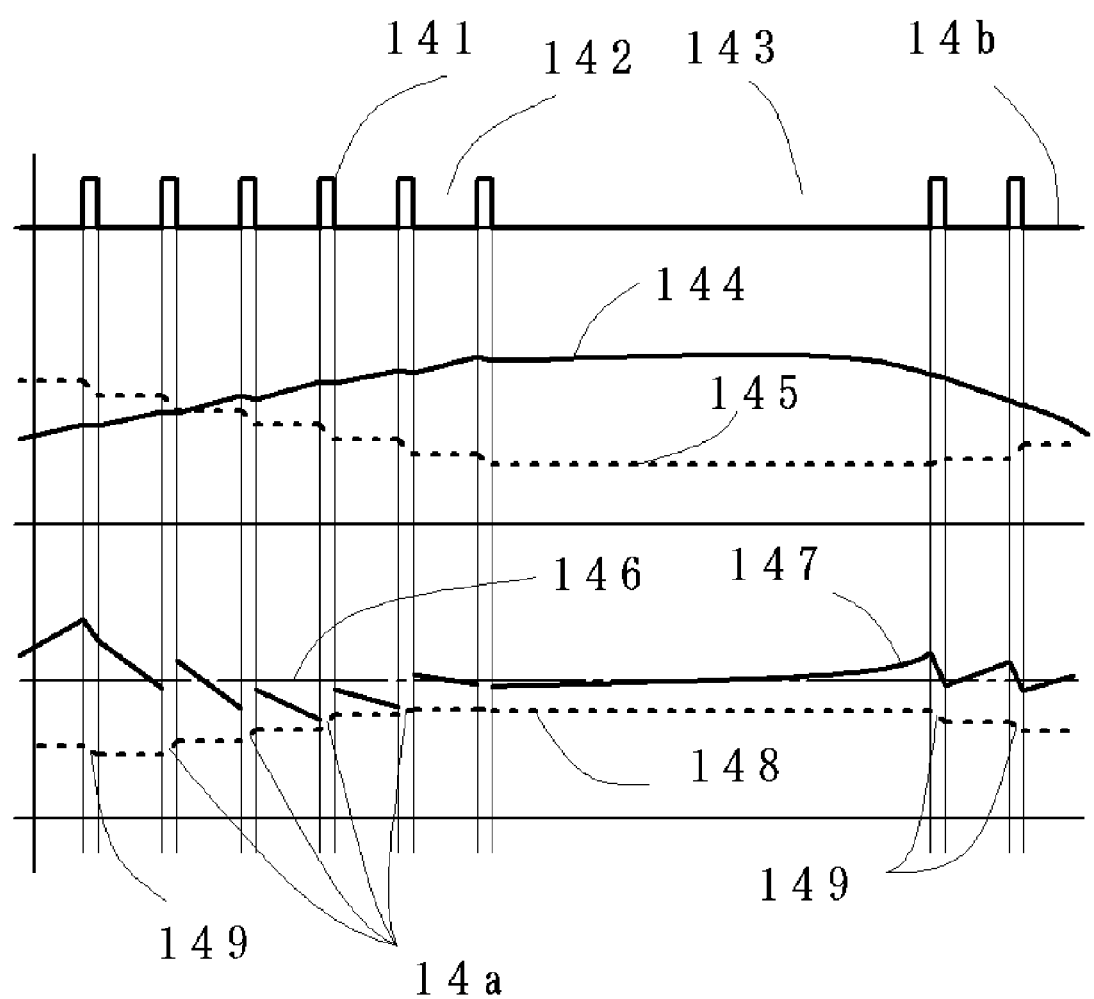
FIG. 14 is a time chart for performing field-weakening control intermittently.

FIG. 8 shows a block diagram of the rotating electric machine system for controlling the field strength. FIG. 14 shows the timing chart which controls the torque of an electric motor and controls the generated voltage of an electric generator by controlling the surface magnetic pole part 94 displacement in sampling way.

A rotating electric machine system in which the rotating electric machine apparatus serves as an electric motor and by which the field-weakening control is performed to optimize the rotational force control will be explained. In this embodiment, only when the field control is necessary, the field control and the rotation drive are repeated alternately by a predetermined period.

FIG. 14 indicates the time chart which performs the field control in sampling way in which the horizontal axis 14b indicates time, the number 141 indicates time zone to perform the field control, and the number 142 indicates time zone to perform the rotational drive control. In the time zone 143, the field control is not performed but only the rotational drive control is performed.

When the rotational speed that is the output 83 becomes larger than a predetermined value and the magnetic flux amount flowing through the main magnetic flux pathway is made to be smaller, the control device 85 displaces the push rod 1*e*, the slide rod 1*h* and the clutch plate 98 leftward through the actuator 1*f*, and makes the surface magnetic pole part 94 free in rotation during the time zone of the field control section 141, and simultaneously supplies the current to the armature coil 16 through the driving circuitry 87 so as to drive the surface magnetic pole part 94 to the opposite direction of 10a (counterclockwise in FIG. 10). The drive control circuit 87 returns to the normal rotational operation with the end of the time zone 141, and the control device 85 makes the actuator 1f displace the push rod 1e, the slide rod 1h and the clutch plate 98 rightward. Thereby, the opposed area between the magnetic salient pole 101 extension and the field magnet 106 is made to be smaller.

When the rotational speed that is the output 83 becomes smaller than a predetermined value and the magnetic flux amount flowing through the main magnetic flux pathway is made to be larger, the control device 85 displaces the push rod 1e, the slide rod 1h and the clutch plate 98 leftward through the actuator 1f, and makes the surface magnetic pole part 94 free in rotation during the time zone of the field control section 141, and simultaneously supplies the current to the armature coil 16 through the driving circuitry 87 so as to drive the surface magnetic pole part 94 to the direction of 10a (clockwise in FIG. 10). The drive control circuit 87 returns to the normal rotational operation with the end of the time zone 141, and the control device 85 makes the actuator 1f displace the push rod 1e, the slide rod 1h and the clutch plate 98 rightward. Thereby, the opposed area between the magnetic salient pole 101 extension and the field magnet 106 is made to be larger. In FIG. 14, the number 144 indicates the rotational speed, and the number 145 indicates the magnetic flux amount flowing through the main magnetic flux pathway. During the time zone 141 for the field control, driving torque is not transmitted to the rotor, then it is shown that the rotational speed 144 falls slightly and the magnetic flux amount 145 is changed.

A constant-voltage power generation system in which the rotating electric machine apparatus serves as an electric generator and by which the field-weakening control is performed to control the power generation voltage to be predetermined voltage will be explained. During the surface magnetic pole part 94 is driven to displace by the driving circuitry 87, generated electric power cannot be taken out. In this embodiment, only when the field control is necessary, the field control is repeated by predetermined period, and further only when making the surface magnetic pole part 94 displace to the rotating direction 10a, the current is supplied to the armature coil 16, and duration that generated electric power can be taken out is made into the maximum.

In FIG. 14, the horizontal axis 14b indicates time, the number 141 indicates time zone to perform the field control. In the time zone 143, the field control is not performed but only generated electric power is taken out.

When the power generation voltage that is the output 83 becomes larger than a predetermined value and the magnetic flux amount flowing through the main magnetic flux pathway is made to be smaller, the control device 85 displaces the push rod 1e, the slide rod 1h and the clutch plate 98 leftward through the actuator 1f, and makes the surface magnetic pole part 94 free in rotation during the time zone of the field control section 141, and the surface magnetic pole part 94 is made displace relatively in an inverse direction of rotation 10a (counterclockwise in FIG. 10) by the repulsive force between the surface magnetic pole part 94 and the armature. The control device 85 makes the actuator 1f displace the push rod 1e, the slide rod 1h and the clutch plate 98 rightward with the end of the time zone 141. Thereby, the opposed area between the magnetic salient pole 101 extension and the field magnet 106 is made to be smaller. In FIG. 14, the number 146 indicates the predetermined voltage, and the number 147 indicates generation voltage, and the number 148 indicates the magnetic flux amount flowing through the main magnetic flux pathway. The number 149 indicates examples which the magnetic flux amount is decreased, the driving circuitry 87 does not supply the current to the armature coil 16, so generated electric power can be taken out. And it is shown that the magnetic flux amount 145 is decreased.

When the power generation voltage that is the output 83 becomes smaller than a predetermined value and the magnetic flux amount flowing through the main magnetic flux pathway is made to be larger, the control device 85 displaces the push rod 1e, the slide rod 1h and the clutch plate 98 leftward through the actuator 1f, and makes the surface magnetic pole part 94 free in rotation during the time zone of the field control section 141, and simultaneously supplies the current to the armature coil 16 through the driving circuitry 87 so as to drive the surface magnetic pole part 94 to the direction of 10a (clockwise in FIG. 10). The control device 85 makes the drive control circuit 87 disconnect with the end of the time zone 141, and makes the actuator 1f displace the push rod 1e, the slide rod 1h and the clutch plate 98 rightward. Thereby, the opposed area between the magnetic salient pole 101 extension and the field magnet 106 is made to be larger. In FIG. 14, the number 14a indicates examples which the magnetic flux amount is increased, the driving circuitry 87 supplies the current to the armature coil 16, so generated electric power cannot be taken out. And it is shown that the magnetic flux amount 145 is increased and the generation voltage 147 has broken off.

In sampling control of the field strength indicated above, time width of the time zone 141 for the field control is set up in consideration of mass of the surface magnetic pole part 94 and the surface magnetic pole part support 92, and output power for making displacement. The interval of the time zone 141 is set up in consideration of allowable accuracy of the magnetic flux amount. It is difficult to actually grasp the magnetic flux amount directly, the interval of the time zone 141 is set by considering allowable accuracy of the generation voltage.

In this embodiment, the sampling cycle of the field control is established by time interval, but it is also possible to make the rotational period of the rotor as the standard. In this case, a sampling period changes by rotation speed fluctuation, this may be more appropriate thinking from the coordinate system on the rotor. Assuming that field control is conducted in the specific circumferential position of the rotor, the composition which applies some kind of linkage mechanism instead of the actuator 1f, and separates the clutch plate 98 from the surface magnetic pole part support 92 at specific circumferential points may be adopted.

Although, in this embodiment, the mechanism including the clutch plate as a position maintaining mechanism in which the relative position of the surface magnetic pole part with respect to the magnetic excitation part is held and is changed was adopted, this is an example, and it is possible to compose using braking mechanism or a detent mechanism, etc.

The rotating electric machine system according to a third embodiment of the present invention will be explained by using FIGS. 15 to 17. The third embodiment is a rotating electric machine system having a surface magnetic pole part that magnetic salient poles and permanent magnets are disposed one after the other in a circumferential direction and are disposed so that the adjacent magnetic salient poles are excited in a different polarities each other, and controlling the magnetic flux amount flowing through the armature by displacing the surface magnetic pole part in a circumferential direction with respect to a magnetic excitation part. Combination of an external actuator and an oblique groove is used as means to maintain relative position of the surface magnetic pole part.

Figure 15:
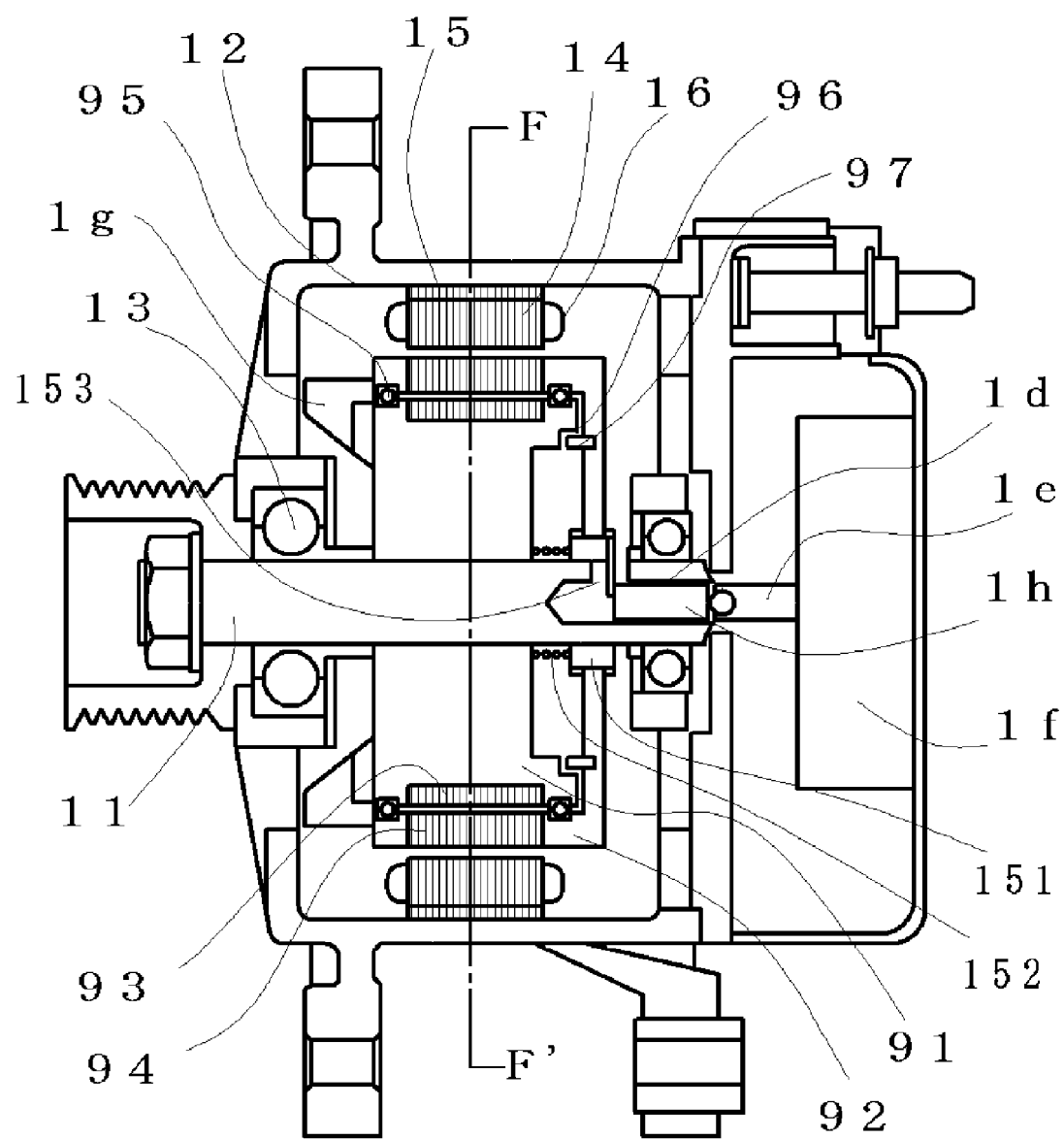
FIG. 15 is a longitudinal sectional view of the rotating electric machine apparatus according to the third embodiment of the present invention.

FIG. 15 shows the rotating electric machine apparatus having a radial gap structure, and the rotational shaft 11 is supported rotatably by the housing 12 through bearings 13. The composition of the armature is same as the first embodiment.

The magnetic field pole part of the rotor includes the surface magnetic pole part 94 opposing to the magnetic teeth 14 radially and the magnetic excitation part 93 facing the surface magnetic pole part 94 with a minute gap. The magnetic excitation part 93 is fixed to the rotor support 91, and the surface magnetic pole part 94 and a surface magnetic pole part support 92 are supported rotatably through bearings 95 by the rotor support 91 and the magnetic excitation part 93.

A position maintaining mechanism to maintain the relative position of the surface magnetic pole part 94 includes a cylindrical sleeve 151 disposed possible to slide at the rotational shaft 11 outside, a spring 152, an oblique groove 153 set up to the rotational shaft 11, the push rod 1e, the slide rod 1h, and the actuator 1f fixed to the housing 12.

Figure 16:
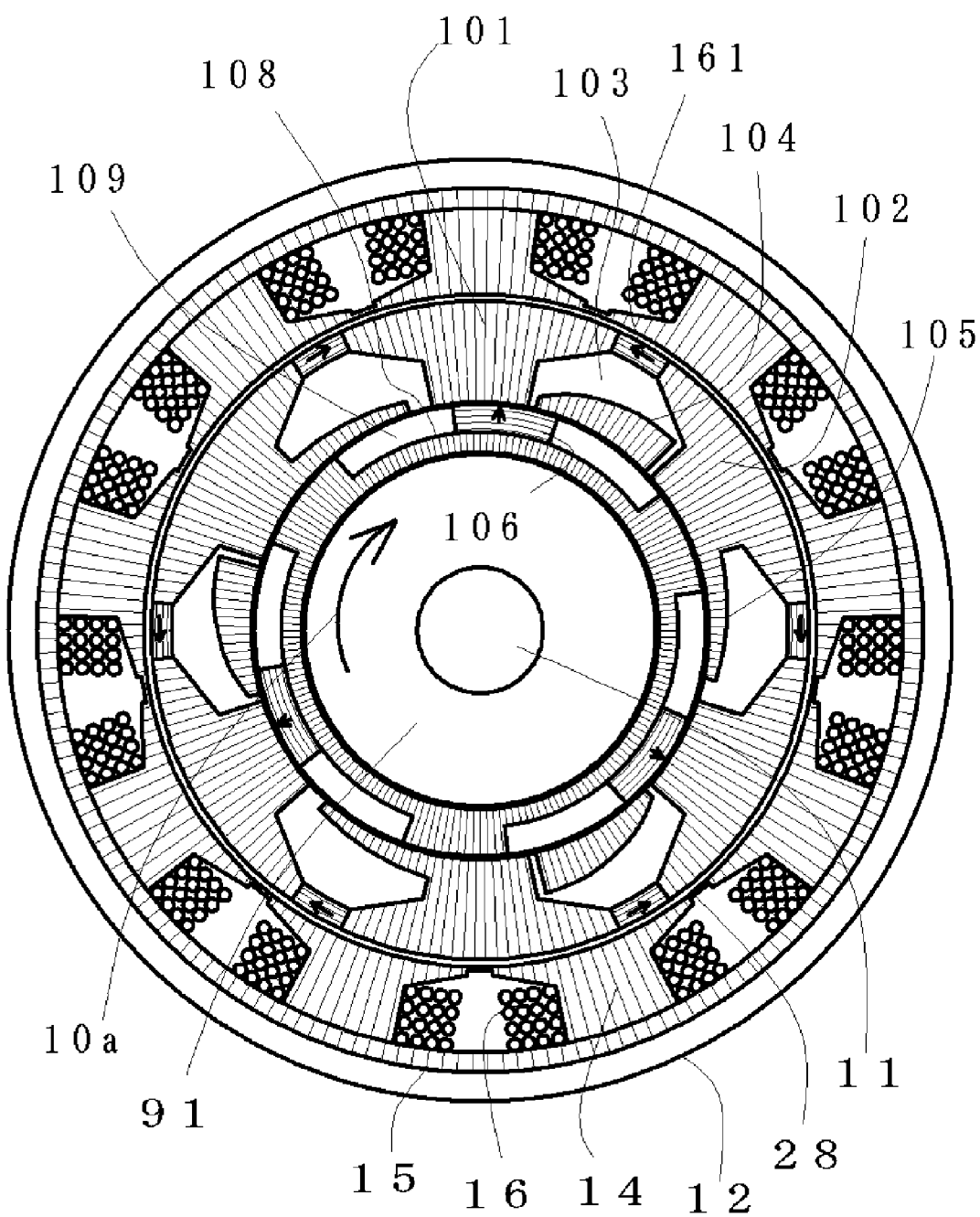
FIG. 16 is a sectional view showing the armature and the rotor of the rotating electric machine apparatus shown in FIG. 15.

FIG. 16 shows a sectional view of the armature and the rotor along the F-F' in FIG. 15. The disposition of the armature is the same with the first embodiment, and the disposition of the magnetic excitation part 93 and the surface magnetic pole part 94 in the magnetic field pole part differs slightly from the second embodiment shown in FIG. 10. In the following, the explanation is concentrated on the different points.

In FIG. 16, the surface magnetic pole part has a structure in which the magnetic salient pole and a permanent magnet 161 with magnetization of circumferential direction are lined one after the other in the circumferential direction, and the magnetization direction of the adjacent permanent magnets 161 is disposed inversely each other so that the adjacent magnetic salient poles 101, 102 are magnetized in inverse directions each other. Further, the surface magnetic pole part 94 and the magnetic excitation part 93 are disposed so that a same polarity of the permanent magnet 161 and the field magnet 106 faces the magnetic salient pole 101. The magnetic salient pole 101 is magnetized in an N-pole by the permanent magnet 161, and the magnetic salient pole 101 faces an N-pole of the field magnet 106.

As for the constitution of the magnetic excitation part 93, the field magnet 107 in the second embodiment shown in FIG. 10 is removed, and the second magnetic salient pole 102 extension and the second bypass magnetic pole 105 are disposed oppositely to the cylindrical magnetic core 108 through a minute gap. In above disposition, an amount of the magnetic flux flowing in the armature is a sum of the magnetic flux from the permanent magnets 161 and the one from the magnetic excitation part 93. And then the magnetic flux amount is controlled by controlling the amount of magnetic flux from the magnetic excitation part 93. In this embodiment, the permanent magnet 161 and the magnetic excitation part 93 are arranged so that both may magnetize the magnetic salient poles 101, 102 in the same polarity. When this is reverse, the permanent magnet 161 and the field magnet 106 constitute a closed magnetic circuit, and this makes the big magnetic power which becomes obstruction on the occasion of displacement control of the surface magnetic pole part 94 occur, and precise control becomes difficult.

Existence of the permanent magnet 161 is not desirable in a meaning that the control range of the magnetic flux amount by the magnetic excitation part is narrowed. However, there are the structure of arranging a permanent magnet in a gap between the magnetic salient poles and reducing the magnetic flux short in the gap, and the structure of dividing a uniform magnetic material by a permanent magnet with circumferential direction magnetization and forms magnetic salient poles as well as makes the permanent magnet a magnetic flux barrier. This embodiment is significant as the practical example that enables the field control easy in such conventional rotating electric machine.

The third embodiment is different from the second embodiment in the point that the permanent magnet 161 is arranged between the magnetic salient poles 101, 102, and the point that the second magnetic salient pole 102 extension and the second bypass magnetic pole 105 are arranged oppositely to the cylindrical magnetic core 108, and almost other portions are the same composition as the second embodiment. So, the operating principle to control the field strength between the rotor and the armature is same as the second embodiment and therefore the explanation thereof will be omitted.

It has been explained in the second embodiment that by relatively displacing the surface magnetic pole part 94 with respect to the magnetic excitation part 93, the magnetic flux flowing through the main magnetic flux pathway can be controlled at almost 100%, and a magnetic force disturbing the mechanical displacement can be avoided from being generated theoretically. In this embodiment, maintaining a relative position of the surface magnetic pole part 94 by the mechanical means shown in FIGS. 15 and 17, and the surface magnetic pole part 94 is displaced in a circumferential direction by supplying the driving current to the armature coil from the drive circuitry. In the following, operation of displacement control thereof will be explained referring FIGS. 15, and 17. FIG. 17(a) indicates a perspective view of the sleeve 151, and FIG. 17(b) indicates a perspective view of the rotational shaft 11.

Figure 17:
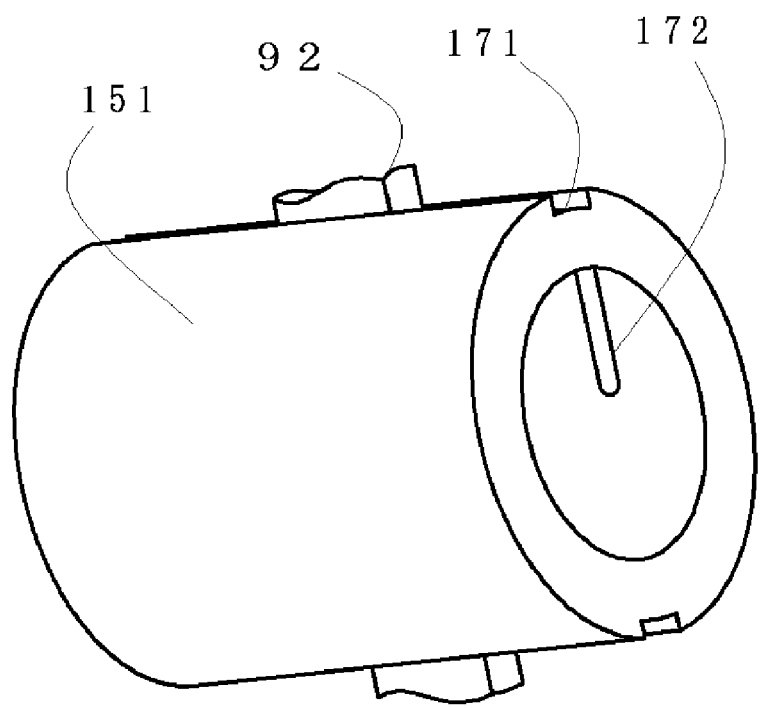
FIG. 17(a) is a perspective view of the sleeve 151 of the rotating electric machine apparatus shown in FIG. 15
FIG. 17(b) is a perspective view of the rotational shaft 11 thereof.
Figure 17:
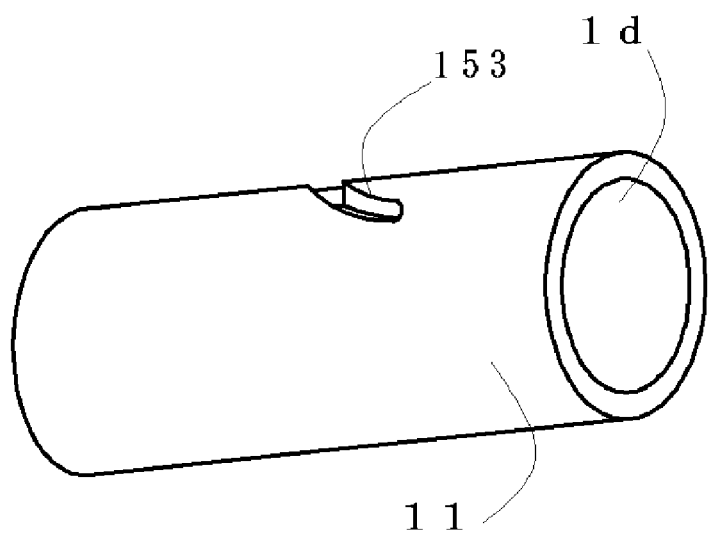

The position maintaining means shown in FIGS. 15 and 17 is also a means which the surface magnetic pole part 94 can be made to displace in a circumferential direction, and includes the cylindrical sleeve 151 disposed possible to slide at the rotational shaft 11 outside, the spring 152, the oblique groove 153 set up to the rotational shaft 11, the push rod 1e, the slide rod 1h, and the actuator 1f fixed to the housing 12. The oblique groove 153 is formed obliquely in the axial direction as shown in FIG. 17(b) in the periphery of the rotational shaft 11, and a salient portion 172 of the sleeve 151 sticking out to the hollow from the sleeve 151 engages with the oblique groove 153. Further, the sleeve 151 has a straight groove 171 in the periphery thereof, and a part of the surface magnetic pole part support 92 engages with the straight groove 171 so that rotational torque can be transmitted between the rotational shaft 11 and the surface magnetic pole part support 92.

The sleeve 151 is composed to be forced to the right direction by the spring 152, and the salient portion 172 thereof is in contact with the slide rod 1h, and is also forced to the left direction by the actuator 1f, and stops at the axial position in which the both forces are balanced. The sleeve 151 moves axially when the force of biasing the sleeve 151 is changed by the actuator 1f, and the sleeve 151 is rotationally displaced by the oblique groove 153 and the sleeve 151. Therefore, the surface magnetic pole part support 92 and the surface magnetic pole part 94 are displaced in a circumferential direction.

Although only the position maintaining means explained with reference to FIGS. 15 and 17 above can displace the surface magnetic pole part 94, this embodiment applies the position maintaining means just as means to maintain the relative position of the surface magnetic pole part 94, and displaces it by supplying the driving current to the armature coil 16 from the drive circuitry. Therefore, the field control becomes possible by the small actuator 1f.

When the magnetic flux amount flowing through the main magnetic flux pathway is to be changed, the actuator 1f is energized to make the push rod 1e move so that the surface magnetic pole part 94 may be displaced to the target position. This corresponds to reduce the retentivity of the surface magnetic pole part 94. And simultaneously supplying the drive current to the armature coil 16 from the driving circuitry so that the surface magnetic pole part 94 is driven to displace to the target position in a circumferential direction. The actuator 1f has composition which adopts a stepping motor and a screw mechanism like the first embodiment, and can maintain the axial position of the push rod 1e, even when not driving the stepping motor.

As described above, in the rotating electric machine apparatus shown in FIGS. 15 to 17, it has been explained that by relatively displacing the surface magnetic pole part 94 with respect to the magnetic excitation part 93, the magnetic flux flowing through the main magnetic flux pathway can be controlled at almost 100%, and furthermore, the means and the method for above displacement have been explained. The third embodiment is a system for optimizing the output by controlling the magnetic flux flowing through the main magnetic flux pathway, and the control method as the rotating electric machine system will be explained by using FIG. 8.

A rotating electric machine system in which the rotating electric machine apparatus serves as an electric motor and by which the field-weakening control is performed to optimize the rotational force control will be explained.

When the rotational speed that is the output 83 becomes larger than a predetermined value and the magnetic flux amount flowing through the main magnetic flux pathway is made to be smaller, the control device 85 displaces the push rod 1e, and the slide rod 1h rightward through the actuator 1f so that the surface magnetic pole part 94 is biased to displace toward the opposite direction of 10a (counterclockwise in FIG. 10), and simultaneously supplies the current to the armature coil 16 through the driving circuitry 87 so as to drive the surface magnetic pole part 94 to the opposite direction of 10a. Thereby, the opposed area between the magnetic salient pole 101 extension and the field magnet 106 is made to be smaller. After the above-mentioned displacement control, the control device 85 stops the actuator 1f, and holds the surface magnetic pole part 94 position to the magnetic excitation part 93.

When the rotational speed that is the output 83 becomes smaller than a predetermined value and the magnetic flux amount flowing through the main magnetic flux pathway is made to be larger, the control device 85 displaces the push rod 1e, and the slide rod 1h leftward through the actuator 1f so that the surface magnetic pole part 94 is biased to displace toward the direction of 10a (clockwise in FIG. 10), and simultaneously supplies the current to the armature coil 16 through the driving circuitry 87 so as to drive the surface magnetic pole part 94 to the direction of 10a. Thereby, the opposed area between the magnetic salient pole 101 extension and the field magnet 106 is made to be larger. After the above-mentioned displacement control, the control device 85 stops the actuator 1f, and holds the surface magnetic pole part 94 position to the magnetic excitation part 93.

A constant-voltage power generation system in which the rotating electric machine apparatus serves as an electric generator and by which the field-weakening control is performed to control the power generation voltage to be a predetermined voltage will be explained.

When the power generation voltage that is the output 83 becomes larger than a predetermined value and the magnetic flux amount flowing through the main magnetic flux pathway is made to be smaller, the control device 85 displaces the push rod 1e, and the slide rod 1h rightward through the actuator 1f so that the surface magnetic pole part 94 is biased to displace toward the opposite direction of 10a (counterclockwise in FIG. 10), and simultaneously supplies the current to the armature coil 16 through the driving circuitry 87 so as to drive the surface magnetic pole part 94 to the opposite direction of 10a. Thereby, the opposed area between the magnetic salient pole 101 extension and the field magnet 106 is made to be smaller. After the above-mentioned displacement control, the control device 85 stops the actuator 1f, and holds the surface magnetic pole part 94 position to the magnetic excitation part 93.

When the power generation voltage that is the output 83 becomes smaller than a predetermined value and the magnetic flux amount flowing through the main magnetic flux pathway is made to be larger, the control device 85 displaces the push rod 1e, and the slide rod 1h leftward through the actuator 1f so that the surface magnetic pole part 94 is biased to displace toward the direction of 10a (clockwise in FIG. 10), and simultaneously supplies the current to the armature coil 16 through the driving circuitry 87 so as to drive the surface magnetic pole part 94 to the direction of 10a. Thereby, the opposed area between the magnetic salient pole 101 extension and the field magnet 106 is made to be larger. After the above-mentioned displacement control, the control device 85 stops the actuator 1f, and holds the surface magnetic pole part 94 position to the magnetic excitation part 93.

In this invention, the main magnetic flux pathway and the bypass magnetic flux pathway which magnetic resistances are set almost equal are connected with the field magnet in parallel, and magnetic flux amount flowing through the main magnetic flux pathway is controlled mechanically. Therefore, it is important to set up equally magnetic resistances of the main magnetic flux pathway and the bypass magnetic flux pathway. However in the mass production stage, a difference may appear in magnetic resistances of the main magnetic flux pathway and the bypass magnetic flux pathway by various tolerances of the settings required for the sizes of the parts, and shifting from ideal conditions, some magnetic force may appear on the occasion of the above-mentioned mechanical displacement. Furthermore, there is interaction between the armature and the magnetic field pole part during rotation, the magnetic resistance of the main magnetic flux pathway may be changed effectually, and some magnetic force may appear.

Thus, the magnetic force which originates in the magnetic resistance difference between the main magnetic flux pathway and the bypass magnetic flux pathway cannot be controlled completely. In the case of changing the magnetic field strength in the second and the third embodiments, the surface magnetic pole part 94 is made to rotate in an acceleration or a slowdown direction by supplying the drive current to the armature coils, and is made to displace with respect to the magnetic excitation part. The above-mentioned magnetic force is coped with using big enough torque of the rotating electric machine.

The magnetic flux amount flowing through the main magnetic flux pathway becomes large and small, respectively, when accelerating and slowing down the rotor. Therefore, it is preferable to compose the surface magnetic pole part and the magnetic excitation part so that the magnetic flux amount flowing through the main magnetic flux pathway may be made large and small, respectively, when the rotor is accelerated and decelerated in the second and the third embodiments.

The rotating electric machine system according to a fourth embodiment of the present invention will be explained by using FIGS. 18 to 20. The fourth embodiment is a rotating electric machine system controlling the magnetic flux amount flowing through the armature by displacing the magnetic excitation part with respect to the surface magnetic pole part in a circumferential direction, and employing a planet gearing system as a displacement control means. Moreover, the fourth embodiment connects the predetermined constant current load to armature coils at the time of the field control, and makes the predetermined current flow in armature coils by induced voltage so that magnetic resistance of the main magnetic flux pathway and the bypass magnetic flux pathway is effectively made equal.

Figure 18:
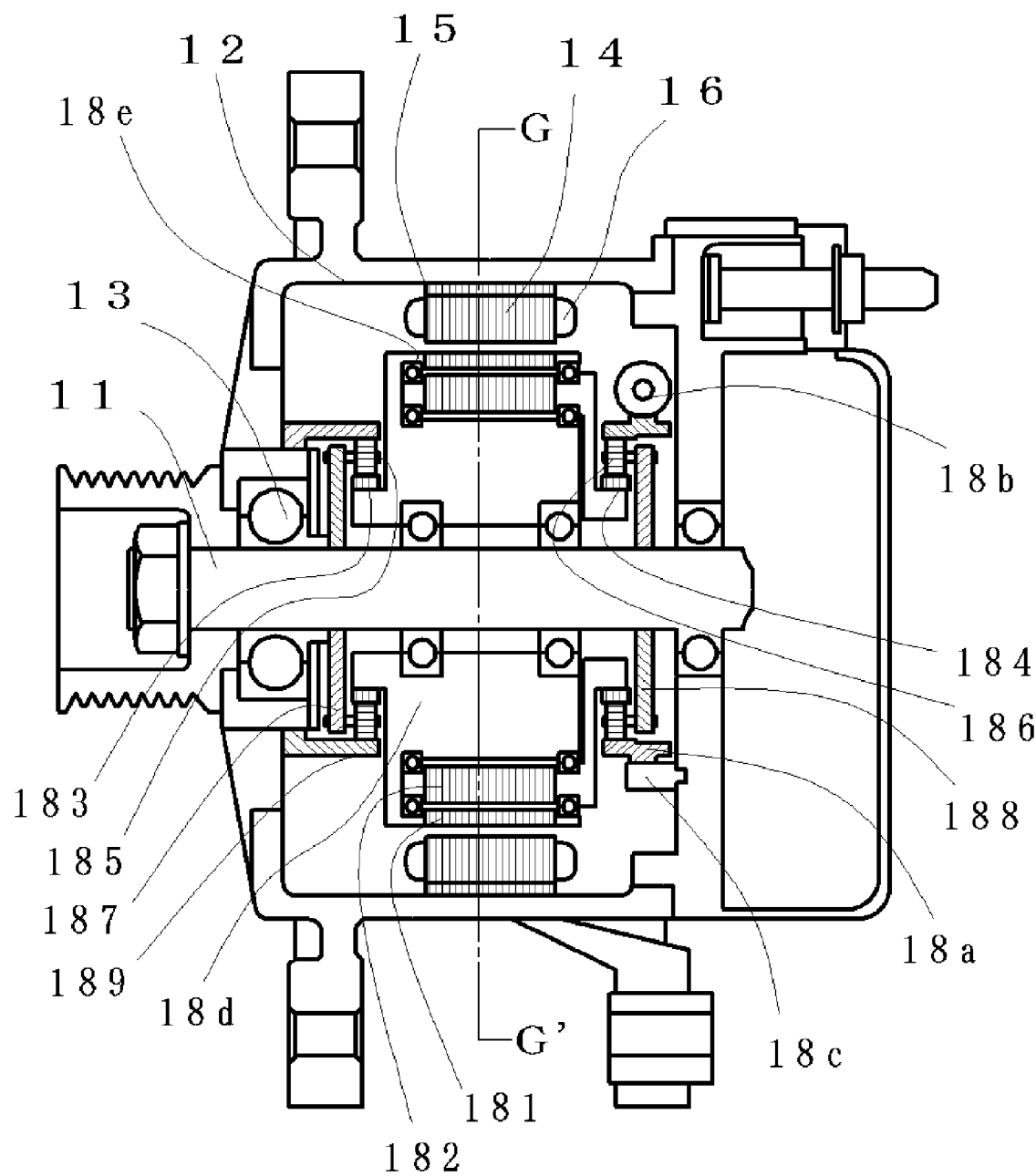
FIG. 18 is a longitudinal sectional view of the rotating electric machine apparatus according to the fourth embodiment of the present invention.

FIG. 18 shows the rotating electric machine apparatus having a radial gap structure, and the rotational shaft 11 is supported rotatably by the housing 12 through bearings 13. The composition of the armature is same as the first embodiment.

The magnetic field pole part of the rotor includes the surface magnetic pole part 181 opposing to the magnetic teeth 14 radially and the magnetic excitation part 182. The surface magnetic pole part 181 is fixed to a rotor support 18*d*, and the magnetic excitation part 182 is disposed rotatably between the surface magnetic pole part 181 and the rotor support 18*d* with a minute gap.

The fourth embodiment has the constitution that the rotor speed is increased more than the rotational speed of the rotational shaft 11. The rotor support 18*d* is supported rotatably by the rotational shaft 11 through bearings. The planet gearing system to speed the rotor support 18*d* from the rotational shaft 11 is composed of a sun gear 183 fixed to the rotor support 18*d*, a ring gear 189 fixed to the housing 12, a planetary gear 185 which meshes with the sun gear 183 and the ring gear 189, and a planetary carrier 187 fixed to the rotational shaft 11. The ratio of rotational speed of the rotor support 18*d* and the rotational shaft 11 is based on the number ratio of teeth between the ring gear 189 and the sun gear 183.

The displacement control means to displace the magnetic excitation part 182 with respect to the surface magnetic pole part 181 and the rotor support 18*d* is also the almost same planet gearing system as to speed the rotor support 18*d*. That is, the displacement control means to displace the magnetic excitation part 182 includes a sun gear 184 fixed to the magnetic excitation part 182, a ring gear 18*a* supported to the housing 12 rotatably, a planetary gear 186 which meshes with the sun gear 184 and the ring gear 18*a*, and a planetary carrier 188 fixed to the rotational shaft 11. The sun gears 183 and 184, the ring gears 189 and 18*a*, the planetary gears 185 and 186, each group have the same number of teeth. Furthermore, the ring gear 18*a* is supported by the housing 12 rotatably through a pulley 18*c*, and has a gear in the perimeter thereof which meshes with a worm gear 18*b*.

Figure 19:
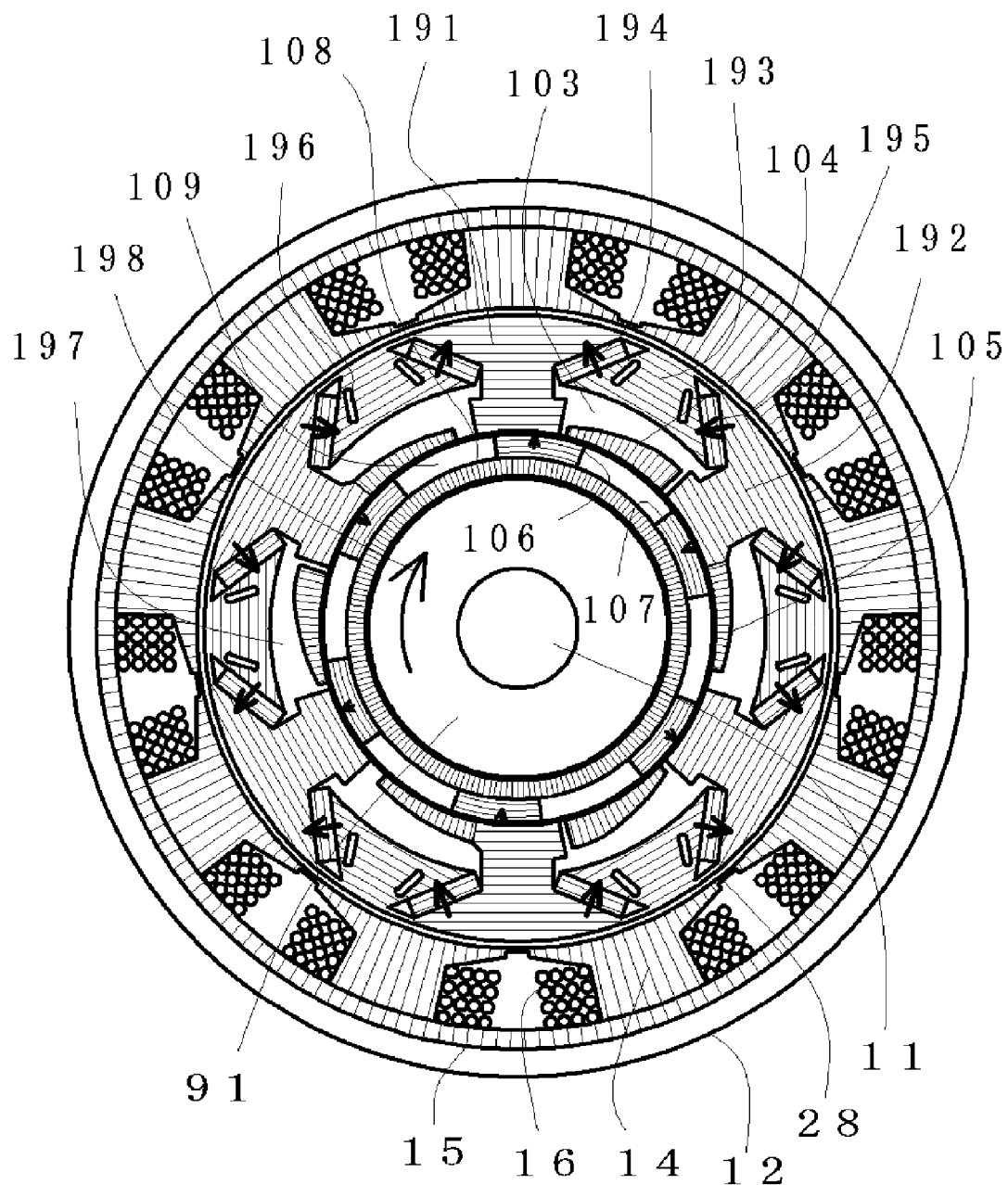
FIG. 19 is a sectional view showing the armature and the rotor of the rotating electric machine apparatus shown in FIG. 18.

FIG. 19 shows a sectional view of the armature and the rotor along the G-G' in FIG. 18, and the disposition of the armature is the same with the first embodiment, and the disposition of the magnetic excitation part is the same with the second embodiment shown in FIG. 10, and different points from FIG. 10 are the surface magnetic pole part 181 is fixed to the rotor, and the magnetic excitation part 182 is displaced with respect to the rotor, and the composition of the surface magnetic pole part 181. In the following, the explanation is concentrated on the different points.

In FIG. 19, the rotor has a structure in which the magnetic salient poles and the permanent magnet assemblies are disposed one after the other in a circumferential direction. A combination of an intermediate magnetic salient pole 193 and permanent magnet plates 194, 195 that have same magnetization direction and are disposed at both sides of the pole 193 serves as the permanent magnet assembly. The surface magnetic pole part is characterized in that a uniform magnetic material is partitioned into the magnetic salient poles 191, 192 by the permanent magnet assemblies in the circumferential direction. And each magnetization direction of the adjacent permanent magnet assemblies is inversely arranged so that the adjacent magnetic salient poles 191, 192 are magnetized in different polarities each other. The disposition shape of the permanent magnet plates 194, 195 that are disposed at the side surface of the magnetic salient poles 191, 192 looks like V-letter, a crossing angle of the V-letter shape is arranged at a suitable value for a flux barrier. Arrows appended in the permanent magnet plates 194, 195 show magnetization directions that are perpendicular to the permanent magnet plates 194, 195 face. The number 197 represents a non-magnetic portion to avoid magnetic short, and the number 198 represents a rotating direction.

The constitution of the magnetic excitation part 182 is the same as the second embodiment. The surface magnetic pole part 181 and the magnetic excitation part 182 are arranged so that the permanent magnet assembly and the magnetic excitation part magnetize the magnetic salient pole 191 in the same polarity.

The role of the permanent magnet plates 194, 195 that constitutes the permanent magnet assemblies is a magnetic flux barrier for forming the domain of big magnetic resistance in the direction of a circumference while generating the magnetic flux. In this embodiment, the purpose of the magnetic excitation part 182 is to supply the magnetic flux and to control it. Therefore, the magnetic flux from the permanent magnet plates 194, 195 is the existence acting as an obstacle from a viewpoint of magnetic flux control. The non-magnetic portion 196 prepared in the intermediate magnetic salient pole 193 is disposed so that a magnetic resistance between the permanent magnet plates 194, 195 becomes large. Thereby, displacing the magnetic excitation part 182 with respect to the surface magnetic pole part 181, the magnetic flux amount flowing into the armature can be controlled in the wide range.

The composition of the surface magnetic pole part 181 is explained above. The composition of the magnetic excitation part 182 is as same as the magnetic excitation part 93 of the second embodiment, and the explanation about the principle of magnetic flux control is omitted. The magnetic pole composition of the surface magnetic pole part 181 is most suitable for the rotating electric machine using a magnetic torque and a reluctance torque. The magnetic torque can be controlled without supplying an invalid current to the armature coils as explained, energy efficiency of the rotating electric machine can be improved as well as a rotating speed range can be magnified with this invention.

A further different point from the second embodiment is the displacement control means of the magnetic excitation part, and is explained with reference to FIGS. 18 and 20. The displacement control means to displace the magnetic excitation part 182 includes the sun gear 184, the ring gear 18*a*, the planetary gear 186, and the planetary carrier 188. Three of the planetary gear 186 are arranged in a circumference so as to mesh with the sun gear 184 and the ring gear 18*a*, and the sun gear 184 is formed in an end face of the magnetic excitation part 182, and the planetary gears 186 are supported by the planetary carrier 188 rotatably, and the planetary carrier 188 is fixed to the rotational shaft 11. The number 198 represents the rotating direction of the rotational shaft 11 and the planetary carrier 188. An actuator that controls the ring gear 18*a* consists of the gear in the ring gear 18*a* perimeter part, a worm gear 18*b* and a motor 201. The motor 201 rotates the gear of the perimeter part of the ring gear 18*a* through the worm gear 18*b*. Three of the pulley 18*c* are supporting the ring gear 18*a* rotatably by the housing 12.

The rotational shaft 11 rotates with the planetary carrier 188 and the planetary gear 186. When the ring gear 18*a* is made stationary through the worm gear 18*b*, the magnetic excitation part 182 is rotated in the same direction through the sun gear 184. In this embodiment, the magnetic excitation part 182 rotates more quickly than the rotational shaft 11 according to the number ratio of teeth between the sun gear 184 and the ring gear 18*a*, but in order that the surface magnetic pole part 181 may also rotate with the same rotating speed, relative displacement between the magnetic excitation part 182 and the surface magnetic pole part 181 does not change.

When the motor 201 makes the ring gear 18*a* displace for counterclockwise (opposite direction of the rotating direction 198) through the worm gear 18*b* and the gear formed in ring gear 18*a* perimeter, and the sun gear 184 is accelerated, and the magnetic excitation part 182 is made to displace relatively for clockwise (the rotating direction 198) to the surface magnetic pole part 181. Therefore, the magnetic flux amount flowing between the magnetic salient pole 191 and the magnetic teeth 14 becomes smaller.

When the motor 201 makes the ring gear 18*a* displace for clockwise (the rotating direction 198) through the worm gear 18*b* and the gear formed in ring gear 18*a* perimeter, and the sun gear 184 is decelerated, and the magnetic excitation part 182 is made to displace relatively for counterclockwise (opposite direction of the rotating direction 198) to the surface magnetic pole part 181. Therefore, the magnetic flux amount flowing between the magnetic salient pole 191 and the magnetic teeth 14 becomes larger.

In the embodiment according to the present invention, the magnetic resistance of the main magnetic flux pathway and the magnetic resistance of the bypass magnetic flux pathway are set up equally, and the magnetic force which disturbs the magnetic excitation part displacement does not appear. But in the mass production stage, a difference may appear in the magnetic resistance of the main magnetic flux pathway and the bypass magnetic flux pathway by various tolerances of the settings required for the sizes of the parts. The compensation means of the magnetic resistance of the main magnetic flux pathway is adopted in the present embodiment so as to control the magnetic flux flowing through the main magnetic flux pathway smoothly. That is, when making the magnetic excitation part displace in order to change the magnetic field intensity, the predetermined constant current loads (not shown in Figures) is connected to the armature coils 16 for effectively adjusting the magnetic resistance of the main magnetic flux pathway.

When a rotating electric machine apparatus is used as a dynamo, if predetermined impedance load is connected to the armature coils 16, some voltage is induced by interlinked magnetic flux with armature coils 16 and current of the direction which reduces the interlinked magnetic flux flows according to the impedance of load. Thereby, the magnetic resistance of the main magnetic flux pathway becomes larger effectively. After assembling the rotating electric machine, each constant current load that enables the magnetic resistance of the main magnetic flux pathway to be effectively equal to the magnetic resistance of the bypass magnetic flux pathway is surveyed and memorized in a control apparatus. When the field strength between the magnetic salient poles 191 and the magnetic teeth 14 is to be changed, the predetermined constant current load is connected to armature coils 16 for effectively equalizing the magnetic resistance of the main magnetic flux pathway to the one of the bypass magnetic flux pathway, and then the magnetic force preventing the displacement of the magnetic excitation part becomes small. The constant current circuit (not shown in Figures) that predetermined current flows through the armature coils with the induction voltage is used in this embodiment.

Figure 20:
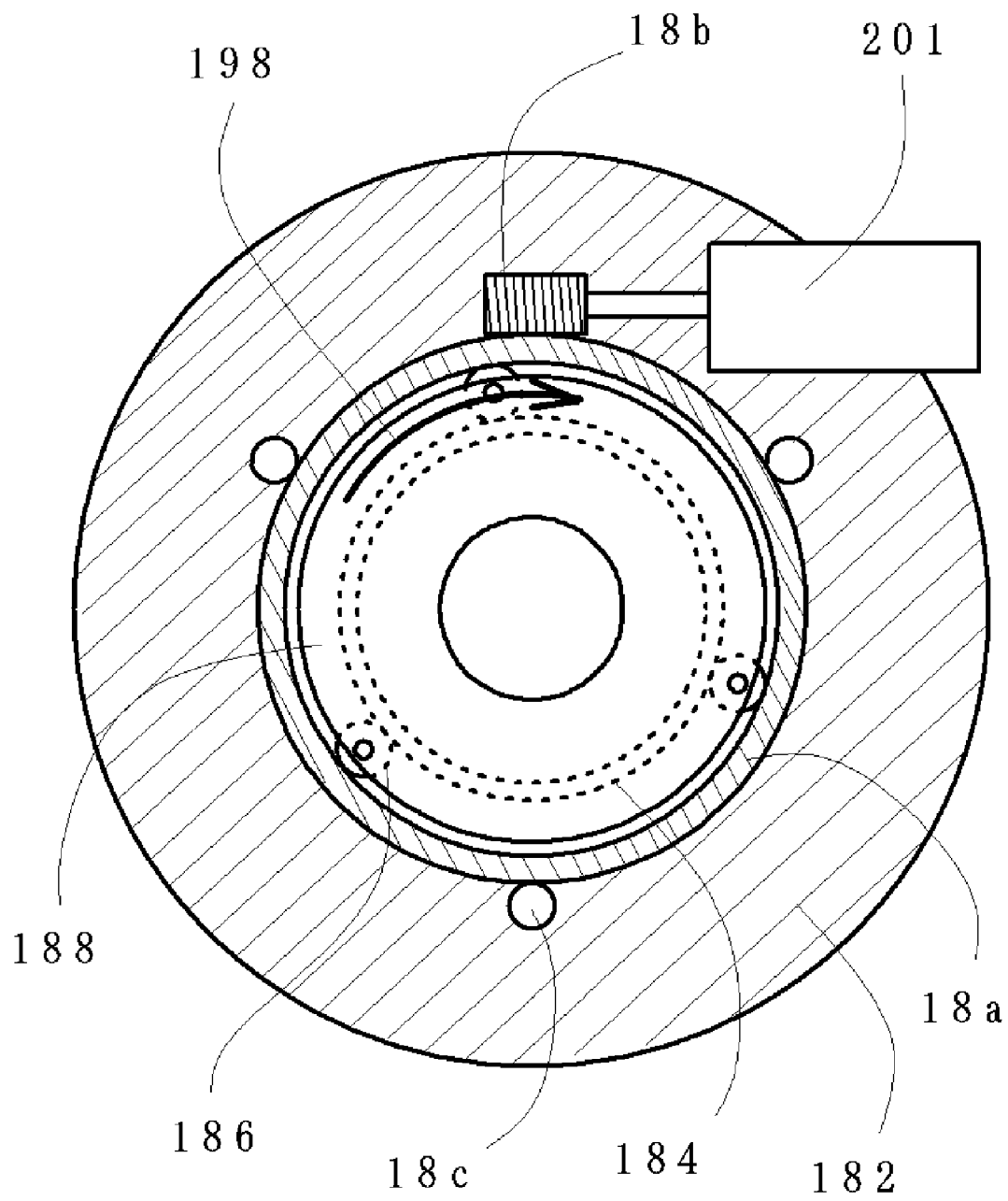
FIG. 20 is a plan view showing the means for displacing the magnetic excitation part of the rotating electric machine apparatus shown in FIG. 18.

As described above, in the rotating electric machine apparatus shown in FIGS. 18 to 20, it has been explained that by relatively displacing the magnetic excitation part 182 with respect to the surface magnetic pole part 181 by the motor 201 disposed at the housing 12 side, the magnetic flux flowing through the main magnetic flux pathway can be controlled. The fourth embodiment is a system for optimizing the output by controlling the magnetic flux flowing through the main magnetic flux pathway, and the control method as the rotating electric machine system will be explained by using FIG. 8.

A rotating electric machine system in which the rotating electric machine apparatus serves as an electric motor and by which the field-weakening control is performed to optimize the rotational force control will be explained.

When the rotational speed that is the output 83 becomes larger than a predetermined value and the magnetic flux amount flowing through the main magnetic flux pathway is made to be smaller, the control device 85 connects the predetermined constant current circuit which sends the predetermined current to the armature coils 16 by the induced voltage so that the magnetic resistance of the main magnetic flux pathway and the magnetic resistance of the bypass magnetic flux pathway become effectively equal, and drives the motor 201 to displace the ring gear 18*a* in counterclockwise direction by the control signal 86, and thereby, the opposed area between the magnetic salient pole 191 extension and the field magnet 106 is made to be smaller. After the displacement control, the control device 85 holds the position of the magnetic excitation part 182 by stopping the motor 201.

When the rotational speed that is the output 83 becomes smaller than a predetermined value and the magnetic flux amount flowing through the main magnetic flux pathway is made to be larger, the control device 85 connects the predetermined constant current circuit which sends the predetermined current to the armature coils 16 by the induced voltage, and drives the motor 201 to displace the ring gear 18*a* in clockwise direction by the control signal 86, and thereby, the opposed area between the magnetic salient pole 191 extension and the field magnet 106 is made to be larger. After the displacement control, the control device 85 holds the position of the magnetic excitation part 182 by stopping the motor 201.

A constant-voltage power generation system in which the rotating electric machine apparatus serves as an electric generator and by which the field-weakening control is performed to control the power generation voltage to be a predetermined voltage will be explained.

When the power generation voltage that is the output 83 becomes larger than a predetermined value and the magnetic flux amount flowing through the main magnetic flux pathway is made to be smaller, the control device 85 connects the predetermined constant current circuit which sends the predetermined current to the armature coils 16 by the induced voltage, and drives the motor 201 to displace the ring gear 18*a* in counterclockwise direction by the control signal 86, and thereby, the opposed area between the magnetic salient pole 191 extension and the field magnet 106 is made to be smaller. After the displacement control, the control device 85 holds the position of the magnetic excitation part 182 by stopping the motor 201.

When the power generation voltage that is the output 83 becomes smaller than a predetermined value and the magnetic flux amount flowing through the main magnetic flux pathway is made to be larger, the control device 85 connects the predetermined constant current circuit which sends the predetermined current to the armature coils 16 by the induced voltage, and drives the motor 201 to displace the ring gear 18a in clockwise direction by the control signal 86, and thereby, the opposed area between the magnetic salient pole 191 extension and the field magnet 106 is made to be larger. After the displacement control, the control device 85 holds the position of the magnetic excitation part 182 by stopping the motor 201.

In this embodiment, the planet gearing system is employed in order to enable the displacement control of the magnetic excitation part easily from the stillness side, further the composition speeding up the rotor is indicated. Making the rotor to rotate at the same speed as the rotational shaft 11, the planet gearing system can be prepared only for displacement control of the magnetization part 182. In that case, the planet gear mechanism for speeding up the rotor support 18d shown in FIG. 18 is removed, the rotor support 18d is fixed to the rotational shaft 11, and the number of teeth of the ring gear 18a is equally set up with the sun gear 184.

In the mass production stage, the magnetic resistance of the main magnetic flux pathway and the bypass magnetic flux pathway may fluctuate, and the magnetic force disturbing the displacement for the field control may appear. A means to correct effectively the magnetic resistance of the main magnetic flux pathway during rotation is proposed so that above magnetic force is controlled to be small. Since the compensation means of the magnetic resistance of the main magnetic flux pathway adopted in the present embodiment are accompanied by rotor slowdown, when the field control continues over a long time, operation of rotating electric machine may be affected. But a change in the rotating speed and change control of the field strength are performed successively by a usual operational status, so it will not be a big problem. Moreover, in changing the field strength more than a predetermined level, a big trouble does not appear by taking in the technique of the sampling servo that carries out intermittently or is carried out the field strength control at predetermined intervals.

The rotating electric machine system according to a fifth embodiment of the present invention will be explained by using FIGS. 21, 22, and 23. The fifth embodiment is a rotating electric machine system having the armature in the rotation side and an outer rotor structure and controlling the magnetic flux amount flowing through the armature by displacing the magnetic excitation part with respect to the surface magnetic pole part in a circumferential direction. Moreover, the fifth embodiment connects the predetermined constant current load to armature coils at the time of the field strength control, parameters of the constant current load are acquired in learning way.

Figure 21:
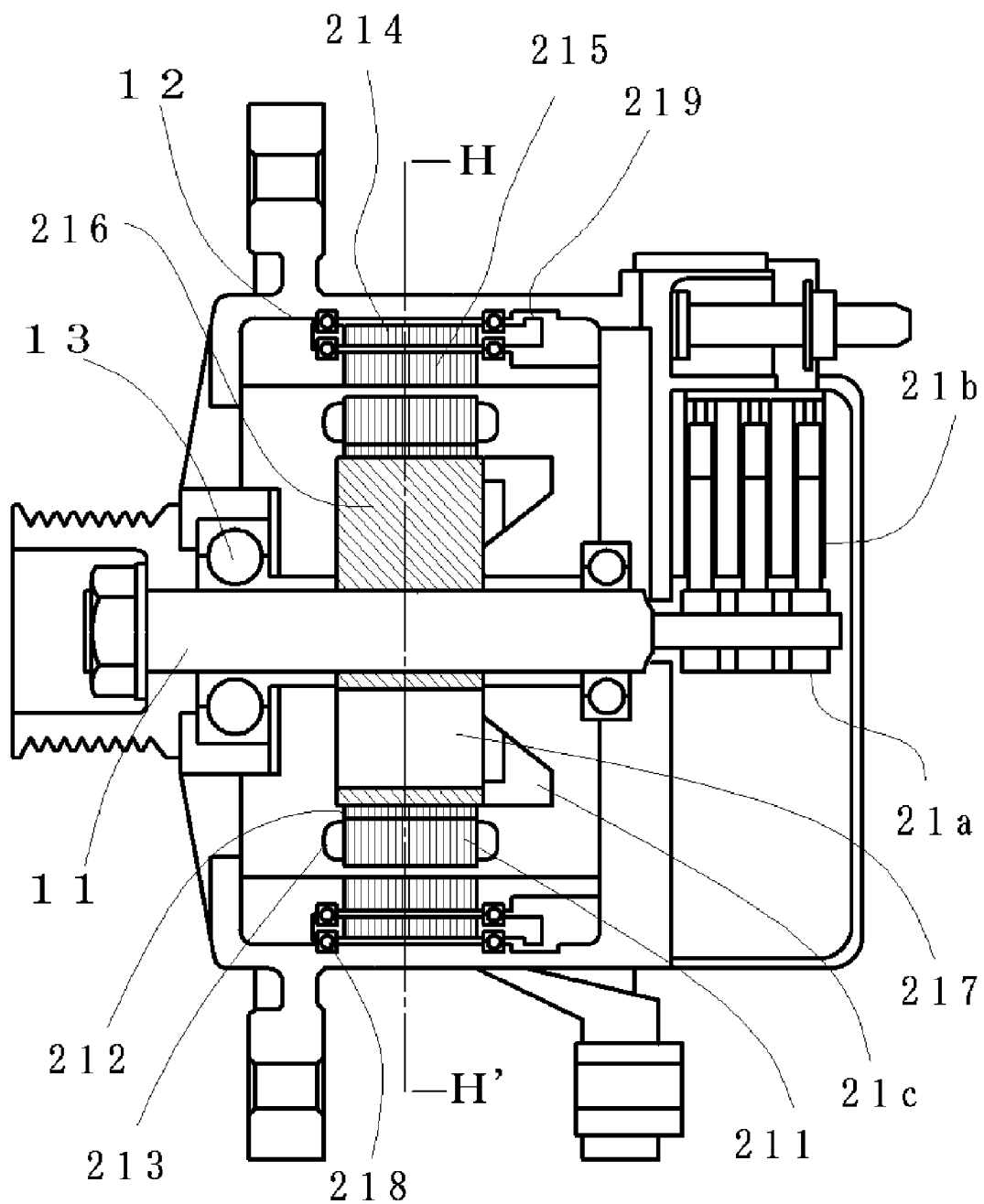
FIG. 21 is a longitudinal sectional view of the rotating electric machine apparatus according to the fifth embodiment of the present invention.

FIG. 21 illustrates the rotating electric machine apparatus with the outer rotor structure, and the armature is disposed on the rotor side. The rotational shaft 11 is supported rotatably by the housing 12 through bearings 13. The armature includes a cylindrical magnetic yoke 212 fixed to a rotor support 216, magnetic teeth 211, and an armature coil 213. The armature coils 213 are connected so as to have three phases and are connected to the control device that is not illustrated through a slip ring 21a and a brush 21b.

A magnetic field pole part disposed in static side includes a surface magnetic pole part 215 facing the magnetic teeth 211 and a magnetic excitation part 214. The surface magnetic pole part 215 is fixed to the housing 12, and the magnetic excitation part 214 is supported rotatably between the surface magnetic pole part 215 and the housing 12 through a micro gap. The number 218 represents a bearing, and the number 217 represents a hollow part which cooling air pass through, and the number 21c represents a cooling fan fixed to the rotor.

The number 219 indicates a gear 219 disposed in periphery of the magnetic excitation part 214, and a worm gear and a motor which are not shown in this figure displace the magnetic excitation part 214 with respect to the surface magnetic pole part 215 and the housing 12.

Figure 22:
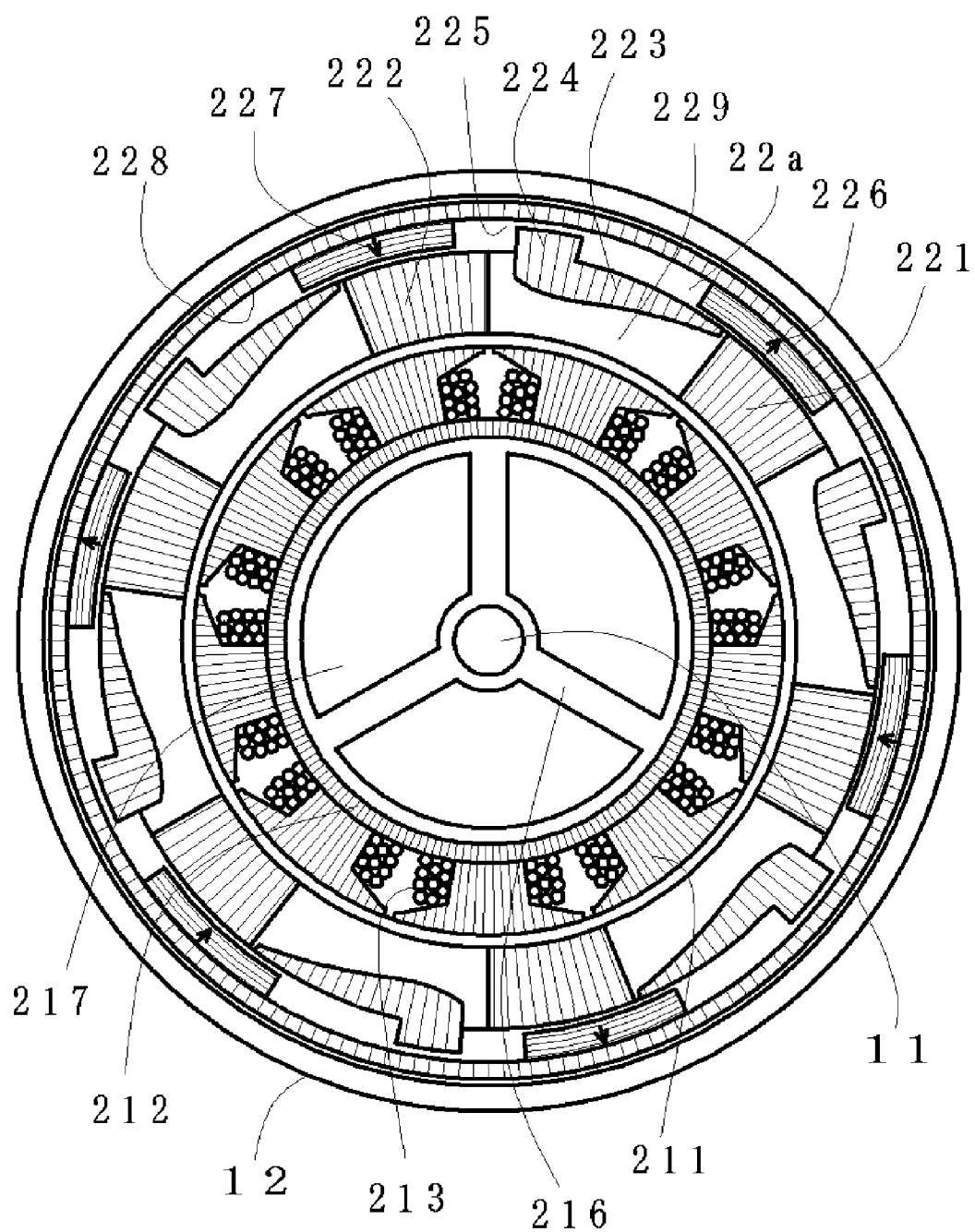
FIG. 22 is a sectional view showing the armature and the rotor of the rotating electric machine apparatus shown in FIG. 21.

FIG. 22 shows a sectional view of the armature and the rotor along H-H' of FIG. 21, and some of the component parts are appended with numbers for explaining the reciprocal relation. The armature is composed of the cylindrical magnetic yoke 212 fixed to the rotor support 216, a plurality of the magnetic teeth 211 having non-magnetic portions in the circumferential direction, and the armature coils 213 wound around the magnetic teeth 211. In this embodiment, nine armature coils 213 are included and connected so as to have three phases.

In FIG. 22, the magnetic field pole part includes the surface magnetic pole part 215 and the magnetic excitation part 214. A magnetic salient pole and a non-magnetic portion are arranged in sequence in a circumferential direction at the opposite side to the magnetic teeth 211 of the surface magnetic pole part 215. An extension of the magnetic salient pole and a bypass magnetic pole are arranged in sequence in circumferential direction at the opposite side to the magnetic excitation part 214 of the surface magnetic pole part 215. The adjacent magnetic salient poles are represented by numbers 221, 222, and the non-magnetic portion is represented by number 229, and the bypass magnetic pole is represented by number 223.

The magnetic excitation part 214 includes a cylindrical magnetic core 228 and field magnets 226, 227 disposed on the cylindrical magnetic core 228. The adjacent field magnets 226, 227 have inverse radial direction magnetization each other, and circumferential length between them is set up equally to circumferential length between the magnetic salient pole 221 extension and the magnetic salient pole 222 extension. Arrows shown in field magnets 226, 227 indicate magnetization direction.

The field magnet 206 faces the magnetic salient pole 221 extension and the bypass magnetic pole 223, and makes magnetic flux shunt. The sum of the respective opposed areas of the magnetic salient pole 221 extension and the bypass magnetic pole 223 to the field magnet 226 is constant, and the ratio of the areas is changed according to the displacement of the magnetic excitation part 214. Another end 224 of the bypass magnetic pole 223 faces the cylindrical magnetic core 228 through non-magnetic gap 225.

A main magnetic flux pathway includes the field magnet 206, the magnetic salient pole 221, the magnetic teeth 211, the magnetic salient pole 222, the field magnet 207, and the cylindrical magnetic core 228. A bypass magnetic flux pathway includes the field magnet 206, the bypass magnetic pole 223, and the cylindrical magnetic core 228. The main magnetic flux pathway includes the field magnet 206, 207 in series, and the bypass magnetic flux pathway includes only the field magnet 206. Therefore, an opposite area and a gap length in the gap 225 are adjusted so that magnetic resistance of the bypass magnetic flux pathway is set as the half of magnetic resistance of the main magnetic flux pathway.

Thus, magnetic flux is shunted toward the magnetic salient pole 221 extension and the bypass magnetic pole 223 from the field magnet 226. Even if the magnetic flux amount which flows through the main magnetic flux pathway is changed with making the magnetic excitation part 214 displace, total amount of the magnetic flux from the field magnet 226 does not change. Therefore, magnetic force disturbing the displacement will be small theoretically.

The composition to displace the magnetic excitation part 214 will be explained with reference to FIGS. 21 and 23. FIG. 23 indicates a plan view showing the housing 12, the magnetic excitation part 214, and the surface magnetic pole part 215. A worm gear 231 and a stepping motor 232 that makes the worm gear 231 rotate are shown in the figure. The worm gear 231 meshes with the gear 219 formed on the periphery of the magnetic excitation part 214.

When the stepping motor 232 drives the magnetic excitation part 214 to rotate in a clockwise direction through the worm gear 231 and the gear 219, an opposing area between the magnetic salient pole 221 extension and the field magnet 206 becomes larger, and then the magnetic flux amount flowing through the main magnetic flux pathway becomes larger. When the stepping motor 232 drives the magnetic excitation part 214 to rotate in a counterclockwise direction, the magnetic flux amount flowing through the main magnetic flux pathway becomes smaller.

Furthermore, in this embodiment, the constant current load is connected to the armature coil 213 like the fourth embodiment at the time of field control, and the magnetic resistance of the main magnetic flux pathway is adjusted effectively. Parameters of the constant current load are acquired in learning way.

Figure 23:
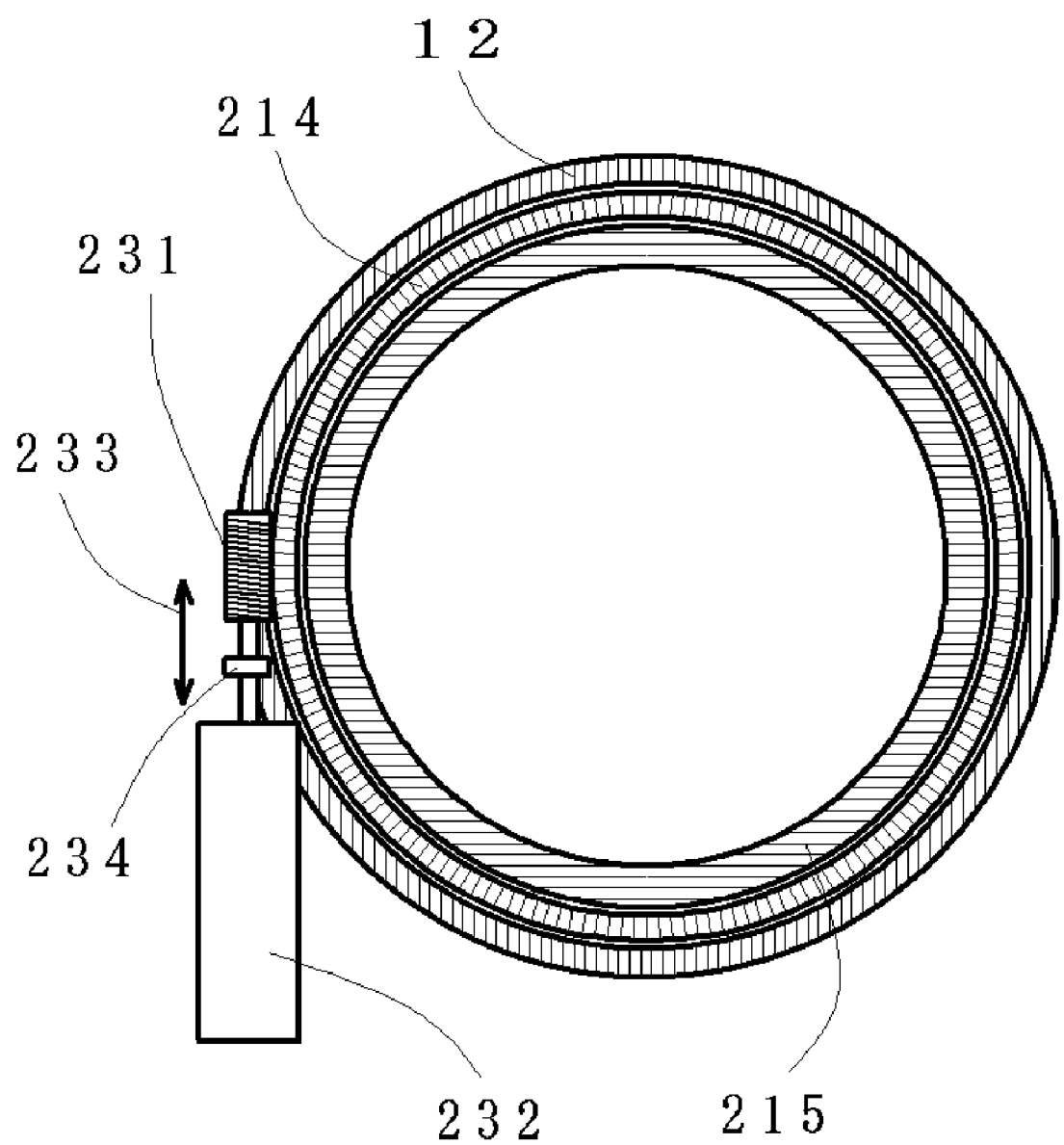
FIG. 23 is a plan view showing the means for displacing the magnetic excitation part of the rotating electric machine apparatus shown in FIG. 21.

The composition and the procedure which acquire the predetermined constant current load parameters to adjust magnetic resistance of the main magnetic flux pathway effectively in learning way are explained using FIGS. 7 and 23. If difference is in the magnetic resistance of the main magnetic flux pathway and the bypass magnetic flux pathway, the field magnet 226 will receive the magnetic force to displace in the direction which increases the opposite area between the field magnet 226 and the magnetic pole of the magnetic flux pathway with smaller magnetic resistance, and an arrow 233 shown in FIG. 23 represents the direction of the magnetic force. In this embodiment, a load cell 234 disposed between the worm gear 231 and the stepping motor 232 detects the magnetic force, and parameters related the constant current load will be acquired in learning way. The learning process will be explained referring FIG. 7.

In the learning section 71 of FIG. 7, the control device connects the constant current circuitry (not shown in Figures), and changes parameters so that different average current flows in the armature coil 213 by induced voltage, and watches the load cell 234 output in the period. The current conditions from which the load cell 234 output becomes small are conditions which make equal effectively half of magnetic resistance of the main magnetic flux pathway and the bypass magnetic flux pathway, and the control device memorizes them or set them again as the predetermined constant current load conditions.

The number 72 represents the field control section. The predetermined constant current load is connected to the armature coil 213 on the conditions acquired by the learning process, the stepping motor 232 is controlled simultaneously, and the magnetic excitation part 214 is made to displace in the circumferential direction. Because half of the magnetic resistance of the main magnetic flux pathway and the magnetic resistance of the bypass magnetic flux pathway is made effectively almost equal, the control by the stepping motor 232 is performed smoothly. In this case, the rotor is decelerated even for a short time, then the rotating speed 73 changes. The rotor is decelerated during the field control section 72, it is little, but the decelerated state is indicated by the rotating speed 73.

As described above, in the rotating electric machine apparatus shown in FIGS. 21 to 23, it has been explained that by relatively displacing the magnetic excitation part 214 with respect to the surface magnetic pole part 215, the magnetic flux amount flowing through the main magnetic flux pathway can be controlled. The fifth embodiment is a system for optimizing the output by controlling the magnetic flux amount, and the control method as the rotating electric machine system will be explained by using FIG. 8.

A rotating electric machine system in which the rotating electric machine apparatus serves as an electric motor and by which the field-weakening control is performed to optimize the rotational force control will be explained.

When the rotational speed that is the output 83 becomes larger than a predetermined value and the magnetic flux amount flowing through the main magnetic flux pathway is made to be smaller, the control device 85 connects the predetermined constant current load (not shown in Figures) to the armature coil 213 in the time zone of the field control section 72, and the predetermined current is made to flow by the induced voltage so that half of the magnetic resistance of the main magnetic flux pathway and the magnetic resistance of the bypass magnetic flux pathway are effectively made equal, and simultaneously the control device 85 makes the stepping motor 232 rotate the magnetic excitation part 214 in a counterclockwise direction, and thereby, the opposed area between the magnetic salient pole 221 extension and the field magnet 226 is made to be smaller. After the displacement control, the control device 85 holds the position of the magnetic excitation part 214 by stopping the stepping motor 232.

When the rotational speed that is the output 83 becomes smaller than a predetermined value and the magnetic flux amount flowing through the main magnetic flux pathway is made to be larger, the control device 85 connects the predetermined constant current load (not shown in Figures) to the armature coil 213 in the time zone of the field control section 72, and the predetermined current is made to flow by the induced voltage, and simultaneously the control device 85 makes the stepping motor 232 rotate the magnetic excitation part 214 in a clockwise direction, and thereby, the opposed area between the magnetic salient pole 221 extension and the field magnet 226 is made to be larger. After the displacement control, the control device 85 holds the position of the magnetic excitation part 214 by stopping the stepping motor 232.

A constant-voltage power generation system in which the rotating electric machine apparatus serves as an electric generator and by which the field-weakening control is performed to control the power generation voltage to be a predetermined voltage will be explained.

When the power generation voltage that is the output 83 becomes larger than a predetermined value and the magnetic flux amount flowing through the main magnetic flux pathway is made to be smaller, the control device 85 connects the predetermined constant current load (not shown in Figures) to the armature coil 213 in the time zone of the field control section 72, and the predetermined current is made to flow by the induced voltage, and simultaneously the control device 85 makes the stepping motor 232 rotate the magnetic excitation part 214 in a counterclockwise direction, and thereby, the opposed area between the magnetic salient pole 221 extension and the field magnet 226 is made to be smaller. After the displacement control, the control device 85 holds the position of the magnetic excitation part 214 by stopping the stepping motor 232.

When the power generation voltage that is the output 83 becomes smaller than a predetermined value and the magnetic flux amount flowing through the main magnetic flux pathway is made to be larger, the control device 85 connects the predetermined constant current load (not shown in Figures) to the armature coil 213 in the time zone of the field control section 72, and the predetermined current is made to flow by the induced voltage, and simultaneously the control device 85 makes the stepping motor 232 rotate the magnetic excitation part 214 in a clockwise direction, and thereby, the opposed area between the magnetic salient pole 221 extension and the field magnet 226 is made to be larger. After the displacement control, the control device 85 holds the position of the magnetic excitation part 214 by stopping the stepping motor 232.

Although the surface magnetic pole part and the magnetic excitation part are opposing in a radial direction in this embodiment, the arrangement thereof located in a line in axial direction is also possible. The magnetic flux propagates in the magnetic salient pole axially in this case, so this composition suits an axially short rotating electric machine apparatus and becomes assembling thereof easy.

A rotating electric machine system according to a sixth embodiment of the present invention will be explained by using FIG. 24. The sixth embodiment is the composition which reduced the number of field magnets in the fifth embodiment, and made composition of the magnetic excitation part simple. The composition of other portions is the same as the fifth embodiment, and following explanation is focused on different points from the fifth embodiment.

Figure 24:
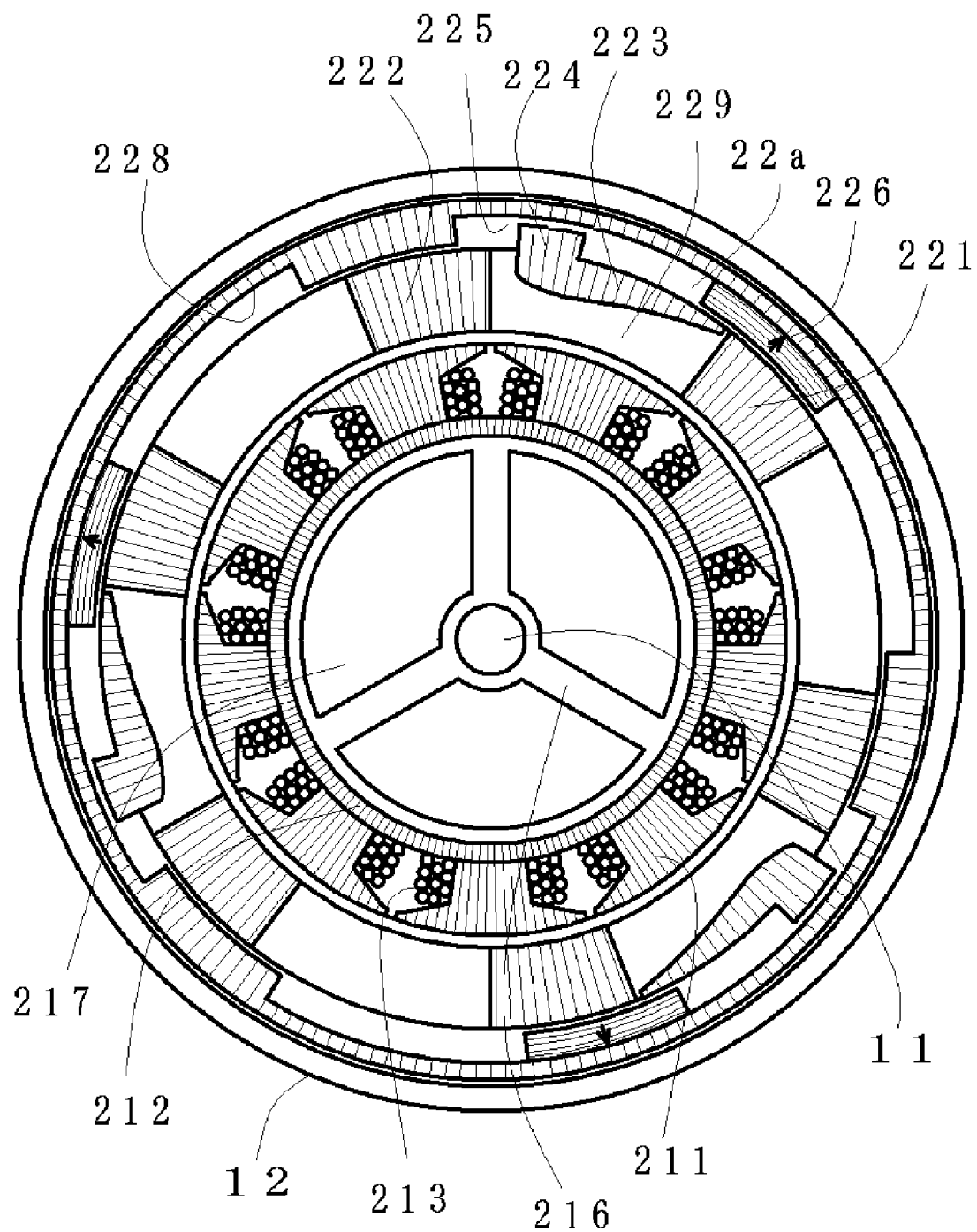
FIG. 24 is a sectional view showing the armature and the rotor of the rotating electric machine apparatus according to the sixth embodiment of the present invention.

FIG. 24 shows a sectional view of the armature and the rotor along H-H' of FIG. 21, and some of the component parts are appended with numbers for explaining the reciprocal relation. The magnetic excitation part 214 is the composition that the magnetic salient pole 222 extension and the bypass magnetic pole which are opposite to the field magnet 227 and the field magnet 227 in the fifth embodiment shown in FIG. 22 are removed, and the magnetic salient pole 222 extension is disposed oppositely to the cylindrical magnetic core 228 through a minute gap.

The magnetic flux flowing into the magnetic salient pole 221 extension from one end of the field magnet 226 returns to other end thereof through the magnetic teeth 211, the magnetic salient pole 222 and the cylindrical magnetic core 228, and the magnetic salient pole 221 and the magnetic salient pole 222 are magnetized in different polarities each other.

In this embodiment, the field magnet 226, the magnetic salient pole 221, the magnetic teeth 211, the magnetic salient pole 222, and the cylindrical magnetic core 228 form the main magnetic flux pathway, and the field magnet 226, the bypass magnetic pole 223, the gap 225, and the cylindrical magnetic core 228 form the bypass magnetic flux pathway. Only the field magnet 226 is included in the bypass magnetic flux pathway and in the main magnetic flux pathway, so opposite area and gap length in the gap 225 are adjusted so that magnetic resistance of the bypass magnetic flux pathway may become equal to magnetic resistance of the main magnetic flux pathway. This point is different from the fifth embodiment.

As explained above, the sixth embodiment removes the field magnet 227, and disposes the magnetic salient pole 222 extension oppositely to the cylindrical magnetic core 228, and these are just different points from the fifth embodiment. Since operating principle which controls the magnetic flux flowing in the armature, or a rotating electric machine system is the same as the fifth embodiment, further explanation thereof is omitted.

The rotating electric machine system according to a seventh embodiment of the present invention will be explained by using FIGS. 25 to 27. The seventh embodiment is a rotating electric machine system with a radial gap structure and an outer rotor structure. The magnetic excitation part is disposed within a rotor, and the magnetic flux flowing through the armature is controlled by a centrifugal force.

Figure 25:
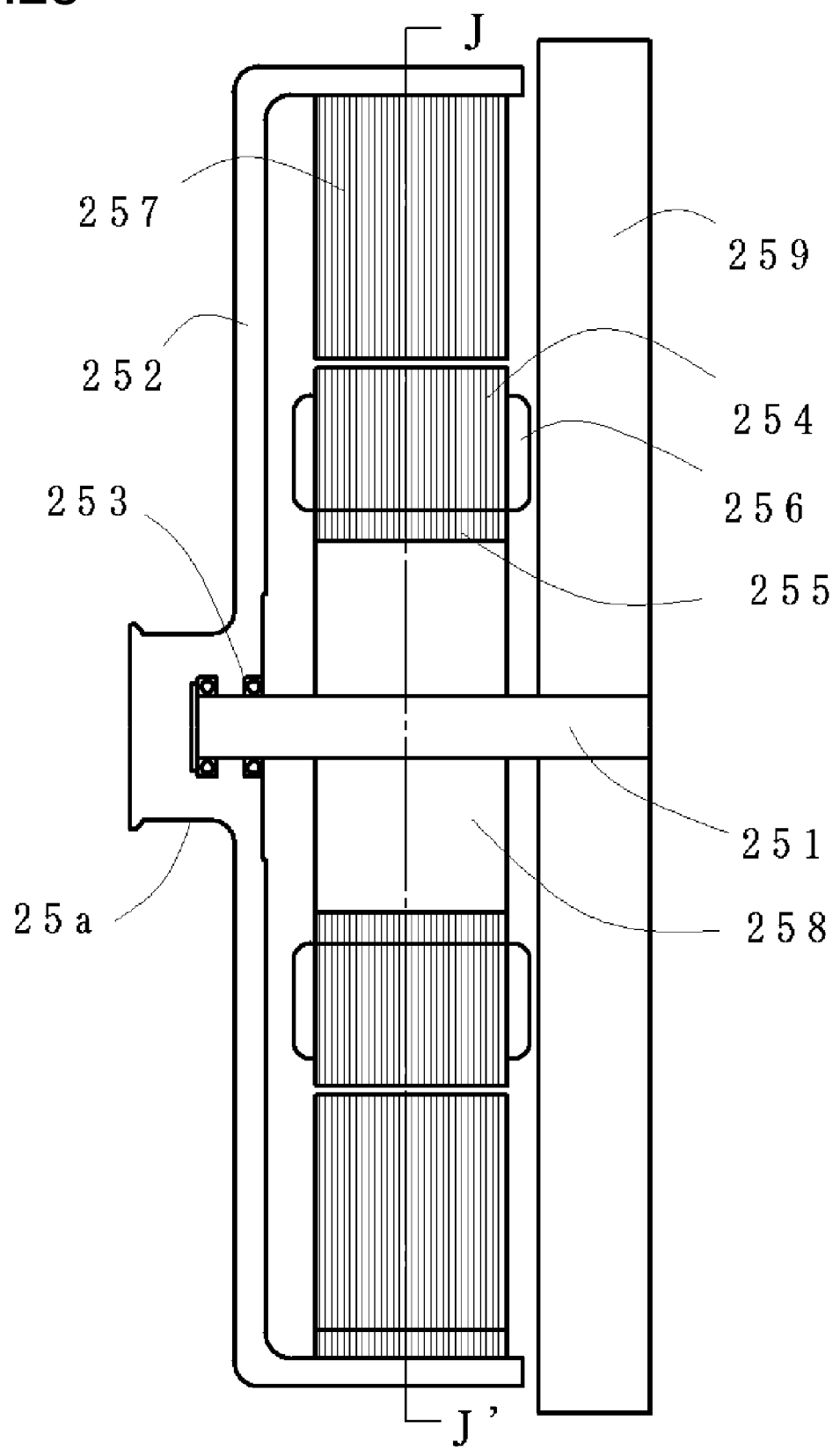
FIG. 25 is a longitudinal sectional view of the rotating electric machine apparatus according to the seventh embodiment of the present invention.

FIG. 25 illustrates the rotating electric machine apparatus with an outer rotor structure. A surface magnetic pole part and a magnetic excitation part are disposed in the outer rotor. A fixed shaft 251 is fixed to a substrate 259, and further the armature is fixed to the fixed shaft 251. A rotor housing 252 is supported by the fixed shaft 251 rotatably through bearings 253. A magnetic field pole part 257 including the surface magnetic pole part and the magnetic excitation part is disposed at inner surface of the rotor housing 252. The number 25a indicates a pulley portion prepared in the rotor housing 252. The armature includes a cylindrical magnetic yoke 255 fixed to an armature support 258, magnetic teeth 254, and an armature coil 256.

Figure 26:
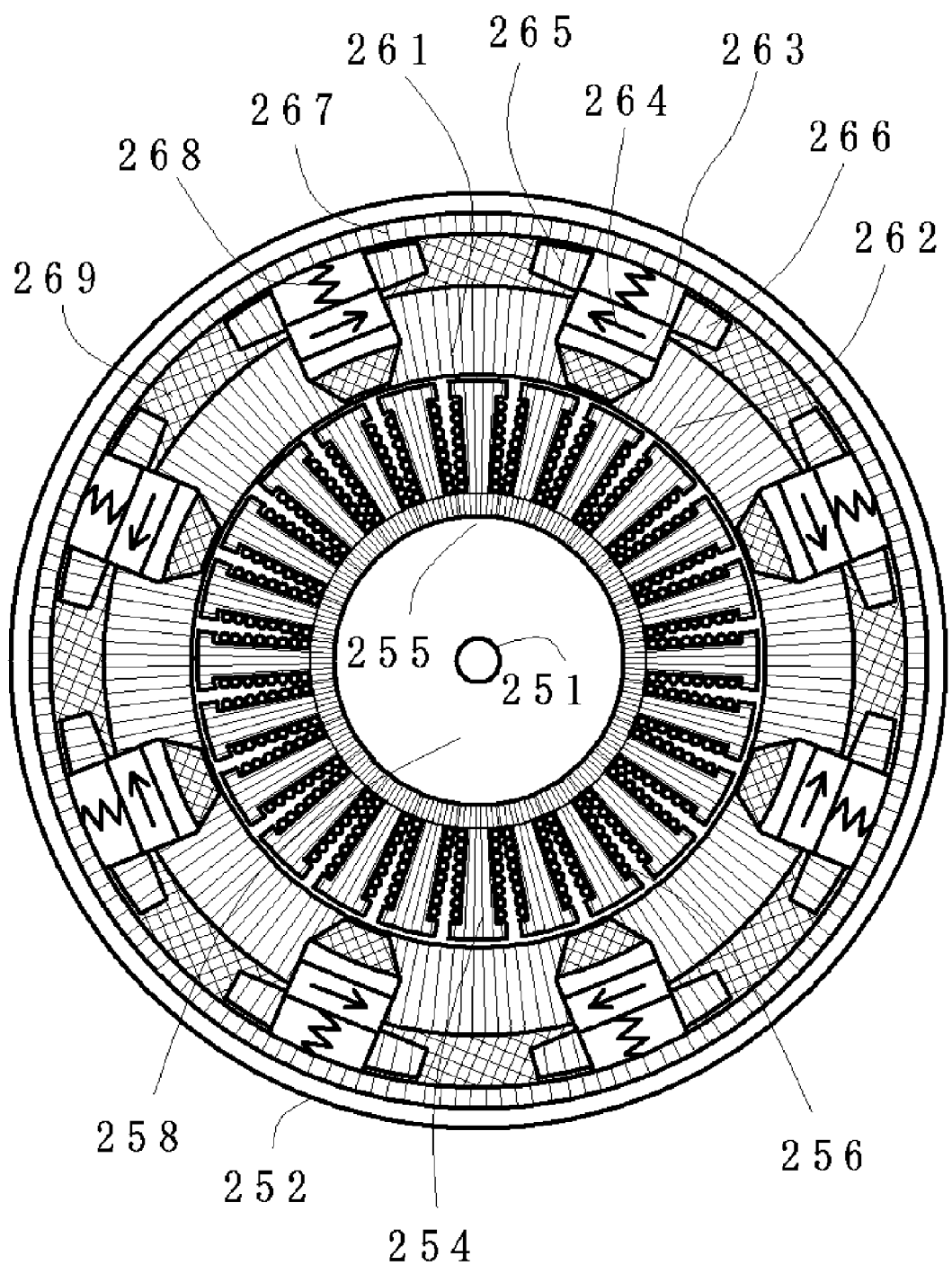
FIG. 26 is a sectional view showing the armature and the rotor of the rotating electric machine apparatus shown in FIG. 25.

FIG. 26 shows a sectional view of the armature and the rotor along J-J' of FIG. 25, and some of the component parts are appended with numbers for explaining the reciprocal relation. The armature is composed of the cylindrical magnetic yoke 255 fixed to the armature support 258, a plurality of the magnetic teeth 254 extending radially from the cylindrical magnetic yoke 255 and having non-magnetic portions in the circumferential direction, and the armature coils 256 wound around the magnetic teeth 254. In this embodiment, twenty-four armature coils 256 are included and connected so as to have three phases. The magnetic teeth 254 and the cylindrical magnetic yokes 255 are composed by punching out a silicon steel plate by a predetermined die and then stacking the punched plates, and the armature coils 256 are wound.

In FIG. 26, an inner surface of the magnetic field pole part 257 faces the magnetic teeth 254. A first magnetic salient pole 261, a non-magnetic portion 263, and a second magnetic salient pole 262, and a non-magnetic portion 263 are arranged in sequence in circumferential direction at the opposite side to the magnetic teeth 254 of the surface magnetic pole part.

The surface magnetic pole part has a bypass magnetic pole in the perimeter side of the extended direction of the magnetic salient pole, and has a field magnet 264 facing extensions of the adjacent magnetic salient poles 261, 262 and also the adjacent bypass magnetic poles 265, 266. A cylindrical magnetic core 267 is disposed opposing the bypass magnetic poles 265, 266 through minute non-magnetic gap. The field magnet 264 is constituted possible to slide radially and is forced for an inner direction by a spring 268. The number 269 represents a non-magnetic portion. In this composition, the field magnet 264 corresponds to the magnetic excitation part.

Figure 27:
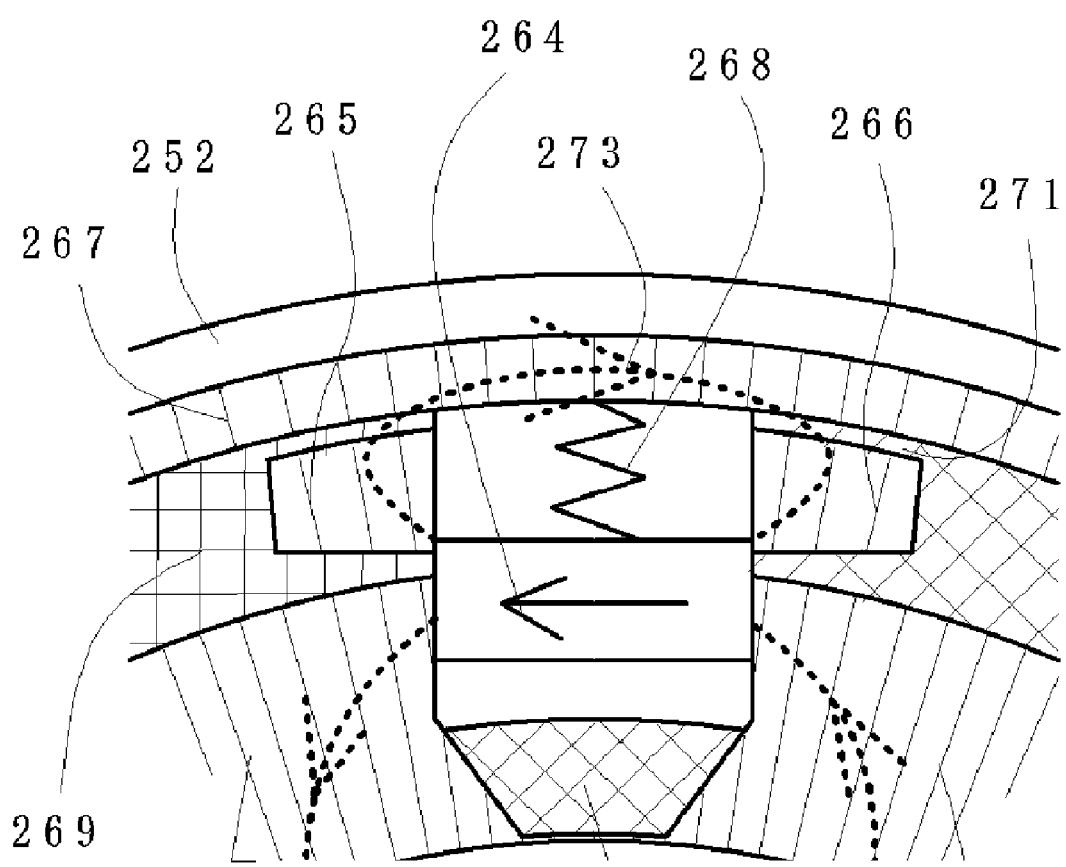
FIG. 27 is a magnified sectional view showing the field magnet neighborhood of the rotating electric machine apparatus shown in FIG. 25.

FIG. 27 is a magnified sectional view showing the field magnet 264 and circumference thereof, and the magnetic flux control will be explained using FIG. 27. Two magnetic circuits are connected to the field magnet 264 in parallel, one the main magnetic flux pathway is a flux pathway which magnetic flux from the field magnet 264 circulates through the magnetic salient poles 261, 262 and the magnetic teeth 254, and other the bypass magnetic flux pathway is a flux pathway which magnetic flux from the field magnet 264 circulates through the bypass magnetic poles 265, 266 and the cylindrical magnetic core 267. The dotted line 272, 273 shows the magnetic flux that flows along with the main magnetic flux pathway and the bypass magnetic flux pathway, respectively.

In the embodiment according to the present invention, the magnetic resistance of the main magnetic flux pathway and the magnetic resistance of the bypass magnetic flux pathway are set up equally, and therefore the gap length and the opposite area in the gap region between the bypass magnetic poles 265, 266 and the cylindrical magnetic core 267 are adjusted. And the sum of the area to which the field magnet 264 is opposite with the magnetic salient poles 261, 262, the bypass magnetic poles 265, 266 is consistently constant, then the magnetic force disturbing the field magnet 264 displacement will not appear theoretically.

When being stationary or low rotating speed, the centrifugal force does not operate on the field magnet 264, so the field magnet 264 is forced by the spring 268 into the standard location of the innermost radius, and the opposite area with the magnetic salient poles 261, 262 and the field magnet 264 is biggest, and the biggest amount of magnetic flux is flowing through the main magnetic flux pathway. When being high rotational speed, the centrifugal force which acts on the field magnet 264 wins the force of the spring 268 and makes the field magnet 264 move to outer radius position, and the opposite area with the magnetic salient poles 261, 262 and the field magnet 264 becomes smaller, and an amount of the magnetic flux which flows through the main magnetic flux pathway is made smaller. The relation between the magnetic flux amount flowing through the main magnetic flux pathway and the rotating speed is set up by the characteristic of the spring 268, and the mass of the field magnet 264, and the friction coefficient between the field magnet 264 and the circumference which are set up in order to reduce an unnecessary vibration.

Figure 28:
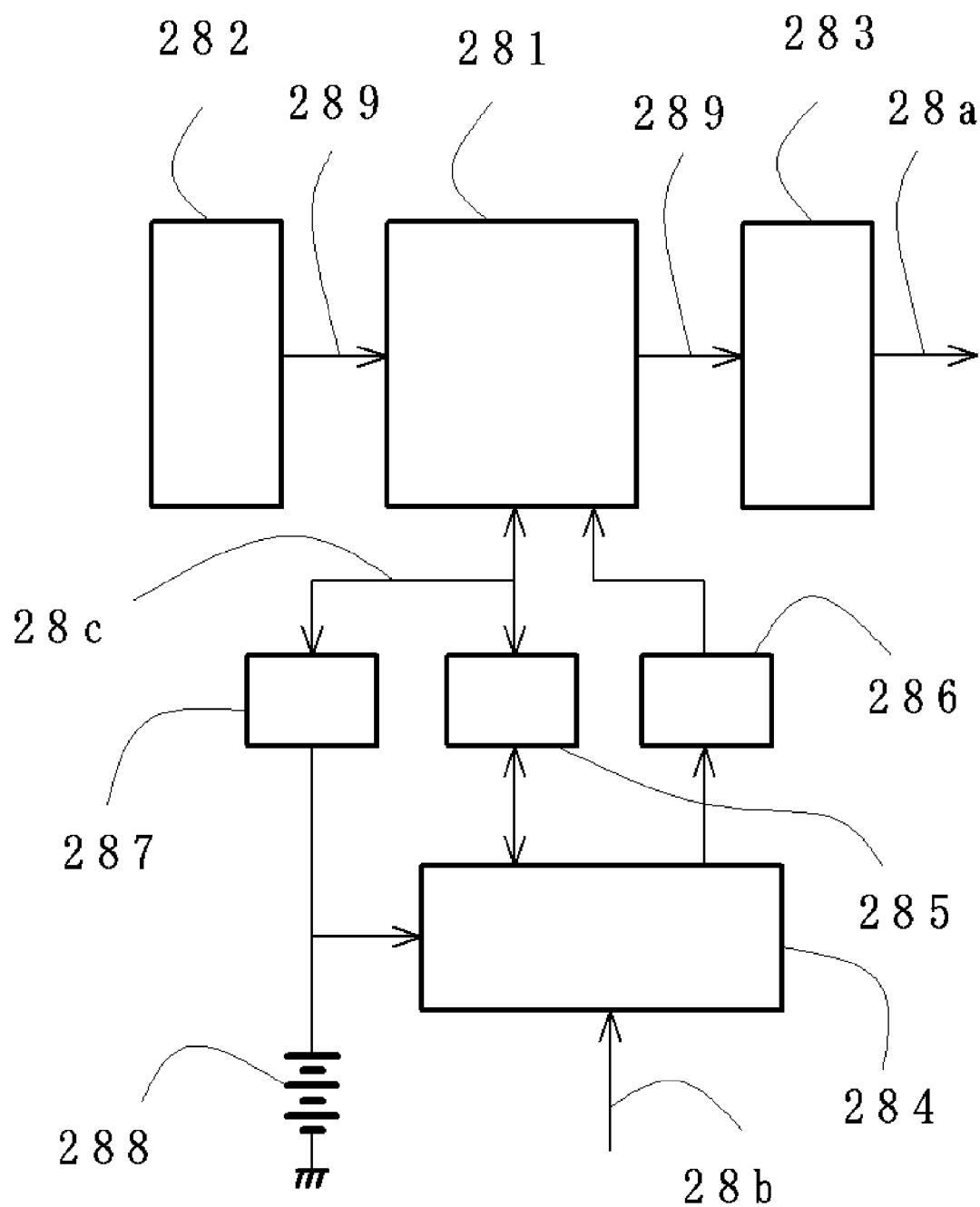
FIG. 28 is a block diagram of a rotating electric machine system for performing field-weakening control according to the eighth embodiment of the present invention.

A rotating electric machine system according to a eighth embodiment of the present invention will be explained by using FIG. 28. The eighth embodiment is a rotating electric machine system that used the rotating electric machine apparatus of the first embodiment as a dynamo and an electric motor of a hybrid car.

In the figure, a number 281 shows the rotating electric machine apparatus shown in the first embodiment, and a rotary shaft 289 of the rotating electric machine apparatus 281 is combined so that torque may be transferred from engine 282 of a hybrid car and by a belt, and torque of rotary shaft 289 is transferred to drive shaft 28a through transmission 283. The control device 284 receives the instructions 28b from a higher rank control device, drives the rotating electric machine apparatus 281 as an electric motor through the drive circuit 285, and controls the magnetic field strength in the rotating electric machine 281 through the field control circuit 286. Furthermore, the control device 284 receives the instructions 28b from the higher rank control device, rectifies the electric power which appears in the output line 28c of the armature coils 16 through the rectifier circuits 287, and charges a battery 288.

The control device 284 drives the rotating electric machine apparatus 281 as an electric motor through the drive circuit 285 by directions of instruction 28b, and a revolution of engine 282 is assisted or, a revolution makes rotary shaft 289 drive independently, and contribute to the driving force of the hybrid car through transmission 283 and the driving shaft 28a.

When magnet torque needs to be strengthened in the low rotating speed region just after starting, the control device 284 drives the magnetic excitation part 18 for left sides by the actuator 1f, and makes the opposing area of the magnetic salient pole 21 extension and the field magnet 24 larger so that the amount of the magnetic flux flowing between the magnetic teeth 14 and the magnetic salient poles 21, 22 becomes larger. When magnet torque needs to be weakened in the high rotating speed region, the control device 284 drives the magnetic excitation part 18 for right sides by the actuator 1f, and makes the opposing area of the magnetic salient pole 21 extension and the field magnet 24 smaller so that the amount of the magnetic flux flowing between the magnetic teeth 14 and the magnetic salient poles 21, 22 becomes smaller.

When the hybrid car can be driven only on the torque of an engine 282, the generated electric power which appears in the output line 28c of the armature coils 16 is changed into DC current through the rectifier circuits 287, and makes the battery 288 charge by the instruction 28b. In that case, the control device 284 controls the actuator 1f through the field control circuits 286 to become the optimal voltage that charges the battery 288. Since the rotating electric machine apparatus is used as a constant voltage dynamo, when charging the battery 288, the converter that changes power generation voltage is unnecessary. Furthermore, the expensive converter can be made unnecessary by controlling on the optimal power generation voltage for each battery, even when a battery 288 includes two or more sorts of batteries with different in its voltage.

The eighth embodiment functions effectively also as an energy recovery system at the time of braking of the hybrid car. When directions of regenerative braking are received through the instructions 28b, the control device 284 drives the pushrod 1e leftward through the field control circuits 286, and makes the opposing area between the magnetic salient pole 21 extension and the field magnet 24 larger, and then the amount of magnetic flux flowing between the magnetic teeth 14 and the magnetic salient poles 21, 22 larger, and generated electric power is made to charge to the battery 288. In case of having two or more batteries 288, the control device 284 controls the actuator 1f through the field control circuits 286, and controls the magnetic flux flowing between the magnetic teeth 14 and the magnetic salient poles 21, 22 so that the power generation voltage which suits the charge voltage of the battery 288 which has charge remaining power most is obtained. Since the rotating electric machine apparatus 281 is the physique employed as the electric motor for drive, so enough braking force can be generated as a generator for regenerative braking.

As described above, the rotating electric machine system of the present invention has been explained with reference to the embodiments. These embodiments are mere examples for realizing the theme or the purpose of the present invention and do not limit the scope of the invention. It is natural that a system for realizing the theme or the purpose of the present invention can be accomplished by combining the above-described embodiments or by combining some of the embodiments, and so forth.

For example, although structures where the armature had a plurality of the magnetic teeth in the above-mentioned embodiments were shown. In the rotating electric machine of the conventional axial gap composition, the constructional example that does not arrange any magnetic teeth also exists. Moreover, the armature composition example that arranges the printed armature coil on the cylindrical magnetic yoke and does not have any magnetic teeth, also exists in radial gap structure. This invention can be applied irrespective of the existence of the magnetic teeth, and can adopt the optimal armature composition in accordance with the specification of rotating electric machine system.

Furthermore, being caused by various tolerances of the parts, aging changes, the relative displacement amount between the surface magnetic pole part and the magnetic excitation part, and an operational status of the rotating electric machine system, the magnetic resistance of the main magnetic flux pathway and the bypass magnetic flux pathway shifts from the setting condition, and therefore the magnetic power may become bigger. The means to acquire related parameters in learning way during operation and revise the magnetic resistance of the main magnetic flux pathway effectively can settle these problems effectively as it is proposed in this invention. However, according to the specification or the operation form of the rotating electric machine system, it is also possible to constitute a simple system by adopting the above-mentioned proposal partially or skipping a learning process by having the relation between the above-mentioned parameters and the parameter which adjusts the magnetic resistance of the main magnetic flux pathway effectively, beforehand, as data.

INDUSTRIAL APPLICABILITY

The rotating electric machine system according to the present invention makes it possible to easily control the field strength between the magnetic field pole part and the armature by changing the conventional structure in the vicinity of the magnet excitation of the rotating electric machine. The rotating electric machine system can be utilized as a high-power electric motor similarly to a conventional rotating electric machine, and additionally, enlarges the range of the practicable rotational speed, and furthermore, improves the function of the power generation, and also can control the power-generation function.

By applying the present invention as an electric generator and electric motor system for automobile application, the rotational speed range is able to be larger than the conventional one, and additionally, energy recovery in braking is enabled to improve the comprehensive energy consumption.

Furthermore, as the constant-voltage electric generator system, the power-generation voltage can be controlled to be constant in the wider rotational speed range, and therefore, the constant-voltage control circuit is not required, and furthermore, it becomes possible that a converter is not required for various types of battery charges in which voltages are different, and the entire system cost can be reduced.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotating electric machine apparatus comprising:
a magnetic field pole part and an armature that are opposed to each other concentrically along an axis in a radial direction or in an axial direction and that are disposed to be capable of relatively rotating;
wherein the armature has an armature coil,
wherein the magnetic field pole part is divided into a surface magnetic pole part and a magnetic excitation part which are composed so as to be capable of being relatively displaced,
wherein the surface magnetic pole part has a plurality of magnetic salient poles disposed in a circumferential direction oppositely to the armature and has a plurality of magnetic salient pole extensions and a plurality of bypass magnetic poles disposed oppositely to the magnetic excitation part,
wherein the magnetic excitation part has a field magnet that an end thereof opposes the magnetic salient pole extension and the bypass magnetic pole, and the field magnet is disposed so that the adjacent magnetic salient poles are magnetized in different polarities each other,
wherein a main magnetic flux pathway in which a magnetic flux from the field magnet circulates through the magnetic salient pole and the armature and a bypass magnetic flux pathway in which a magnetic flux from the field magnet circulates within the magnetic field pole part are connected to the field magnet in parallel,
wherein the surface magnetic pole part and the magnetic excitation part are composed so as to be capable of being relatively displaced so that a sum of an area of the field magnet opposed to the magnetic salient pole extension and an area of the field magnet opposed to the bypass magnetic pole is maintained to be constant, and further
wherein any one of the surface magnetic pole part and the magnetic excitation part serves as a movable magnetic pole part, and the movable magnetic pole part is relatively displaced with respect to the other one thereof by a displacement control means, and thereby, an amount of the magnetic flux flowing into the main magnetic flux pathway is controlled.

2. The rotating electric machine apparatus according to claim 1,
wherein magnetic resistance of the bypass magnetic flux pathway divided by the number of the field magnets contained therein in series is set up to be almost equal to magnetic resistance of the main magnetic flux pathway divided by the number of the field magnets contained therein in series.

3. The rotating electric machine apparatus according to claim 1,
wherein the constitution of the portion of the surface magnetic pole part facing the magnetic excitation part is composed so that the bypass magnetic pole is arranged in the extended direction of a magnetic salient pole,
wherein the magnetic excitation part has a field magnet with a circumferential direction magnetization,
wherein the field magnet is disposed between the adjacent magnetic salient pole extensions and also between the adjacent bypass magnetic poles,
wherein the magnetization directions of the adjacent field magnets are arranged inversely to each other so that the adjacent magnetic salient poles are magnetized in different polarities to each other,
wherein the main magnetic flux pathway is a magnetic flux pathway with magnetic flux flowing into the magnetic salient pole extension from an end of the field magnet and circulating to the other end of the field magnet through the armature and the adjacent magnetic salient pole extension,
wherein the bypass magnetic flux pathway is a magnetic flux pathway with magnetic flux flowing into the bypass magnetic pole from an end of the field magnet and circulating to the other end of the field magnet through the adjacent bypass magnetic pole, and
wherein the magnetic excitation part is composed so as to be capable of being displaced in a direction so that the magnetic salient pole extension and the bypass magnetic pole are aligned.

4. The rotating electric machine apparatus according to claim 3,
wherein magnetic resistance of the bypass magnetic flux pathway is set up to be almost equal to magnetic resistance of the main magnetic flux pathway.

5. The rotating electric machine apparatus according to claim 1, wherein the magnetic field pole part and the armature are opposed in a radial direction, wherein the magnetic salient pole extension part has a periodic excision portion axially and the bypass magnetic pole is arranged in the excision portion, wherein the magnetic excitation part has a composition by which the field magnet with a circumferential direction magnetization and the non-magnetic portion are periodically arranged in an axial direction, wherein the field magnet is disposed between the adjacent magnetic salient pole extensions and also between the adjacent bypass magnetic poles, wherein the magnetization direction of the adjacent field magnets in a circumferential direction are arranged inversely to each other so that the adjacent magnetic salient poles are magnetized in different polarities to each other, wherein the main magnetic flux pathway is a magnetic flux pathway with magnetic flux flowing into the magnetic salient pole extension from an end of the field magnet and circulating to the other end of the field magnet through the armature and the adjacent magnetic salient pole extension, wherein the bypass magnetic flux pathway is a magnetic flux pathway with magnetic flux flowing into the bypass magnetic pole from an end of the field magnet and circulating to the other end of the field magnet through the adjacent bypass magnetic pole, and wherein the magnetic excitation part is composed so as to be capable of being displaced in the axial direction.

6. The rotating electric machine apparatus according to claim 5, wherein magnetic resistance of the bypass magnetic flux pathway is set up to be almost equal to magnetic resistance of the main magnetic flux pathway.

7. The rotating electric machine apparatus according to claim 1, wherein the surface magnetic pole part and the magnetic excitation part are composed so as to be possible to displace relatively in a circumferential direction, wherein the constitution of the portion of the surface magnetic pole part facing the magnetic excitation part is that a first magnetic salient pole extension, a bypass magnetic pole, and a second magnetic salient pole extension are repeatedly arranged in a circumferential direction, and the bypass magnetic pole is disposed to face the second magnetic salient pole extension through a micro non-magnetic gap, and wherein the magnetic excitation part has a field magnet arranged so that one magnetic pole of the field magnet is disposed to face the first magnetic salient pole extension and the bypass magnetic pole, wherein the main magnetic flux pathway is a magnetic flux pathway with magnetic flux flowing into the first magnetic salient pole extension from an end of the field magnet and circulating to the other end of the field magnet through the armature and the second magnetic salient pole extension, wherein the bypass magnetic flux pathway is a magnetic flux pathway with magnetic flux flowing into the bypass magnetic pole from an end of the field magnet and circulates to the other end of the field magnet through the second magnetic salient pole extension, and the adjacent magnetic salient poles are magnetized with different polarities to each other.

8. The rotating electric machine apparatus according to claim 7, wherein magnetic resistance of the bypass magnetic flux pathway is set up to be almost equal to magnetic resistance of the main magnetic flux pathway.

9. The rotating electric machine apparatus according to claim 7, further comprising:

a position maintaining means to maintain the displacement position of the surface magnetic pole part, a drive circuitry to supply a current to the armature coil, wherein at a time of the displacement control of the surface magnetic pole part, the position maintaining means reduces the retentivity of the surface magnetic pole part temporarily, and the surface magnetic pole part is displaced in a circumferential direction by supplying current to the armature coil by the drive circuitry at the same time.

10. The rotating electric machine apparatus according to claim 1, wherein the surface magnetic pole part and the magnetic excitation part are composed so as to be possible to displace relatively in a circumferential direction, wherein the constitution of the portion of the surface magnetic pole part facing the magnetic excitation part is that a magnetic salient pole extension and a bypass magnetic pole are repeatedly arranged in a circumferential direction, wherein the magnetic excitation part has a field magnet arranged on a cylindrical magnetic core so that the magnetization direction of the adjacent field magnets are arranged inversely each to other, and pole end of each field magnet faces the magnetic salient pole extension and the bypass magnetic pole, and other end of the bypass magnetic pole faces the cylindrical magnetic core with a minute gap, wherein the main magnetic flux pathway is a magnetic flux pathway with magnetic flux flowing into the magnetic salient pole extension from an end of the field magnet and circulating to the other end of the field magnet through the armature and the adjacent magnetic salient pole extension and the adjacent field magnet the the cylindrical magnetic core, and wherein the bypass magnetic flux pathway is a magnetic flux pathway with magnetic flux flowing into the bypass magnetic pole from an end of the field magnet and circulating to the other end of the field magnet through the cylindrical magnetic core.

11. The rotating electric machine apparatus according to claim 10, wherein magnetic resistance of the bypass magnetic flux pathway is set up to be almost equal to half of magnetic resistance of the main magnetic flux pathway.

12. The rotating electric machine apparatus according to claim 10, further comprising:

a position maintaining means to maintain the displacement position of the surface magnetic pole part, a drive circuitry to supply a current to the armature coil, wherein at a time of the displacement control of the surface magnetic pole part, the position maintaining means reduces the retentivity of the surface magnetic pole part temporarily, and the surface magnetic pole part is displaced in a circumferential direction by supplying a current to the armature coil by the drive circuitry at the same time.

13. The rotating electric machine apparatus according to claim 1, further comprising a displacement regulating means for regulating displacement of the movable magnetic pole part so that the field magnet always opposes with the magnetic salient pole extension and the bypass magnetic pole.

14. The rotating electric machine apparatus according to claim 1, further comprising a predetermined constant current load,
    wherein the predetermined constant current load is connected to the armature coil at a time of the displacement control of the movable magnetic pole part, and
    wherein the predetermined constant current load makes predetermined current flow in the armature coil by induced voltage so that magnetic resistance of the main magnetic flux pathway is adjusted effectively and magnetic force disturbing the displacement becomes small.

15. The rotating electric machine apparatus according to claim 1, further comprising a drive circuitry,
    wherein the drive circuitry is connected to the armature coil at a time of the displacement control of the movable magnetic pole part, and
    wherein the drive circuitry supplies predetermined current to the armature coil for accelerating or decelerating a rotor so that magnetic resistance of the main magnetic flux pathway is adjusted effectively and magnetic force disturbing the displacement control becomes small.

16. The rotating electric machine apparatus according to claim 1, further comprising:
    means to detect magnetic force by which magnetic resistances of the main magnetic flux pathway and the bypass magnetic flux pathway deviate from the predetermined condition and is added to the movable magnetic pole part,
    means for supervising a relation between the magnetic force and the intermittently connected constant current loads to the armature coil with different conditions, and
    means for setting up the constant current load which makes the magnetic force smaller as the predetermined constant current load,
    wherein, on an occasion of the displacement control of the movable magnetic pole part, the predetermined constant current load is connected to the armature coil so that magnetic resistance of the main magnetic flux pathway is adjusted effectively and magnetic force disturbing the displacement becomes small.

17. The rotating electric machine apparatus according to claim 1, further comprising:
    means for detecting the magnetic force by which magnetic resistances of the main magnetic flux pathway and the bypass magnetic flux pathway deviate from the predetermined condition and is added to the movable magnetic pole part,
    means for supervising a relation between the magnetic force and the intermittently supplied current into the armature coils with different conditions or a relation between the magnetic force and the supplied current into the armature coil during normal operation, and
    means for setting up the current which makes the magnetic force smaller as the predetermined current,
    wherein, on an occasion of the displacement control of the movable magnetic pole part, the drive circuitry supplies the predetermined current to the armature coil so that magnetic resistance of the main magnetic flux pathway is adjusted effectively and magnetic force disturbing the displacement becomes small.

18. The rotating electric machine apparatus according to claim 1, further comprising a mechanism to maintain a displacement position of the movable magnetic pole part in the displacement control means,
    wherein control of the magnetic flux amount flowing into the main magnetic flux pathway is carried out intermittently.

19. The rotating electric machine apparatus according to claim 1,
    wherein the constitution of the side of the surface magnetic pole part facing the armature is composed so that the magnetic salient pole and the non-magnetic portion are disposed one after the other in a circumferential direction.

20. The rotating electric machine apparatus according to claim 1,
    wherein the constitution of the side of the surface magnetic pole part facing the armature is composed so that a magnetic salient pole and a permanent magnet with approximately circumferential direction magnetization are disposed one after the other in a circumferential direction,
    wherein the magnetization directions of the contiguous permanent magnets are arranged inversely each other so that the contiguous magnetic salient poles are magnetized in different polarities to each other, and
    wherein the surface magnetic pole part and the magnetic excitation part are disposed so that the direction of the magnetization whose permanent magnet magnetizes the magnetic salient pole and the direction of the magnetization whose magnetic excitation part magnetizes the magnetic salient pole are coincided.

21. The rotating electric machine apparatus according to claim 1,
    wherein a permanent magnet assembly which arranges a permanent magnet plate with same approximately circumferential direction magnetization on both sides of a magnetic material is an equivalent permanent magnet,
    wherein the constitution of the side of the surface magnetic pole part facing the armature is composed so that a magnetic salient pole and the permanent magnet assembly are disposed one after the other in a circumferential direction,
    wherein the magnetization directions of the contiguous permanent magnet assemblies are arranged inversely each other so that the contiguous magnetic salient poles are magnetized in different polarities to each other, and
    wherein the surface magnetic pole part and the magnetic excitation part are disposed so that the direction of the magnetization whose permanent magnet assembly magnetizes the magnetic salient pole and the direction of the magnetization whose magnetic excitation part magnetizes the magnetic salient pole are coincided.

22. A rotating electric machine system comprising:
    the rotating electric machine apparatus according to claim 1; and
    a control device;
    wherein a rotational force is an input,
    wherein the control device controls the displacement control means to move the movable magnetic pole part so as to set an opposed area between the field magnet and the magnetic salient pole extension to be smaller when power generation voltage induced in the armature coils is larger than a predetermined value, and controls the displacement control means to move the movable magnetic pole part so as to set the opposed area between the field magnet and the magnetic salient pole extension to be larger when the power generation voltage is smaller than the predetermined value, and wherein the power generation voltage is controlled to be a predetermined value.

23. A rotating electric machine system comprising:
    the rotating electric machine apparatus according to claim 1; and a control device;
wherein a current supplied to the armature coils is an input,
wherein the control device controls the displacement control means to move the movable magnetic pole part so as to set an opposed area between the field magnet and the magnetic salient pole extension to be smaller when a rotational speed is larger than a predetermined value and a field strength is weakened, and controls the displacement control means to move the movable magnetic pole part so as to set an opposed area between the field magnet and the magnetic salient pole extension to be larger when the rotational speed is smaller than the predetermined value and the field strength is enhanced, and thereby a rotational force is optimally controlled, and
wherein, when the rotational speed is reduced, the displacement control means is controlled so that the field strength between the armature and the surface magnetic pole part becomes larger, and thereby, the opposed area between the field magnet and the magnetic salient pole extension becomes larger to take out a rotational energy as a power generation output.

24. A method for controlling a magnetic flux flowing in an armature of a rotating electric machine apparatus that includes a magnetic field pole part and an armature that are opposed to each other concentrically to an axis in a radial direction or in an axial direction and that are disposed to be capable of relatively rotating, the armature having an armature coil, the magnetic field pole part having a plurality of magnetic salient poles disposed in a circumferential direction oppositely to the armature, the magnetic field pole part is divided into a surface magnetic pole part and a magnetic excitation part which are composed so as to be capable of being relatively displaced, and the surface magnetic pole part has a plurality of magnetic salient poles disposed in a circumferential direction oppositely to the armature and has a magnetic salient pole extension and a bypass magnetic pole disposed oppositely to the magnetic excitation part, said method comprising:
connecting, in the magnetic excitation part, a main magnetic flux pathway in which a magnetic flux circulates from one end of a field magnet to the other end of the field magnet through the magnetic salient poles and the armature and a bypass magnetic flux pathway in which a magnetic flux circulates from one end of the field magnet to the other end of the field magnet mainly in the magnetic field pole part to the field magnet in parallel;
composing the surface magnetic pole part and the magnetic excitation part so as to be capable of being relatively displaced so that a sum of an area of the field magnet opposed to the magnetic salient pole extension and an area of the field magnet opposed to the bypass magnetic pole is maintained to be constant;
serving any one of the surface magnetic pole part and the magnetic excitation part as a movable magnetic pole part; and
controlling an amount of magnetic flux flowing into the main magnetic flux pathway by relatively displacing the movable magnetic pole part with respect to the other one thereof by a displacement control means.

25. The method of controlling the magnetic flux flowing in the armature according to claim 24,
wherein magnetic resistance of the bypass magnetic flux pathway divided by the number of the field magnet contained therein in series is set up to be almost equal to magnetic resistance of the main magnetic flux pathway divided by the number of the field magnet contained therein in series so that total amount of magnetic flux from the field magnet is consistently maintained constant.

26. The method of controlling the magnetic flux flowing in the armature according to claim 24,
wherein interposing of a predetermined constant current load is connected to the armature coil at a time of the displacement control of the movable magnetic pole part, and
wherein the predetermined constant current load makes a predetermined current flow in the armature coil by induced voltage so that magnetic resistance of the main magnetic flux pathway is adjusted effectively and magnetic force disturbing the displacement becomes small.

27. The method of controlling the magnetic flux flowing in the armature according to claim 24,
wherein interposing of a drive circuitry is connected to the armature coil at a time of the displacement control of the movable magnetic pole part, and
wherein the drive circuitry supplies a predetermined current to the armature coil for accelerating or decelerating a rotor so that magnetic resistance of the main magnetic flux pathway is adjusted effectively and magnetic force disturbing the displacement becomes small.

28. The method for controlling the magnetic flux flowing in the armature according to claim 24, further comprising:
detecting magnetic force by which magnetic resistance of the main magnetic flux pathway and the bypass magnetic flux pathway deviates from the predetermined condition and is added to the movable magnetic pole part,
supervising a relation between the magnetic force and the intermittently connected constant current loads to the armature coil with different conditions, and
setting up the constant current load which makes the magnetic force smaller as the predetermined constant current load,
wherein, on an occasion of the displacement control of the movable magnetic pole part, the predetermined constant current load is connected to the armature coil so that magnetic resistance of the main magnetic flux pathway is adjusted effectively and magnetic force disturbing the displacement becomes small.

29. The method for controlling the magnetic flux flowing in the armature according to claim 24, further comprising:
detecting magnetic force by which magnetic resistances of the main magnetic flux pathway and the bypass magnetic flux pathway deviate from the predetermined condition and is added to the movable magnetic pole part,
supervising a relation between the magnetic force and the intermittently supplied current into the armature coil with different conditions or a relation between the magnetic force and the supplied current into the armature coil during normal operation, and
setting up the current which makes the magnetic force smaller as the predetermined current,
wherein, on an occasion of the displacement control of the movable magnetic pole part, the drive circuitry supplies the predetermined current to the armature coil so that magnetic resistance of the main magnetic flux pathway is adjusted effectively and magnetic force disturbing the displacement becomes small.

30. The method for controlling the magnetic flux flowing in the armature according to claim 24, further comprising:
having a maintaining means of a displacement position of the movable magnetic pole part in the displacement control means; and
carrying out the control of the magnetic flux amount flowing into the main magnetic flux pathway intermittently.

* * * * *